US011920504B2

(12) United States Patent
Thobe

(10) Patent No.: US 11,920,504 B2
(45) Date of Patent: Mar. 5, 2024

(54) SCALABLE GREENHOUSE GAS CAPTURE SYSTEMS AND METHODS

(71) Applicant: MARATHON PETROLEUM COMPANY LP, Findlay, OH (US)

(72) Inventor: Zachary D. Thobe, Findlay, OH (US)

(73) Assignee: MARATHON PETROLEUM COMPANY LP, Findlay, OH (US)

(*) Notice: Subject to any disclaimer, the term of this patent is extended or adjusted under 35 U.S.C. 154(b) by 0 days.

(21) Appl. No.: 18/207,722

(22) Filed: Jun. 9, 2023

(65) Prior Publication Data

US 2023/0332532 A1 Oct. 19, 2023

Related U.S. Application Data

(60) Continuation of application No. 18/093,756, filed on Jan. 5, 2023, now Pat. No. 11,761,366, which is a
(Continued)

(51) Int. Cl.
*F17C 7/00* (2006.01)
*F01N 13/08* (2010.01)
*G06Q 20/10* (2012.01)

(52) U.S. Cl.
CPC .......... *F01N 13/08* (2013.01); *F17C 7/00* (2013.01); *G06Q 20/10* (2013.01);
(Continued)

(58) Field of Classification Search
CPC ........ F17C 2205/0352; F17C 2221/013; F17C 2227/0135; F17C 2227/0157;
(Continued)

(56) References Cited

U.S. PATENT DOCUMENTS 3,087,311 A 4/1963 Rousseau
3,672,180 A 6/1972 Davis
(Continued)

FOREIGN PATENT DOCUMENTS

CA 2916141 6/2017
CN 103106764 5/2013
(Continued)

OTHER PUBLICATIONS

Alexandrakis et al.,"Marine Transportation for Carbon Capture and Sequestration (CCS)", Department of Civil and Environmental Engineering, Thesis, Massachusetts Institute of Technology, Jun. 2010.
(Continued)

*Primary Examiner* — Jason K Niesz
(74) *Attorney, Agent, or Firm* — Womble Bond Dickinson (US) LLP

(57) ABSTRACT

Scalable greenhouse gas capture systems and methods to allow a user to off-load exhaust captured in an on-board vehicle exhaust capture device and to allow for a delivery vehicle or other transportation mechanism to obtain and transport the exhaust. The systems and methods may involve one or more exhaust pumps, each with an exhaust nozzle corresponding to a vehicle exhaust port. Upon engagement with the vehicle exhaust port, the exhaust nozzle may create an air-tight seal between the exhaust nozzle and the vehicle exhaust port. A first pipe may be configured to transport captured exhaust therethrough from the exhaust nozzle to. The captured exhaust may be at least temporarily stored in an exhaust holding tank connected to and in fluid communication with the first pipe.

24 Claims, 40 Drawing Sheets

Related U.S. Application Data continuation of application No. 18/093,747, filed on Jan. 5, 2023, now Pat. No. 11,739,679, said application No. 18/093,756 is a division of application No. 17/652,530, filed on Feb. 25, 2022, now Pat. No. 11,578,638, said application No. 18/093,747 is a division of application No. 17/652,530, filed on Feb. 25, 2022, now Pat. No. 11,578,638.

(60) Provisional application No. 63/267,567, filed on Feb. 4, 2022, provisional application No. 63/200,581, filed on Mar. 16, 2021.

(52) U.S. Cl.
CPC ............... *F17C 2205/0352* (2013.01); *F17C 2221/013* (2013.01); *F17C 2227/0135* (2013.01); *F17C 2227/0157* (2013.01); *F17C 2250/032* (2013.01); *F17C 2250/0443* (2013.01); *F17C 2250/0447* (2013.01); *F17C 2270/0168* (2013.01)

(58) Field of Classification Search
CPC ........ F17C 2250/032; F17C 2250/0443; F17C 2250/0447; F17C 2270/0168; F01N 13/08; G06Q 20/10
See application file for complete search history.

(56) References Cited

U.S. PATENT DOCUMENTS

| | | | |
|---|---|---|---|
| 3,725,669 A | 4/1973 | Tatum |
| 3,807,433 A | 4/1974 | Byrd |
| 3,925,592 A | 12/1975 | Webb |
| 4,010,779 A | 3/1977 | Pollock et al. |
| 4,109,677 A | 8/1978 | Burnside |
| 4,242,533 A | 12/1980 | Cott |
| 4,289,163 A | 9/1981 | Pierson |
| 4,294,378 A | 10/1981 | Rabinovich |
| 4,690,587 A | 9/1987 | Petter |
| 4,744,305 A | 5/1988 | Lim et al. |
| 4,794,331 A | 12/1988 | Schweitzer, Jr. |
| 4,848,082 A | 7/1989 | Takahashi |
| 4,897,226 A | 1/1990 | Hoyle et al. |
| 4,904,932 A | 2/1990 | Schweitzer, Jr. |
| 5,129,432 A | 7/1992 | Dugger |
| 5,367,882 A | 11/1994 | Lievens et al. |
| 5,383,243 A | 1/1995 | Thacker |
| 5,562,133 A | 10/1996 | Mitchell |
| 5,603,360 A | 2/1997 | Teel |
| 5,661,623 A | 8/1997 | McDonald |
| 5,832,967 A | 11/1998 | Andersson |
| 5,973,593 A | 10/1999 | Botella |
| 6,098,601 A | 8/2000 | Reddy |
| 6,840,292 B2 | 1/2005 | Hart et al. |
| 6,851,916 B2 | 2/2005 | Schmidt |
| 6,980,647 B1 | 12/2005 | Daugherty et al. |
| 7,258,710 B2 | 8/2007 | Caro et al. |
| 7,275,366 B2 | 10/2007 | Powell et al. |
| 7,294,913 B2 | 11/2007 | Fischer et al. |
| 7,385,681 B2 | 6/2008 | Ninomiya et al. |
| 7,444,996 B2 | 11/2008 | Potier |
| 7,832,338 B2 | 11/2010 | Caro et al. |
| 8,075,651 B2 | 12/2011 | Caro et al. |
| 8,299,811 B2 | 10/2012 | Wing |
| 8,327,631 B2 | 12/2012 | Caro et al. |
| 8,368,405 B2 | 2/2013 | Siebens |
| 8,402,746 B2 | 3/2013 | Powell et al. |
| 8,647,162 B2 | 2/2014 | Henriksson et al. |
| 8,808,415 B2 | 8/2014 | Caro et al. |
| 8,979,982 B2 | 3/2015 | Jordan et al. |
| 9,222,480 B2 | 12/2015 | Younes et al. |
| 9,945,333 B2 | 4/2018 | Kopinsky |
| 10,287,940 B2 | 5/2019 | Tonsich |
| 10,364,718 B2 | 7/2019 | Eddaoudi et al. |
| 10,386,260 B2 | 8/2019 | Dudek |
| 10,563,555 B2 | 2/2020 | Hamad |
| 10,570,581 B2 | 2/2020 | Faivre |
| 10,605,144 B2 | 3/2020 | Kobayashi |
| 10,633,830 B2 | 4/2020 | Shibamori |
| 10,657,443 B2 | 5/2020 | Araujo et al. |
| 10,688,686 B2 | 6/2020 | Fadhel et al. |
| 10,756,459 B2 | 8/2020 | Jongsma |
| 10,943,357 B2 | 3/2021 | Badawy et al. |
| 10,948,471 B1 | 3/2021 | MacMullin et al. |
| 10,953,960 B1 | 3/2021 | Sharp |
| 10,962,437 B1 | 3/2021 | Nottrott et al. |
| 10,970,927 B2 | 4/2021 | Sharp |
| 10,997,707 B1 | 5/2021 | Katz et al. |
| 11,112,308 B2 | 9/2021 | Kreitinger et al. |
| 11,125,391 B2 | 9/2021 | Al Khowaiter et al. |
| 11,164,406 B2 | 11/2021 | Meroux et al. |
| 11,325,687 B1 | 5/2022 | Sharp |
| 11,332,070 B2 | 5/2022 | Holden et al. |
| 11,345,455 B2 | 5/2022 | Sharp |
| 11,578,638 B2 | 2/2023 | Thobe |
| 11,686,070 B1 | 6/2023 | Jordan et al. |
| 11,715,950 B2 | 8/2023 | Miller et al. |
| 11,720,526 B2 | 8/2023 | Miller et al. |
| 11,739,679 B2 | 8/2023 | Thobe |
| 11,752,472 B2 | 9/2023 | Miller |
| 11,754,225 B2 | 9/2023 | Thobe |
| 11,774,042 B2 | 10/2023 | Thobe |
| 11,794,153 B2 | 10/2023 | Miller |
| 11,807,945 B2 | 11/2023 | Ell |
| 11,808,013 B1 | 11/2023 | Jordan et al. |
| 11,815,227 B2 | 11/2023 | Thobe |
| 2002/0014068 A1 | 2/2002 | Mittricker et al. |
| 2003/0041518 A1 | 3/2003 | Wallace et al. |
| 2003/0121481 A1 | 7/2003 | Dodd et al. |
| 2003/0158630 A1 | 8/2003 | Pham et al. |
| 2003/0188536 A1 | 10/2003 | Mittricker |
| 2004/0057334 A1 | 3/2004 | Wilmer et al. |
| 2004/0058597 A1 | 3/2004 | Matsuda |
| 2004/0067126 A1 | 4/2004 | Schmidt |
| 2005/0150820 A1 | 7/2005 | Guo |
| 2008/0092625 A1 | 4/2008 | Hinrichs |
| 2008/0149481 A1 | 6/2008 | Hurt |
| 2009/0197489 A1 | 8/2009 | Caro |
| 2011/0265449 A1 | 11/2011 | Powell |
| 2012/0092835 A1 | 4/2012 | Miller |
| 2012/0143560 A1 | 6/2012 | Tabet et al. |
| 2012/0304625 A1 | 12/2012 | Daikoku |
| 2013/0035824 A1 | 2/2013 | Nakamura |
| 2013/0176656 A1 | 7/2013 | Kaisser |
| 2013/0201025 A1 | 8/2013 | Kamalakannan et al. |
| 2013/0299500 A1 | 11/2013 | McKinnon |
| 2014/0002639 A1 | 1/2014 | Cheben et al. |
| 2014/0090379 A1 | 4/2014 | Powell et al. |
| 2014/0190691 A1 | 7/2014 | Vinegar |
| 2014/0194657 A1 | 7/2014 | Wadhwa et al. |
| 2014/0299039 A1 | 10/2014 | Trollux |
| 2015/0144468 A1 | 5/2015 | Skolozdra |
| 2015/0244087 A1 | 8/2015 | Wing |
| 2016/0139355 A1 | 5/2016 | Petersen |
| 2016/0238194 A1 | 8/2016 | Adler et al. |
| 2016/0252650 A1 | 9/2016 | Hirst, Sr. |
| 2017/0122174 A1 | 5/2017 | Patel |
| 2017/0254481 A1 | 9/2017 | Cadogan et al. |
| 2018/0037452 A1 | 2/2018 | Gray et al. |
| 2018/0080356 A1 | 3/2018 | Fukui |
| 2018/0119882 A1 | 5/2018 | Allidieres et al. |
| 2018/0186528 A1 | 7/2018 | Tonn |
| 2019/0270500 A1 | 9/2019 | Hamaoka |
| 2019/0368156 A1 | 12/2019 | Faivre |
| 2020/0232191 A1 | 7/2020 | Prior |
| 2020/0292445 A1 | 9/2020 | Morimoto |
| 2021/0053011 A1* | 2/2021 | Sugiyama ............ F01N 3/0871 |
| 2021/0062697 A1 | 3/2021 | Yokoyama et al. |
| 2021/0076006 A1 | 3/2021 | O'Neill et al. |
| 2021/0138399 A1 | 5/2021 | Yokoyama et al. |
| 2021/0207772 A1 | 7/2021 | Norton et al. |
| 2021/0215925 A1 | 7/2021 | Kim et al. |

(56) References Cited

U.S. PATENT DOCUMENTS

| | | |
|---|---|---|
| 2021/0216852 A1 | 7/2021 | Reece et al. |
| 2021/0232741 A1 | 7/2021 | Ogiso et al. |
| 2021/0362637 A1 | 11/2021 | Hanis et al. |
| 2022/0010707 A1 | 1/2022 | Sharma et al. |
| 2022/0048606 A1 | 2/2022 | Singh |
| 2022/0343229 A1 | 10/2022 | Gruber et al. |
| 2023/0015077 A1 | 1/2023 | Kim |
| 2023/0078852 A1 | 3/2023 | Campbell et al. |
| 2023/0259080 A1 | 8/2023 | Whikehart et al. |
| 2023/0259088 A1 | 8/2023 | Borup et al. |
| 2023/0333577 A1 | 10/2023 | Miller |
| 2023/0333578 A1 | 10/2023 | Miller |
| 2023/0341092 A1 | 10/2023 | Thobe |
| 2023/0347303 A1 | 11/2023 | Miller |
| 2023/0358023 A1 | 11/2023 | Jordan et al. |
| 2023/0366510 A1 | 11/2023 | Thobe |
| 2023/0383416 A1 | 11/2023 | Ell |
| 2023/0383417 A1 | 11/2023 | Ell |
| 2023/0383418 A1 | 11/2023 | Ell |
| 2023/0392536 A1 | 12/2023 | Thobe |
| 2023/0399817 A1 | 12/2023 | Jordan |
| 2023/0399818 A1 | 12/2023 | Jordan |
| 2023/0407488 A1 | 12/2023 | Ell |
| 2023/0415106 A1 | 12/2023 | Miller |
| 2024/0003016 A1 | 1/2024 | Ell |

FOREIGN PATENT DOCUMENTS

| | | |
|---|---|---|
| CN | 204824775 | 12/2015 |
| CN | 110513604 | 11/2019 |
| CN | 111537157 | 8/2020 |
| CN | 114001278 | 2/2022 |
| EP | 3112011 | 1/2017 |
| EP | 2994626 | 1/2018 |
| ES | 2398302 | 3/2013 |
| FR | 2388762 | 11/1978 |
| GB | 2559149 | 4/2022 |
| IN | 202141001384 | 1/2021 |
| IT | 201900008235 | 12/2020 |
| JP | 2004125039 | 4/2004 |
| JP | 2007204023 | 8/2007 |
| JP | 2012002159 | 11/2014 |
| JP | 2016078893 | 5/2016 |
| KR | 20130038986 | 4/2013 |
| KR | 102129951 | 7/2020 |
| KR | 102169280 | 10/2020 |
| KR | 102281640 | 7/2021 |
| RU | 2760879 | 12/2021 |
| WO | 2000063108 | 10/2000 |
| WO | 2003066423 | 8/2003 |
| WO | 2004092307 | 10/2004 |
| WO | 2009013544 | 1/2009 |
| WO | 2010042704 | 4/2010 |
| WO | 2010103260 | 9/2010 |
| WO | 2016026043 | 2/2016 |
| WO | 2017074985 | 5/2017 |
| WO | 2017083778 | 5/2017 |
| WO | 2020223803 | 11/2020 |
| WO | 2020237112 | 11/2020 |
| WO | 2021062563 | 4/2021 |
| WO | 2021100054 | 5/2021 |
| WO | 2022043197 | 3/2022 |
| WO | 2022149501 | 7/2022 |
| WO | 2023038579 | 3/2023 |
| WO | 2023137304 | 7/2023 |
| WO | 2023164683 | 8/2023 |

OTHER PUBLICATIONS

Datta et al., "Advancing carbon management through the global commoditization of CO2: the case for dual-use LNG-CO2 shipping", Carbon Management, 2020, vol. 11, No. 6, 611-630.

Ibitoye et al., "Poster Abstract: A Convolutional Neural Network Based Solution for Pipeline Leak Detection", School of Information Technology, Carleton University, Ottawa, Canada, Nov. 2019.

IntelliView, "Thermal Imaging Provides Early Leak Detection in Oil and Gas Pipelines", Petro Industry News, www.Petro-Online.com, Aug./Sep. 2018.

Southwest Research Institute, "Methane Leak Detection", 2021.

Skelton et al., Onboard Refueling Vapor Recovery Systems Analysis of Widespread Use, Nescaum, Boston, MA, Aug. 20, 2007.

Membrane Technology and Research, Inc., Gasoline Vapor Recovery, 2018.

Jordan Technologies, Aereon, Recovering More Vapor = More Gasoline = Increased Profits, 2015.

EPFL, Capturing CO2 from trucks and reducing their emissions by 90%, Dec. 23, 2019.

Sharma, Shivom et al., Carbon Dioxide Capture From Internal Combustion Engine Exhaust Using Temperature Swing Adsorption, Front. Energy Res., Dec. 16, 2019, Sec. Carbon Capture, Utilization and Storage.

Lloyd's Register, Using technology to trace the carbon intensity of sustainable marine fuels, Feb. 15, 2023.

Masterduct, "Case Studies: High temp marine grade ship engine exhaust fume hose", retrieved at https://www.masterduct.com/CaseStudies/Hightempshipengineexhaustfumehose.aspx.

Acti, "Advanced Maritime Emissions Control System (AMECS)", retrieved at https://sustainableworldports.org/wp-content/uploads/presentation-on-AMECS.pdf.

\* cited by examiner

SCALABLE GREENHOUSE GAS CAPTURE SYSTEMS AND METHODS

CROSS REFERENCE TO RELATED APPLICATIONS

This application is a continuation of U.S. application Ser. No. 18/093,756, filed Jan. 5, 2023, titled "SCALABLE GREENHOUSE GAS CAPTURE SYSTEMS AND METHODS," which is a divisional of U.S. application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties. This application is also a continuation of U.S. application Ser. No. 18/093,747, filed Jan. 5, 2023, titled "SCALABLE GREENHOUSE GAS CAPTURE SYSTEMS AND METHODS," which is a divisional of U.S. application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties.

FIELD OF DISCLOSURE

Embodiments of this disclosure relate to scalable greenhouse gas capture systems and methods, and more particularly, to systems and methods that allow users or motorists to capture combustion products, i.e., exhaust, on-board a vehicle, off-load such captured combustion products at various collection locations, including, e.g., convenience stores, truck stops, and/or other fueling locations that have exhaust or fluid pumps or receivers configured for such operations, store the off-loaded combustion products at least temporarily, and then transport, via delivery vehicle, pipeline, or other device, the off-loaded combustion products for recycling, use, and/or permanent storage, e.g., sequestration.

BACKGROUND

Certain gases, such as carbon dioxide, carbon monoxide, nitrogen dioxide, sulfur dioxide, benzene, formaldehyde, polycyclic hydrocarbons, other particulate matter, etc., when released to the atmosphere are purported to adversely contribute to climate change and have been labeled as greenhouse gases. To mitigate perceived climate change or meet private, public, country, state, or global commitments/policies, much worldwide attention and focus has been placed on reducing the release of these greenhouse gases to atmosphere, e.g., as shown via The Paris Agreement. Greenhouse gases, such as carbon dioxide, are directly released to atmosphere through the combustion of fossil fuels, for example, in a vehicle or other vehicles that utilize fossil fuels. Further, atmospheric carbon dioxide may absorb heat that could otherwise be directed to space. The residence time of atmospheric carbon dioxide paired with accumulation may be cause for global focus.

Currently, the majority of motorist vehicles sold and in use are internal combustion engine motorist vehicles. Further, internal combustion engine motorist vehicles are affordable and widely available. Further still, the majority of fueling infrastructure within the United States, as well as globally, is constructed to support or provide fuel to internal combustion engine motorist vehicles. While other motorist vehicle options exist, such as fuel cell or electric based motorist vehicles, such options are costly and currently lack range and the extensive infrastructure typically associated with internal combustion engine motorist vehicles.

To offset greenhouse gas emissions produced by motorist vehicles or other vehicles, a user may purchase an alternative fuel vehicle (e.g., fuel cell or battery electric vehicles). However, manufacturing such vehicles produces some level of greenhouse gases and, as noted, may not be affordable or widely available. Further, both manufacturing of electric vehicles and components, as well as the production of the electricity to charge electric vehicles may produce some level of greenhouse gases. Additionally, the raw materials (e.g., lithium, nickel, manganese, cobalt, etc.) for such electric and other alternative powered vehicles or devices may create economic in-balances due to source geology and supply/demand fundamentals. In addition, infrastructure to fuel or charge such vehicles is not extensive or widely available and will require significant capital deployment. As an alternative, the motorist or user may purchase credits to offset any greenhouse gas emissions produced by operating the internal combustion motor vehicle. Such credits may be used to plant trees that capture an equivalent amount or portion of greenhouse gases from the air or other certified sources. However, such greenhouse gas offsetting programs are limited and may not fully mitigate the full scope of greenhouse gas emissions and the land-use impact is largely unknown. One viable alternative for directly reducing greenhouse gas emissions is to capture carbon dioxide produced by and found in the combustion products emitted from an internal combustion engine vehicle, while the vehicle is in motion. Many innovations exist relating to carbon capture, particularly around on-board vehicle carbon capture. While such innovations are available, no solution is known to exist for the efficient off-loading of the captured carbon dioxide, whether in liquid or gas form.

Accordingly, Applicant has recognized a need for a scalable greenhouse gas capture system and method to provide an internal combustion engine vehicle or other logistic vehicle types, e.g. rail, inland or ocean vessels, and aircraft, with an easy to use and incentive based exhaust off-loading solution. Applicant has also recognized that such systems and methods may be located at existing service stations, convenience stores, or other locations, providing scalable and pervasive solutions. The present disclosure is directed to embodiments of such systems and methods.

SUMMARY

The present disclosure is generally directed to systems and methods to allow a motorist or user to off-load combustion products, namely exhaust, that are captured on-board the internal combustion engine vehicle or motorist vehicle during its operation. The off-loaded, stored, and/or captured exhaust may be in various forms, such forms including a solid, gas, vapor, compressed gas, or liquid. The systems may be located in and methods may be utilized at various and multiple locations, allowing for wide adoption, ease of installation, and/or wide accessibility, e.g. scale. For example, the systems and methods may be located or performed at a convenience store during a typical refueling, at a service station while services are performed or issues relating to the vehicle are resolved, and/or at varying other locations that allow for wide-spread access. The systems and methods may include a combined fuel and exhaust pump or dispenser/receiver, a separate fuel dispenser and exhaust pump or receiver, or a fuel pump/dispenser island or row of fuel pumps/dispensers including a corresponding one or more exhaust pumps/receivers. The exhaust pumps/receivers may also be separate from fuel pumps/dispensers or not co-located with fuel pumps/dispensers. An exhaust pump/receiver, whether co-located with a fuel pump/dispenser or not, may include an exhaust nozzle. The exhaust nozzle may correspond to a vehicle exhaust port. The vehicle exhaust port may allow for transport or off-loading of captured exhaust from an on-board vehicle exhaust capture device and storage. Such an on-board vehicle exhaust capture device may capture or collect exhaust. The on-board vehicle exhaust capture device may further be configured to capture carbon dioxide directly from the air. The exhaust nozzle, as noted, may correspond to and be sealingly engageable with the vehicle exhaust port, thus creating an air-tight seal between the exhaust nozzle and the vehicle exhaust port. Such an air-tight seal may be designed to prevent leakage of exhaust or carbon dioxide and provide a safe transfer of exhaust or carbon from the vehicle to the exhaust pump. The exhaust nozzle may connect to a pipe, such as a flexible hose able to withstand high pressure and/or low temperatures. The pipe may connect to a compressor or pump. The compressor or pump may compress and/or pump the fluid or molecules from the vehicle. The compressor or pump, if present, or the pipe may connect to an exhaust holding tank. The exhaust holding may store the exhaust until retrieved by a delivery vehicle. A meter may be disposed at some point between the exhaust nozzle, the compressor, the pump, or the exhaust holding tank. The meter may clamp on or be integrated in or on the pipe. The meter may measure an amount of exhaust flowing from the vehicle to the exhaust holding tank.

Accordingly, an embodiment of the disclosure is directed to a scalable greenhouse gas capture system. The system may allow a motorist or user to off-load exhaust captured in an on-board vehicle exhaust capture device. The system may allow for a delivery vehicle to obtain and transport the exhaust. The system may include one or more exhaust pumps. The one or more exhaust pumps may include an exhaust nozzle. The exhaust nozzle may correspond to and be sealingly engageable with a vehicle exhaust port. The exhaust nozzle may, upon engagement with the vehicle exhaust port, be configurable to create an air-tight seal between the exhaust nozzle and the vehicle exhaust port to prevent exhaust from leaking during off-load of captured exhaust from an on-board vehicle exhaust capture device through the vehicle exhaust port and into the exhaust nozzle. The system may include a first pipe. The first pipe may have one end portion connected to the exhaust nozzle and another end portion. The first pipe may be configured to transport captured exhaust therethrough from the exhaust nozzle to the another end portion. The system may include an exhaust holding tank. The exhaust holding tank may be connected to and in fluid communication with the another end portion. The exhaust holding tank may have a capacity to store the captured exhaust. The system may include a meter. The meter may be disposed at a position in a gas or fluid pathway, the fluid pathway defined at least in part by the first pipe and the exhaust holding tank, that allows exhaust to flow between the exhaust nozzle and exhaust holding tank. The meter may be configured to measure an amount of the exhaust transported from the on-board vehicle exhaust capture device to the exhaust holding tank. The system may include a first delivery vehicle port. The first delivery vehicle port may be connected to the exhaust holding tank to provide fluid communication therebetween and to allow the delivery vehicle to obtain compressed or liquid exhaust from the exhaust holding tank.

Another embodiment of the disclosure is directed to a scalable greenhouse gas capture system. The system may allow off-loading of exhaust captured in an on-board vehicle exhaust capture device. The system may allow for a delivery vehicle to obtain and transport the exhaust. The system may include one or more fuel dispensers. Each of the one or more fuel dispensers may include a user interface. The user interface may allow a user to select a fuel type for pumping to a vehicle thereby defining a selected=fuel type. The user interface may allow a user to select off-loading of captured exhaust, the captured exhaust obtained via an on-board vehicle exhaust capture device of the vehicle. The user interface may allow a user to transact payment for the selected fuel type. Each of the one or more fuel dispensers may include a fuel nozzle. The fuel nozzle may correspond to and be insertable into a vehicle fuel port. Each of the one or more fuel dispensers may include a first pipe. The first pipe may have one end portion connected to the fuel nozzle and another end portion connected to below grade fuel tanks to provide fluid communication therebetween. The first pipe may be configured to transport the selected fuel type to the vehicle, via the fuel nozzle, upon payment and selection of the selected fuel type. Each of the one or more fuel dispensers may include a first meter. The first meter may be disposed at a position between the fuel nozzle and the below grade fuel tanks. The first meter may measure an amount of fuel transported from one of the below grade fuel tanks to the vehicle. Each of the one or more fuel dispensers may include an exhaust nozzle. The exhaust nozzle may correspond to and be sealingly engageable with a vehicle exhaust port. The exhaust nozzle, upon engagement with the vehicle exhaust port, may be configurable to create an air-tight seal between the exhaust nozzle and the vehicle exhaust port to prevent exhaust from leaking during off-load of captured exhaust from the on-board vehicle exhaust capture device through the vehicle exhaust port and into the exhaust nozzle. Each of the one or more fuel dispensers may include a second pipe. The second pipe may have one end portion connected to the exhaust nozzle and another end portion. The second pipe may be configured to transport captured exhaust therethrough from the exhaust nozzle to the another end portion. The system may include a compressor or pump. The compressor or pump may be connected to and in fluid communication with the another end portion of the second pipe. The compressor or pump may be operable to increase pressure of the captured exhaust from the on-board vehicle exhaust capture device to transfer exhaust from the vehicle to the exhaust holding tank. The system may include an exhaust holding tank connected to and in fluid communication with the compressor or pump. The exhaust holding tank may have a capacity to store the captured exhaust from the compressor or pump. The system may include a second meter. The second meter may be disposed at a position in a fluid pathway, the fluid pathway defined at least in part by the second pipe and the compressor, that allows exhaust to flow between the exhaust nozzle and exhaust holding tank.

The second meter may be configured to measure an amount of the exhaust transported from the on-board vehicle exhaust capture device to the exhaust holding tank.

Another embodiment of the disclosure is directed to a method to off-load exhaust from an on-board vehicle exhaust capture device of a vehicle and to obtain, via a delivery vehicle, the exhaust. The method may include, in response to a reception of a selected fuel type from the user interface, transmitting a prompt to select whether to off-load vehicle exhaust captured in an on-board vehicle exhaust capture device of a vehicle. The method may include transmitting a prompt to engage a fuel and exhaust nozzle of the fuel and exhaust pump into a corresponding fuel and exhaust port of the vehicle. The method may include determining if the fuel and exhaust nozzle is inserted into the corresponding fuel and exhaust port of the vehicle. The method may include, in response to a determination that the fuel and exhaust nozzle is inserted into the corresponding fuel and exhaust port of the vehicle, determining if the fuel and exhaust nozzle is sealingly engaged with fuel and exhaust port of the vehicle. The method may include, in response to a determination that the fuel and exhaust nozzle is sealingly engaged with the fuel and exhaust port of the vehicle, pumping, via the fuel and exhaust nozzle, the selected fuel from a below grade fuel tank in fluid communication with the fuel and exhaust nozzle to a vehicle fuel tank. The method may further include, in response to a determination that vehicle exhaust off-loading was selected, pumping, via the fuel and exhaust nozzle, the vehicle exhaust from the vehicle on-board vehicle exhaust capture device to an exhaust holding tank. The method may include transmitting a physical or electronic receipt for an amount of fuel dispensed and an amount of vehicle exhaust pumped.

The method may also include, prior to pumping vehicle exhaust, determining an amount of current storage space of the exhaust holding tank based on a total amount of space of the exhaust holding tank and a current amount of vehicle exhaust stored in the exhaust holding tank. The method may include determining an amount of vehicle exhaust in the on-board vehicle exhaust capture device. The method may include determining whether the exhaust holding tank is able to store the full amount, or a portion, of vehicle exhaust in the on-board vehicle exhaust capture device. The method may include, in response to a determination that the exhaust holding tank is unable to store the amount of vehicle exhaust in the on-board vehicle exhaust capture device, preventing the pumping of vehicle exhaust into the exhaust holding tank.

Another embodiment of the disclosure is directed to a scalable carbon capture system to allow for off-load of captured carbon dioxide from an on-board vehicle carbon capture device and to allow for a delivery vehicle to obtain and transport the carbon. The system may include one or more carbon armatures. Each of the one or more carbon armatures may include a carbon nozzle. The carbon nozzle may correspond to and be sealingly engageable with a vehicle carbon port. The carbon nozzle, upon engagement with the vehicle carbon port, may be configurable to create an air-tight seal between the carbon nozzle and the vehicle carbon port to prevent carbon from leaking during off-load of captured carbon dioxide from an on-board vehicle carbon capture device through the vehicle carbon port and into the carbon nozzle. The carbon armatures may include a first pipe. The first pipe may have one end portion connected to the carbon nozzle and another end portion. The first pipe may be configured to transport captured carbon dioxide therethrough from the carbon nozzle to the another end portion. The system may include a compressor or pump connected to and in fluid communication with the another end portion of the first pipe. The compressor or pump may be operable to increase pressure of the captured carbon dioxide from the on-board vehicle carbon capture device to transfer exhaust from the vehicle to the exhaust holding tank, thereby defining captured carbon dioxide. The system may include a carbon holding tank connected to and in fluid communication with the compressor or pump. The carbon holding tank may have a capacity to store the captured carbon dioxide from the compressor or pump. The system may include a meter disposed at a position in a fluid pathway (i.e., gas or liquid pathway) defined at least in part by the first pipe and the compressor or pump that allows carbon to flow between the carbon nozzle and carbon holding tank. The meter may be configured to measure an amount of the carbon transported from the on-board vehicle carbon capture device to the carbon holding tank. The system may include a first delivery vehicle port connected to the carbon holding tank to provide fluid communication therebetween and to allow the delivery vehicle to obtain carbon dioxide from the carbon holding tank. In another embodiment, the vehicle may be one of a locomotive, airplane, bus, truck, marine vessel, or heavy vehicle.

Another embodiment of the disclosure is directed to a scalable greenhouse gas capture system. The system may allow a motorist or user to off-load exhaust captured in an on-board vehicle exhaust capture device. The system may allow for a delivery vehicle, or other mobile or fixed assembly or mechanism configured to obtain and transport the exhaust. The system may include one or more motor fuel dispensers. Each of the one or more motor fuel dispensers may include a user interface. The user interface may allow a motorist or other user to select a motor fuel type for pumping to a vehicle or other equipment thereby defining a selected motor fuel type. The user interface may allow the motorist or other user to select off-loading of captured exhaust, the captured exhaust obtained via an on-board vehicle exhaust capture device. The user interface may allow a motorist or other user to transact payment for the selected motor fuel type. Each of the one or more motor fuel dispensers may include a nozzle. The nozzle may include a first inner cavity corresponding to and insertable into a vehicle inner fuel port. The nozzle may include a first outer annular cavity surrounding the first inner cavity and corresponding to and sealingly engageable with a vehicle outer annular exhaust port. The nozzle may be configurable to create an air-tight seal (e.g., a closed system) between the first outer annular cavity of the nozzle and the vehicle outer annular exhaust port to prevent exhaust from leaking during off-load of captured exhaust from the on-board vehicle exhaust capture device through the vehicle fuel and exhaust port and into the nozzle. Each of the one or more motor fuel dispensers may include a pipe. The pipe may include a second inner cavity configured to transport the selected motor fuel type, via the first inner cavity of the nozzle, upon payment and selection of the selected motor fuel type. The pipe may include a second outer annular cavity surrounding the second inner cavity and configured to transport the captured exhaust, via the first outer annular cavity of the nozzle, upon payment and selection of the off-loading of captured exhaust. The pipe may include a first end portion of the second inner cavity connected to the first inner cavity of the nozzle. The pipe may include a second end portion of the second inner cavity connected to below or above grade fuel tanks to provide fluid communication therebetween. The pipe may include a first end portion of the second outer annular cavity connected to the first outer annular cavity of the nozzle. The pipe may include a second end portion of the second outer annular cavity. Each of the one or more motor fuel dispensers may include a first meter disposed at a position between the first inner cavity of the nozzle and the below or above grade fuel tanks to measure an amount of fuel transported from one of the below or above grade fuel tanks to the vehicle. The system may include a compressor or pump connected to and in fluid communication with the second end portion of the second inner cavity. The compressor or pump may be operable to increase pressure of the captured exhaust from the on-board vehicle exhaust capture device or may be configured to utilize staged pressure (e.g., as a form of suction) to transfer exhaust from the vehicle to the exhaust holding tank, thereby defining compressed captured exhaust. The system may include an exhaust holding tank connected to and in fluid communication with the compressor or pump. The exhaust holding tank may have a capacity to store the compressed captured exhaust from the compressor pump. The system may include a second meter disposed at a position in a fluid pathway defined at least in part by the second outer annular cavity of the pipe and the compressor or pump that allows exhaust to flow between the first outer annular cavity of the nozzle and exhaust holding tank or other intermediate tanks or equipment (e.g., a dryer, knock-out drum, etc.) to measure an amount of the exhaust transported from the on-board vehicle exhaust capture device to the exhaust holding tank.

Another embodiment of the disclosure is directed to a scalable greenhouse gas capture system. The system may allow a motorist or user to off-load exhaust captured in an on-board vehicle exhaust capture device. The system may allow for a delivery vehicle, or other downstream mechanisms or devices configured to obtain and transport the off-loaded exhaust. The system may include one or more sets of one or more motor fuel dispensers. Each of the one or more motor fuel dispensers may provide fuel to a vehicle. The system may include at least one exhaust pump included at each of the one or more sets of one or more fuel dispenser. The at least one exhaust pump may include a user interface. The user interface may allow a motorist or user to select off-loading of captured exhaust, the captured exhaust obtained via an on-board vehicle exhaust capture device. The user interface may allow a motorist or user to transact payment or receive credits for the selected off-loading of captured exhaust. The at least one exhaust pump may include an exhaust nozzle. The exhaust nozzle may correspond to and be sealingly engageable with a vehicle exhaust port. The exhaust nozzle, upon engagement with the vehicle exhaust port, may be configurable to create an air-tight seal between the exhaust nozzle and the vehicle exhaust port to prevent exhaust from leaking during off-load of captured exhaust from the on-board vehicle exhaust capture device through the vehicle exhaust port and into the exhaust nozzle. The at least one exhaust pump may include a first pipe. The first pipe may have one end portion connected to the exhaust nozzle and another end portion. The first pipe may be configured to transport captured exhaust therethrough from the exhaust nozzle to the another end portion. The system may include a compressor or pump connected to and in fluid communication with the another end portion of the first pipe. The compressor or pump may be operable to increase pressure of the captured exhaust from the on-board vehicle exhaust capture device to transfer exhaust from the vehicle to the exhaust holding tank, thereby defining compressed captured exhaust. The system may include an exhaust holding tank connected to and in fluid communication with the compressor or pump. The exhaust holding tank may have a capacity to store the compressed captured exhaust from the compressor. The system may include a meter disposed at a position in a fluid pathway defined at least in part by the first pipe and the compressor or pump that allows exhaust to flow between the exhaust nozzle and exhaust holding tank. The meter may be configured to measure an amount of the exhaust transported from the on-board vehicle exhaust capture device to the exhaust holding tank. The system may include a first delivery vehicle port connected to below grade fuel tanks to allow the delivery vehicle. The below grade fuel tanks may store motor fuel from a delivery vehicle. The system may include a second delivery vehicle port connected to the exhaust holding tank to provide fluid communication therebetween and to allow the delivery vehicle to obtain compressed exhaust from the exhaust holding tank.

Another embodiment of the disclosure is directed to a scalable exhaust capture system to allow for off-load of captured fluid stored in an on-board exhaust capture device and to allow for a transportation mechanism to obtain and transport the fluid. The system may include one or more fluid receivers. Each of the one or more fluid receivers may include a nozzle. The nozzle may correspond to and sealingly engage with a port of the on-board exhaust capture device. The nozzle, upon engagement with the port, may be configured to create an air-tight seal between the nozzle and the port to prevent fluid from leaking during off-load of captured fluid from the on-board exhaust capture device through the port and into the nozzle. Each of the fluid receivers may include a first pipe having one end portion connected to the nozzle and another end portion. The first pipe may be configured to transport captured fluid therethrough from the nozzle to the another end portion. The system may include an exhaust holding tank connected to and in fluid communication with the another end portion of the first pipe. The exhaust holding tank may have a capacity to store the captured fluid from the nozzle. The system may include a meter disposed at a position in a fluid pathway defined at least in part by the first pipe that allows fluid to flow between the nozzle and exhaust holding tank. The meter may be configured to measure an amount of the fluid transported from the on-board exhaust capture device to the exhaust holding tank. The system may include a transportation port connected to the exhaust holding tank to provide fluid communication therebetween and to allow a transportation mechanism or mode configured to off-load the exhaust to obtain fluid from the exhaust holding tank. In another embodiment, the system may include a pump. The pump may be disposed at a position in a fluid pathway defined at least in part by the first pipe and the meter. The pump may be operable to transport the fluid at an increased pressure or flow rate to the exhaust holding tank connected to and in fluid communication with the another end portion of the first pipe.

In an aspect, a scalable greenhouse gas capture system that can be used for substantially simultaneous fueling and exhaust offload operations is provided. The scalable greenhouse gas capture system can incorporate a multi-function nozzle assembly that can be configured to enable fueling and offload of exhaust along a common fuel and exhaust conduit and through a combined inlet/outlet port of a vehicle. In embodiments, for use with such a system, the vehicle will include a fuel tank and an on-board exhaust capture device that are accessible via the combined inlet/outlet port of the vehicle; and the scalable greenhouse gas capture system can comprise an exhaust capture system configured to off-load exhaust captured on-board a vehicle by a vehicle exhaust capture device, the exhaust capture system comprising at least one exhaust holding tank having a capacity to store the captured exhaust and connected to and in fluid communication with at least one pump for drawing an outflow of captured exhaust from the vehicle exhaust capture device; a fuel supply system for supplying a flow fuel to the vehicle in conjunction with the off-load of exhaust therefrom; and one or more motor fuel dispensers, each including a controller having a user interface configured to enable: (a) selection of a motor fuel type for pumping to a vehicle thereby defining a selected motor fuel type, (b) selection of off-loading of captured exhaust, the captured exhaust obtained via an on-board vehicle exhaust capture device, and (c) transaction of payment for the selected motor fuel type. The scalable greenhouse gas capture system further will include a multi-function nozzle assembly coupled to a fuel hose and exhaust hose for receiving the flow of fuel from the fuel supply and directing the outflow of off-load exhaust from the vehicle to the exhaust capture system.

The multi-function nozzle assembly comprising an exhaust nozzle defining an exhaust passage, and adapted to couple with an exhaust port of the vehicle, wherein a seal is formed between the exhaust nozzle and the vehicle exhaust port sufficient to prevent captured exhaust from leaking from the exhaust passage during off-load of the captured exhaust from the vehicle; and a fuel nozzle located within the exhaust passage of the exhaust nozzle, the fuel nozzle defining a fuel passage contained within and extending along the exhaust passage and through which a flow fuel is supplied a fuel tank of the vehicle, the fuel nozzle adapted to cooperatively engage with a fuel inlet port of the vehicle, so as to create a substantially airtight seal between the fuel nozzle and the fuel inlet port sufficient to substantially prevent leakage of exhaust from the outflow of off-load exhaust into the flow of fuel into the vehicle fuel tank. The fuel nozzle generally will be moveable along the exhaust passage of the exhaust nozzle when the exhaust nozzle is engaged with the exhaust port of the vehicle, so that a forward end of the fuel nozzle is received within the fuel inlet port; and the multi-function nozzle assembly will be configured to supply the flow of fuel through the fuel passage of the fuel nozzle and into the fuel tank of the vehicle, while exhaust is off-loaded from the vehicle exhaust capture device through the exhaust passage surrounding the fuel passage.

In embodiments of the scalable greenhouse capture system, the fuel nozzle further comprises one or more sealing features located adjacent the forward end of the fuel nozzle and adapted to cooperate with the one or more sealing materials of the fuel inlet port engaging the one or more sealing features of the fuel nozzle so as to form a seal therebetween sufficient to substantially prevent captured exhaust flowing along the exhaust passage from entering the fuel inlet port.

In some embodiments of the scalable greenhouse capture system, the fuel nozzle further comprises at least one sensor configured to monitor a flow pressure of the flow of fuel passing through the fuel nozzle and provide a signal to a fuel pump associated with the multi-function nozzle assembly indicating a volume of fuel in a fuel tank of the vehicle is reaching a selected capacity.

In some embodiments of the scalable greenhouse capture system, the exhaust capture system further comprises a compressor connected to and in fluid communication with the exhaust nozzle of the multi-function nozzle assembly, the compressor operable to increase pressure of the captured exhaust from the on-board vehicle exhaust capture device; an exhaust holding tank connected to and in fluid communication with the compressor, the exhaust holding tank having a capacity to store a volume of compressed captured exhaust from the compressor; and at least one meter disposed at a position in a fluid pathway defined at least in part by the exhaust hose and the compressor to enable exhaust to flow between the exhaust nozzle and exhaust holding tank, the meter configured to measure an amount of the exhaust transported from the vehicle exhaust capture device to the exhaust holding tank.

In embodiments, the scalable greenhouse capture system further comprises one or more sensors positioned along the exhaust passage, at least one sensor of the one or more sensors configured to detect a pressure of a flow of exhaust from the exhaust capture device of the vehicle, wherein shut-off of the outflow of exhaust from the exhaust capture device of the vehicle is enabled upon detection of the pressure of the outflow of exhaust decreasing to or below a selected back-pressure threshold. In some embodiments, wherein the one or more sensors comprise at least one sensor configured to measure an amount of exhaust transferred from the exhaust capture device of the vehicle.

In embodiments of the scalable greenhouse capture system, the exhaust nozzle further comprises a body having an outer wall with at least one locking channel located therealong, the at least one locking channel configured to receive a locking projection of the exhaust port of the vehicle therein to lock the exhaust nozzle in sealing engagement with the exhaust port.

In embodiments of the scalable greenhouse capture system, the multi-function nozzle assembly further includes at least one locating feature positioned at a forward end of the body of the exhaust nozzle and configured to cooperate with a corresponding locating feature of the exhaust port of the vehicle so as to facilitate alignment of the locking projections of the exhaust port with the locking channels of the exhaust nozzle. In some embodiments, the at least one locating feature of the exhaust nozzle and the corresponding locating features of the exhaust port comprise magnets; each including a sealing covering material applied thereover and configured to create an enhanced seal between the exhaust nozzle and the exhaust port due to a magnetic attraction therebetween.

In some embodiments of the scalable greenhouse capture system, the multi-function nozzle assembly further comprises a fuel intake line extending along the exhaust passage and coupled to the fuel nozzle by a connector, the connector comprising a flexible connector configured to extend and retract with movement of the fuel nozzle along the exhaust passage of the exhaust nozzle.

According to another aspect of the present disclosure, a multi-function nozzle assembly for use with a scalable greenhouse gas capture system for supplying fuel to a fuel tank of a vehicle and for off-load of exhaust captured in an on-board vehicle exhaust capture device is provided. In embodiments, the multi-function nozzle assembly comprises an exhaust nozzle defining an exhaust passage, the exhaust nozzle adapted to engage with an exhaust port of the vehicle and a seal between the dual function nozzle and the vehicle exhaust port sufficient to substantially prevent the exhaust from leaking from the exhaust passage during off-load of the exhaust from the vehicle; a fuel nozzle and a fuel intake line located within and surrounded by the exhaust passage of the exhaust nozzle, the fuel nozzle and fuel intake line defining a fuel passage contained within the exhaust passage; wherein the fuel nozzle is coupled to the fuel intake line by a flexible connector, and includes one or more sealing features located at a forward end thereof, the one or more corresponding sealing features adapted to cooperatively engage one or more sealing materials of a fuel inlet port of the vehicle; wherein the fuel nozzle is moveable along the exhaust passage of the exhaust nozzle to move a forward end of the exhaust nozzle into an opening of the fuel inlet port so that the one or more sealing materials of the fuel inlet port are brought into engagement with the one or more sealing features of the fuel nozzle to form a seal therebetween sufficient to substantially prevent exhaust from the exhaust passage entering the fuel inlet port; and at least one sensor configured to monitor a flow pressure of the flow of fuel passing through the fuel nozzle and provide a signal to a fuel pump associated with the multi-function nozzle assembly indicating a volume of fuel in the fuel tank of the vehicle is reaching a selected capacity; wherein the multi-function nozzle assembly is a coupled to a fuel and an exhaust conduit adapted to receive a flow of the fuel from a fuel supply in a first direction and outflow of exhaust from the on-board vehicle exhaust capture device in a second direction.

In embodiments, the flow of fuel to the fuel tank of the vehicle is supplied substantially simultaneously with the outflow of exhaust from the vehicle using the multi-function nozzle assembly.

In some embodiments, the fuel and exhaust conduit of the multi-function nozzle assembly comprises a combined fuel hose and an exhaust hose, the exhaust hose defining an outer annular passage in which the fuel hose is contained wherein the fuel hose and the exhaust hose are both connected to the multi-function nozzle assembly at a common connection point.

In addition, in embodiments, the multi-function nozzle assembly further comprising a handle having a trigger, and a linkage connected to the trigger and to the fuel nozzle, wherein movement of the trigger causes a corresponding movement at the fuel nozzle along the exhaust passage of the exhaust nozzle.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1A:
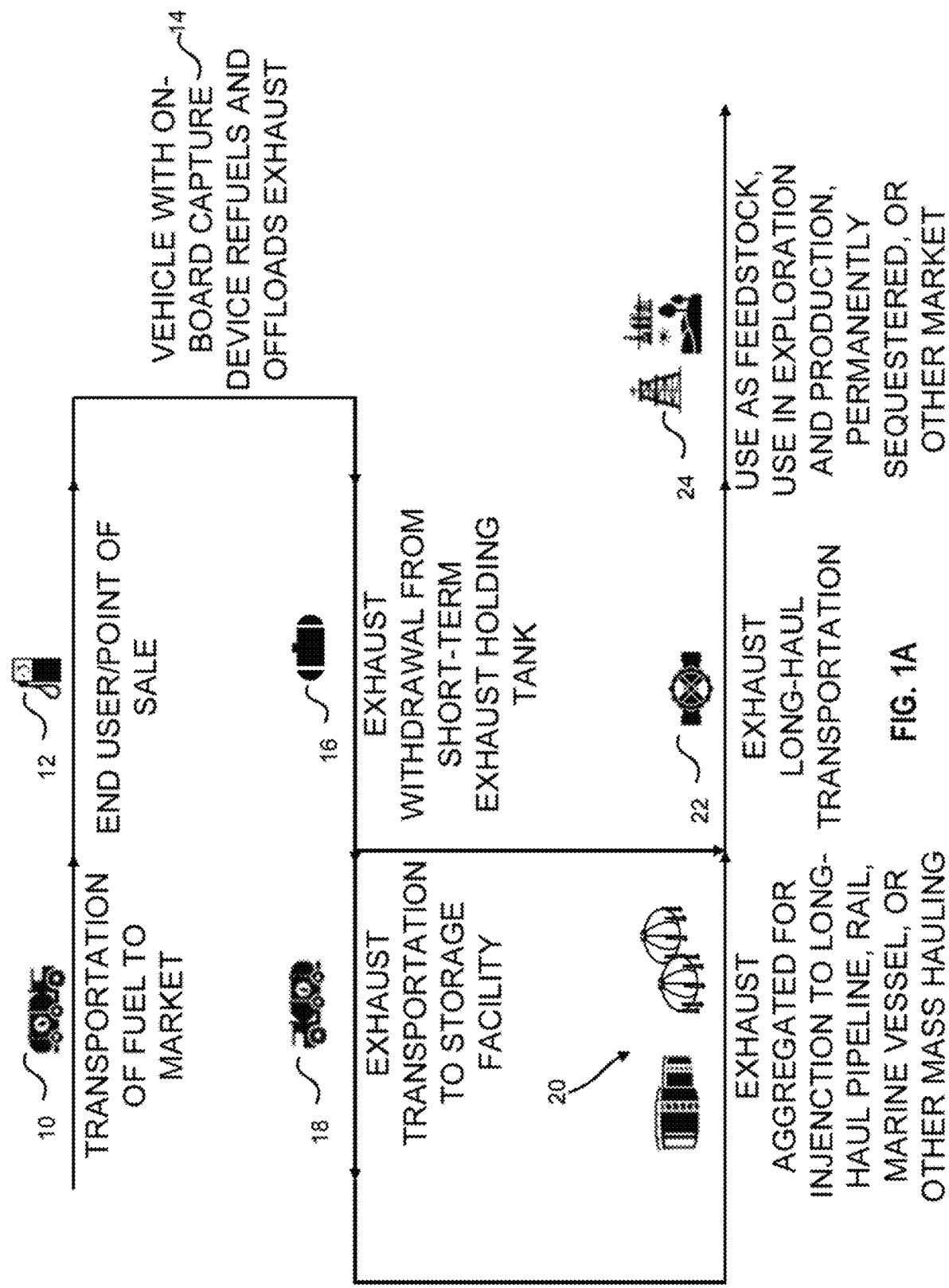
FIG. 1A is a diagram illustrating one or more embodiments to capture exhaust or greenhouse gas at an exhaust pump or receiver and to transport the exhaust or greenhouse gas for further re-use or sequestration, according to one or more embodiments of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

When facing a decision on how to move goods, products, and/or people a consumer, and/or organization may evaluate such a decision based on a vehicle's total cost of ownership, reliability, total greenhouse gas emissions, and/or other factors. When attempting to offset or prioritize greenhouse gas emissions, the user and/or organization may purchase or utilize an alternative fuel vehicle (e.g., fuel cell or battery electric vehicles). Further, while such an alternative fuel vehicle may be considered a low or no greenhouse gas emission vehicle, manufacturing of alternative fuel vehicles, particularly electric vehicles, and components, as well as the production of the electricity to charge electric vehicles, may produce some level of greenhouse gases, as illustrated in FIG. 1B chart 26. For example, full deployment (e.g., exiting manufacturing) of an electric vehicle may produce approximately or about 50 percent or more carbon dioxide equivalent (CO2e) emissions than a comparable internal combustion engine vehicle, and unless the infrastructure to provide electricity to charge such an electric vehicle is materially revamped such that operation is based on 100 percent renewable power sources, the electricity to power/charge an electrical vehicle may likely include some amount of CO2e emissions. The systems and methods described herein provides a scalable and meaningful greenhouse gas capture and reduction platform. The effectiveness of such a greenhouse gas capture and reduction platform may be determined utilizing a 'cradle to grave analysis', which takes into account the full life-cycle of a vehicle and therefore the total CO2e of different types of vehicles. Chart 26 utilizes publicly available information and considers a vehicle life-cycle of about 150,000 miles. The y-axis measurement of chart 26 represents kilograms of CO2e and the x-axis compares an internal combustion engine vehicle fueled with diesel, gasoline, or renewable diesel to an electric vehicle with varying battery-mile ranges, e.g., about 60, about 70, about 85, about 100, and about 200 kilowatt-hours. By utilizing the systems and methods described herein, the internal combustion engine vehicle may include a large and/or meaningful impact on total emissions associated with transportation as shown in chart 26. As a function of capture efficiency, an internal combustion vehicle may outperform an electric vehicle in relation to life-cycle CO2e emissions.

The present disclosure is directed to systems and methods to allow a motorist or other users to off-load combustion products, e.g., exhaust or different components or chemicals in exhaust, and/or other captured greenhouse gases directly from the air, both of which may be captured and stored on-board the motorist vehicle or other vehicle. In another embodiment, the combustion products and/or the captured greenhouse gases may primarily include carbon dioxide. Further, the combustion products and/or the captured greenhouse gases may include portions of nitrogen and/or water, among other chemicals. The stored, captured, and/or or off-loaded exhaust may be in various forms when off-loaded, including a gas, compressed fluid/gas, solid, or liquid. The systems may be located in or the methods performed at various and multiple locations, allowing for wide adoption and scale, ease of installation, and/or wide accessibility. For example, the systems and methods may be located or performed at a convenience store, a truck stop, terminal during a typical refueling, at a service station while services are performed or issues relating to the vehicle are resolved, at a common node for mass transit vehicles (e.g., a destination hub), and/or at varying other locations related to or not related to vehicle use that allows for wide-spread access. The systems and methods may include a combined fuel and exhaust pump or dispenser/receiver, separate fuel and exhaust pumps or dispensers/receivers, or a fuel pump/dispenser/receiver island, i.e., a row of fuel pumps or dispensers including a corresponding one or more exhaust pumps or receivers. The exhaust pumps/receivers may also be separate from fuel pumps/dispenser or not co-located with fuel pumps/dispensers. An exhaust pump/receiver, whether co-located with a fuel pump/dispenser or not, may include an exhaust nozzle. The exhaust nozzle may correspond to a vehicle exhaust port. The vehicle exhaust port may allow for transport or off-loading of captured exhaust from an on-board vehicle exhaust capture device. Such an on-board vehicle exhaust capture device may capture or collect exhaust. The on-board vehicle exhaust capture device may further be configured to capture carbon dioxide directly from the air. The exhaust nozzle, as noted, may correspond to and/or align with and be sealingly engageable with the vehicle exhaust port, thus creating an air-tight seal between the exhaust nozzle and the vehicle exhaust port. Such an air-tight seal may prevent leakage of exhaust or carbon dioxide and provide a safe transfer of exhaust or carbon dioxide from the vehicle to the exhaust pump; considered as a closed system. The exhaust nozzle may connect to a pipe, such as a flexible hose able to withstand high pressure and/or low temperatures.

In an embodiment, the exhaust may be off-loaded as a gas. In such embodiments, the pipe may connect to a compressor. The compressor may compress the fluid from the vehicle. The compressor may be a multi-stage compressor. The multi-stage compressor may include one or more compressors connected via intercoolers. Each of the compressors may compress gas or fluid to different pressures. For example, a first compressor may be a low pressure compressor and a second compressor may be a high pressure compressor. The compressor, if present, or the pipe may connect to an exhaust holding tank. The exhaust holding tank may store the exhaust until retrieved or transported, e.g., such as by a delivery vehicle, pipe or pipeline, rail, or marine vessel. A meter may be disposed at some point between the exhaust nozzle and the compressor or pump or exhaust holding tank. The meter may clamp on or may be integrated in or on the pipe and measure an amount of exhaust flowing from the vehicle to the exhaust holding tank.

In another embodiment, the exhaust may be off-loaded as a liquid. The liquid may include carbon dioxide and/or portions of nitrogen and/or water, among other chemicals. In such embodiments where water may be included in the exhaust, the pipe may connect to dryer. The dryer may remove water from the liquid. The dryer may use a desiccant to remove any water in the liquid. The liquid may then travel to a knock-out drum to separate any gas or vapor that may form in or may be included along with the liquid. The remaining liquid may then be pumped to a storage tank. Any gas or vapor may be transported from the knock-out drum to an intermediate storage tank. The gas or vapor may flow to a refrigeration unit. The refrigeration unit may condense the gas or vapor to form a liquid, which may be pumped to the storage tank. The storage tank may store the liquid at a specified or selected temperature and/or pressure until subsequent transportation to market.

Figure 1B:
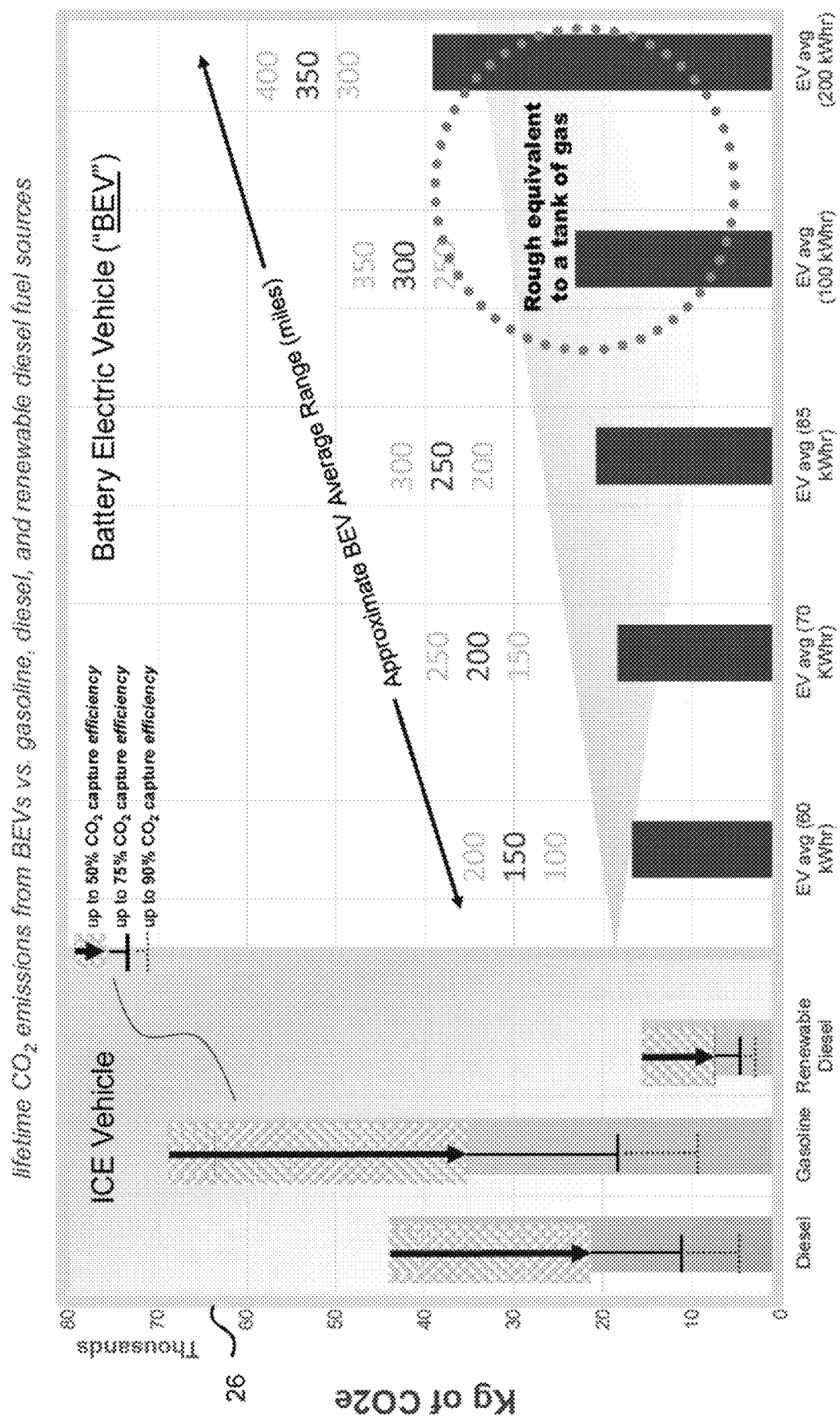
FIG. 1B is a chart illustrating the amount of carbon dioxide emitted directly and/or indirectly from different vehicles.

FIG. 1A is a diagram illustrating one or more embodiments to capture exhaust or greenhouse gas at an exhaust pump or receiver and transport the exhaust or greenhouse gas for further re-use or sequestration, according to one or more embodiments of the disclosure. A delivery vehicle, truck, pipeline, rail, marine vessel, or other means of transportation 10 may deliver fuel to a market, end user, or point of sale 12, e.g., a convenience store, truck stop or terminal, a railway station, a bus or semi-truck depot, an airport, a dock or marine vessel refueling site, or other location where a vehicle may be re-fueled. A vehicle or motorist vehicle may re-fuel at such sites. Further, such sites may include exhaust or greenhouse gas off-loading and storage capabilities (see 14). The exhaust or greenhouse gas off-loading and storage capabilities may also be disposed, deployed, positioned, or installed in locations other than where vehicles or motorist vehicles may be fueled. The exhaust or greenhouse gas may be withdrawn from the holding tanks at the convenience store or other locations noted above (see 16). Another delivery vehicle, truck, pipeline, rail, marine vessel, or other means of transportation 18 may transport the exhaust or greenhouse gas from the holding tank. The exhaust or greenhouse gas may be aggregated within downstream tanks 20. Once an amount of the exhaust or greenhouse gas and a use for the exhaust or greenhouse gas is determined, the exhaust or greenhouse gas may be injected into a long-haul pipeline or transported via rail, marine vessel, or other mass hauling method (see 22). In another embodiment, the exhaust or greenhouse gas may be injected into a long-haul pipeline or transported via rail, marine vessel, or other mass hauling method (see 22) directly from the holding tanks, rather than being aggregated in tanks 20. The exhaust or greenhouse gas may be used as a feedstock, in exploration and production of hydrocarbons, e.g., enhanced oil recovery, for permanent sequestration (see 24), and/or for utilization in other processes or markets. The illustration of FIG. 1A may represent a closed loop of a fuels lifecycle, e.g., such as the path or life of a fuel from wellhead to combustion and/or carbon capture.

FIG. 2A, FIG. 2B, FIG. 2C, and FIG. 2D are schematic diagrams that illustrate scalable greenhouse gas capture systems for off-loading captured exhaust from a motorist vehicle or other vehicle to an exhaust holding tank and transporting the exhaust from the exhaust holding tank via a delivery vehicle or transportation mechanism or device for re-use, recycle, or permanent storage, according to one or more embodiments of the disclosure. A scalable greenhouse gas capture system 100 may include sets, rows, or islands of motor fuel and exhaust dispensers/receivers or fuel and exhaust pumps 106. The term motor fuel and exhaust dispenser/receiver may be used interchangeably with the term fuel and exhaust pumps 106. The fuel and exhaust pumps 106 may include various components to allow a motorist vehicle 101 or to off-load combustion products, e.g., exhaust, and/or other greenhouse gases from the air that are captured and stored in an on-board vehicle exhaust capture device 104, as well as to allow the motorist vehicle 101 or other vehicle to re-fuel.

In addition to motorist vehicle 101 utilizing the scalable greenhouse gas capture system 100, a variety of different types of vehicles, motor driven devices, or other mechanisms may utilize the scalable greenhouse gas capture system 100. A vehicle may include a car, a truck, a heavy vehicle (e.g., delivery vehicle 132, semi-truck, or eighteen wheeler), a bus, heavy equipment, an internal combustion engine/electric hybrid, battery powered electric vehicle, and/or other vehicle types. Further, the fuel and exhaust pump 106 or a separate exhaust pump may be located in a variety of locations, such as at a convenience store, bus or truck terminal, truck stop, seaport, river port, service station or store, motorist vehicle dealership, parking lot or garage, airport, and/or any other location where a motorist vehicle 101 or other vehicle may travel. While description herein includes off-loading exhaust from a motorist vehicle 101, it will be understood by those skilled in the art that exhaust may be off-loaded from the other types of vehicles, described herein, or other equipment, e.g., such as airplanes, boats/ships/marine vessels, or any other vehicle that may produce exhaust or greenhouse gases, equipment, heavy equipment, or any other mobile, moveable, non-static or dynamic exhaust or greenhouse gas capture device.

The motorist vehicle 101 may include, as noted, an on-board vehicle exhaust capture device 104, an on-board carbon capture device, or an on-board greenhouse gas capture device. As will be understood, on-board vehicle exhaust capture device 104 may be used interchangeably with on-board carbon capture device and/or on-board greenhouse gas capture device. The on-board vehicle exhaust capture device 104 may be one of a variety of devices to capture exhaust or other components of exhaust from an internal combustion engine of a motorist vehicle or other vehicle. One such device may capture the total or varying portions of exhaust produced by the internal combustion engine. In such embodiments, the cost of the on-board vehicle exhaust capture device 104 may be off-set by the lack of expense for a catalytic converter, which may potentially no longer be required. In another embodiment, the on-board vehicle exhaust capture device 104 may be designed or configured to capture carbon dioxide or filter carbon dioxide from exhaust and then capture the filtered carbon dioxide. Such configurations may additionally capture some portion of nitrogen and/or water, among other chemicals (e.g., $SO_x$, $NO_x$, etc.). The on-board vehicle exhaust capture device 104 may be disposed downstream of the catalytic converter of the motorist vehicle 101. The on-board vehicle exhaust capture device 104 may capture the exhaust or a portion of the exhaust produced after exhaust produced by an internal combustion engine passes through the catalytic converter. The on-board vehicle exhaust capture device 104 may be configured to capture carbon dioxide, greenhouse gases, all or portions of exhaust of an internal combustion engine vehicle, methane, carbon monoxide, nitrogen dioxide, sulfur dioxide, benzene, formaldehyde, polycyclic hydrocarbons, other particulate matter, other trace chemicals, and/or some combination thereof. The on-board vehicle exhaust capture device 104 may inadvertently capture trace amounts of other chemicals and/or water. The on-board vehicle exhaust capture device 104 may include a compressor to compress the exhaust or carbon dioxide, to ensure that a large quantity of carbon dioxide may be stored on the motorist vehicle 101. The on-board vehicle exhaust capture device 104 may include components to convert captured carbon dioxide, which may or may not include other chemicals (e.g., nitrogen), to a liquid. In such embodiments, a cooling or refrigeration unit may be included on-board the motorist vehicle 101 and/or on-site at the scalable greenhouse gas capture system 100 to ensure that the liquefied carbon dioxide may be stored at the proper temperature, as will be understood by those skilled in the art.

The on-board vehicle exhaust capture device 104 may include a filter media or catalyst to capture carbon dioxide within a solid, e.g., through adsorption or absorption. The filter or catalyst may be arranged in a fixed bed. Thus, the catalyst may be included as a fixed catalyst. As exhaust flows through the fixed catalyst or filter media, carbon dioxide may be adsorbed within pores of the catalyst or filter media or otherwise attach to or bond to the catalyst/filter media. To remove the carbon dioxide, the on-board vehicle exhaust capture device 104 may include a heating element to heat the catalyst or medium storing the carbon dioxide to release the carbon dioxide, e.g., the carbon dioxide to be released as a gas. Thus, heat may be efficiently used through an existing on-board process and recycled to the unit instead of "wasted". In another embodiment, the fixed catalyst may be included in a removable module. To remove carbon dioxide stored in the fixed catalyst, a user may remove the removable module and place or insert the module in a corresponding receptacle at the fuel and exhaust pump 106. Upon reception of the removable module, the fuel and exhaust pump 106 may offer a new removable module for insertion into the motorist vehicle or other vehicle. In one or more embodiments, the filter or catalyst may be included in a fluid. The fluid may capture or absorb the carbon dioxide as carbon dioxide passes through the fluid. To remove the carbon dioxide, the on-board vehicle exhaust capture device 104 may include a heating element to heat the fluid storing the carbon dioxide to release the carbon dioxide, e.g., the carbon dioxide to be released as a gas. In another example, the carbon dioxide may be removed from the fluid via components or devices at the scalable greenhouse gas capture system 100. For example, if the carbon dioxide/greenhouse gases are captured in a fluid or fluid carried catalyst, a motorist or user may off-load the fluid/catalyst at the fuel and exhaust pump 106. The fluid/catalyst may be transported to a tank or intermediate holding tank. The fluid/catalyst may be heated in the tank to extract the carbon dioxide from the fluid/catalyst. The carbon dioxide may then be transferred to an exhaust holding tank 122. Further, the fuel and exhaust pump 106 may be configured to provide either new fluid/catalyst or recycled fluid/catalyst, e.g., fluid/catalyst that has had carbon dioxide removed. In yet another example, the scalable greenhouse gas capture system 100 may capture carbon dioxide from a similar motorist vehicle or other vehicle that includes a liquid arranged and designed to capture greenhouse gases/carbon dioxide. In such examples, the motorist vehicle or vehicle may include a regenerative loop. As an absorbent liquid flows through a cool part or portion of a loop, the liquid may absorb carbon dioxide/greenhouse gases. The liquid may then flow to a hot part or portion of the loop. As the liquid heats up, the liquid may release the absorbed carbon dioxide/greenhouse gases. The released carbon dioxide/greenhouse gases may flow to a compressor and/or be stored on-board the vehicle.

The on-board vehicle exhaust capture device 104 may capture anywhere up to 100% of the exhaust of a motorist vehicle 101. In one or more embodiments, the on-board vehicle exhaust capture device 104 may capture at least 10%, at least 20%, at least 25%, at least 30%, at least 40%, at least 50%, at least 60%, at least 70%, at least 75%, at least 80%, at least 90% or more of the carbon dioxide in the exhaust that results from on-board vehicle combustion. The on-board vehicle exhaust capture device 104 may include a bypass device to allow for exhaust to be released to the atmosphere when the on-board vehicle exhaust capture device 104 is at capacity. The on-board vehicle exhaust capture device 104 may include a range limiter to prevent the motorist vehicle 101 from traveling past a specified distance when the on-board vehicle exhaust capture device 104 is at capacity. The on-board vehicle exhaust capture device 104 may store an amount of exhaust or carbon dioxide, e.g., such as about 100 pounds or less, about 500 pounds, about 1,000 pounds, about 5,000 pounds, or more. In any of the embodiments described herein, the scalable greenhouse gas capture system 100 may be configured to off-load any form of captured exhaust, e.g., compressed gas or liquid, adsorbed into solids adsorbents, etc. In other embodiments, the scalable greenhouse gas capture system 100 may include a plurality of pumps, compressors, nozzles, and/or other options to accommodate varying and/or different types of on-board vehicle exhaust capture devices.

As noted, the off-loaded exhaust may be in various forms, such as a gas, liquid, or solid. The off-loaded exhaust may include or may comprise carbon dioxide. In addition to the carbon dioxide, the off-loaded exhaust may include amounts of oxygen, nitrogen, and/or water. The liquid may comprise different combinations of carbon dioxide and other chemicals, including, but not limited to, mixtures comprising about 96 mol % carbon dioxide and about 4 mol % nitrogen; about 93 mol % carbon dioxide, about 4 mol % nitrogen, and about 3 mol % water; or about 95 mol % carbon dioxide, about 4 mol % nitrogen, and about 1 mol % water. Further, as environmental conditions (e.g., ambient temperatures) vary, the mixture composition may vary (e.g., as temperatures increase the liquid may include more water in relation to carbon dioxide, while the amount of water may be reduced in cooler temperatures). In an embodiment, the exhaust may include a portion or amount of water. In such examples, prior to further storage or processing at the scalable greenhouse capture system 100, the water may be removed. If water is left in exhaust (e.g., liquid carbon dioxide), the water may freeze and cause a blockage or may cause other issues, such as corrosion to the pipe and equipment. To remove the water, the on-board vehicle exhaust capture device 104 or the fuel and exhaust pumps 106 may include a dryer. The dryer may include a desiccant or be otherwise configured to remove the water, thus ensuring proper and continued operation of the scalable greenhouse capture system 100.

While a vehicle 101, such as a car, truck, boat or other motorist driven vehicle may include an on-board vehicle exhaust capture device 104 to capture exhaust produced by an internal combustion engine, the on-board vehicle exhaust capture device 104 may also be configured to capture specific chemicals or greenhouse gases directly from the air, i.e., the atmospheric air exterior to the motorist vehicle 101 or vehicle. In such embodiments, the on-board vehicle exhaust capture device 104 may be included in or on a variety of vehicles, e.g., such as an electric vehicle, a fuel-cell based vehicle, a natural gas based vehicle, a hydrogen powered vehicle any other alternative fuel based vehicle, heavy vehicles, trucks, eighteen wheelers, marine vessels, airplanes or aircraft, and/or some combination thereof. During operation of the vehicle 101, air may flow into or through the on-board vehicle exhaust capture device 104. The on-board vehicle exhaust capture device 104 may capture greenhouse gases, e.g., carbon dioxide, from the air flow. For convenience, such greenhouse gases captured in this way may be referred to as exhaust gases. In another embodiment, the on-board vehicle exhaust capture device 104 may solely capture other chemicals or greenhouse gases from the air. As used herein, "fuel" may include a variety of different materials or energy utilized to power a vehicle, or equipment, e.g., gasoline, diesel, ethanol, combinations of different renewable and non-renewable fuels, electricity, hydrogen, Liquefied petroleum gas, natural gas, and/or some combination thereof.

When a vehicle 101 parks or stops adjacent to the fuel and exhaust pump 106, a motorist or user of the vehicle 101 may exit the vehicle 101 and interact with the user interface 102 of the fuel and exhaust pump 106 or fuel and exhaust dispenser/receiver. The user interface 102 may include various options, actions, and/or information. The user interface 102 may prompt the motorist or user to pay for fuel, prompt the motorist or user to pay or receive payment or reward to off-load exhaust, prompt the motorist or user to insert a fuel nozzle 110 into the motorist vehicle's 101 corresponding fuel port 128, prompt the motorist or user to insert an exhaust nozzle 108 into the motorist vehicle's 101 corresponding exhaust port 130, provide analysis and statistics regarding off-loaded exhaust, provide an off-loaded exhaust history of the motorist, other motorists, and/or users, provide incentives based on off-loaded exhaust of the vehicle 101, and/or offer receipt after fuel or energy has been provided and/or exhaust off-loaded. The user interface 102 may include options to transact payment, via either credit card, debit card, mobile payment applications, cryptocurrency, and/or other forms of suitable payment. In another embodiment, a keypad and magnetic strip scanner and/or chip reader, or other form of payment recognition, such as contactless payment, may be included on the fuel and exhaust pump 106 to transact payment.

After the motorist or user initiates payment and selects fuel and/or exhaust off-load options, as noted, the motorist or user may be prompted to insert the fuel nozzle 110 into the vehicle's 101 corresponding fuel port 128 and/or insert an exhaust nozzle 108 into the vehicle's 101 corresponding exhaust port 130, based on whether the motorist or user selects to fuel the vehicle 101 and/or off-load exhaust from the motorist vehicle 101. The fuel nozzle 110 and/or the exhaust nozzle 108 may include sensors or pins to determine or provide data to a computing device to determine whether each respective nozzle has been inserted into the corresponding port on the vehicle 101. In another embodiment, the user interface 102 may issue a prompt to the motorist or user to indicate when the fuel nozzle 110 and/or exhaust nozzle 108 is inserted into the corresponding port on the vehicle 101. In another embodiment, the exhaust nozzle 108 may include additional safety features to ensure that the exhaust or carbon dioxide, whether compressed, not compressed, or in a liquid form, does not leak during an off-load operation. Such features may allow the exhaust nozzle 108 to sealingly engage with the exhaust port 130 of the vehicle 101. For example, the exhaust nozzle 108 may include a male portion surrounded by a gasket, o-ring, or another surround to create a seal between the exhaust nozzle 108 and exhaust port 130 of the vehicle 101, the exhaust port 130 including a female portion corresponding to the male portion of the exhaust nozzle 108. The seal, as noted, may prevent leakage of exhaust or carbon dioxide, thus preventing potential injury or harm to a motorist or user and/or loss of exhaust or carbon dioxide to atmosphere.

In another embodiment, the exhaust nozzle 108 may include threads, teeth, ramps, linkages, or magnets. The threads may correspond to threads disposed or located on the inside of the exhaust port. As a motorist or user inserts the exhaust nozzle 108 into the exhaust port 130, a portion of the exhaust nozzle 108 may be retained within the exhaust port 130 and may align the threads of the exhaust nozzle 108 with the inner threads of the exhaust port 130. The user may then twist another portion or movable portion of the exhaust nozzle 108 to tighten the exhaust nozzle 108 in the exhaust port 130 to create a seal and/or lock. Other features may be included on the exhaust nozzle 108, such as locking or latching components. The locks or latches may correspond to features included in the exhaust port 130 of the vehicle 101. As the exhaust nozzle 108 is inserted into the exhaust port 130, the locking or latching features of the exhaust nozzle 108 may lock or latch into or onto the corresponding features of the exhaust port 130, thus preventing a motorist or user from removing the exhaust nozzle 108 during exhaust off-load. In such embodiments the exhaust nozzle 108 may include a feature to unlock or unlatch the exhaust nozzle 108 from the exhaust port 130. Such a feature may be actuated via control signals from the fuel and exhaust pump 106, via the user interface 102, and/or via a button, switch, or handle on the exhaust nozzle 108. In another embodiment, the exhaust nozzle 108 may be a quick release nozzle. In yet another embodiment, the exhaust nozzle 108 may include notches or teeth corresponding to protrusions in the exhaust port 130. As a motorist or user inserts the exhaust nozzle 108 into the exhaust port 130, the notches may align with the protrusions. Further, channels along the exhaust nozzle may allow for the motorist or user to perform a semi or quarter turn to lock and/or seal the exhaust nozzle 108 in place.

After a motorist or user has inserted the fuel nozzle 110 into the vehicle's 101 corresponding fuel port 128 and/or the exhaust nozzle 108 into the vehicle's 101 corresponding exhaust port 130, the fuel and exhaust pump 106 may begin pumping/dispensing fuel to the vehicle 101 and/or pumping/receiving exhaust from the vehicle 101. The fueling and exhaust off-load operation may take place in a sequential order. For example, the fuel may be pumped to the vehicle 101 first, followed by pumping the exhaust from the motorist vehicle 101. In another embodiment, the exhaust may be removed first, while the fuel is pumped afterwards. In yet another embodiment, such operations, e.g., exhaust removal and/or fuel dispensing, may occur simultaneously, substantially simultaneously, may overlap for a period of time, or one operation may occur while the other does not (e.g., re-fueling with no exhaust offload or exhaust offloading with no re-fueling).

During exhaust off-loading and/or re-fueling or re-charging, the user interface 102 may include or display various characteristics or statistics related to exhaust off-load and/or fuel dispensing. For example, the user interface 102 may display the amount of exhaust or carbon dioxide that a user has off-loaded. The user interface 102 may display the amount of exhaust or carbon dioxide that has been off-loaded in a city, in a state, in a country, and/or worldwide. The user interface 102 may display the impact of such off-load operations, e.g., that a certain amount of off-loaded exhaust or carbon dioxide is equivalent to planting a certain number of trees, removing a number of conventional internal combustion engine vehicles from the road, and/or reducing the carbon intensity of particular fuels utilized, or, through separate use of machine learning and/or artificial intelligence, offer lifetime carbon emissions/savings compared to certain accepted baselines. The user interface 102 may display a rolling total of exhaust off-loaded in the current operation and, if a cost is associated with exhaust off-loading, the cost. The user interface 102 may also display advertisements and/or other messages. The user interface 102 may also display a motorist's or user's reward points in relation to exhaust or carbon dioxide off-load. In such examples, as a motorist or user off-loads exhaust, the motorist or user may receive incentives, payment, or rewards (for the amount of off-loaded exhaust) from the convenience store, the entity owning or operating the fuel and exhaust pump 106, or the entity owning or operating an exhaust pump. Such incentives or rewards may include discounts on fuel or discounts on goods or services sold at the store associated with the fuel and exhaust pump 106. Further, such incentives may be offered by third parties for particular amounts of off-loaded exhaust. Stated another way, a motorist or user may be given an option to off-load a particular amount of exhaust for an incentive from a third party. For example, a motorist or user may be offered a number of points or miles, by an airline, for corresponding amounts of off-loaded exhaust. Such amounts may be accounted for within a single off-loading session or cumulatively over multiple off-loading sessions through a deployed program.

The fuel and exhaust pump 106 may include pipes, e.g., fuel pipe 114 and exhaust pipe 112, connected to and in fluid communication with the fuel nozzle 110 and exhaust nozzle 108, respectively. The fuel pipe 114 may connect to and be in fluid communication with a fuel tank 120 or one or more fuel tanks. The fuel pipe 114 may be a flexible hose or other flexible pipe. Fuel of the scalable greenhouse gas system 100 may be stored in a fuel tank 120, below- or above-grade fuel tanks, or fuel holding tanks. Fuel tank 120 may include, hold, or store varying types and combinations of gasoline, diesel, ethanol, and/or other bio or renewable fuels, or hydrogen or ammonia. The scalable greenhouse gas capture system 100 may include one or more different fuel tanks, each storing the same or different fuel types. Fuel may flow from the fuel tank 120 through, for example, pipe 118 to the fuel and exhaust pump 106 and, thus, through fuel pipe 114 to the fuel nozzle 110 to the motorist vehicle 101. The exhaust pipe 112 may connect to and be in fluid communication with an underground exhaust holding tank 122, an above-ground horizontally oriented exhaust tank 134, and/or an above-ground vertically oriented exhaust tank 136. The exhaust pipe 112 may be a flexible hose, a flexible pipe, or any type of pipe able to withstand, potentially, high pressure and/or low temperatures. The exhaust holding tank 122 may include or have a capacity to store an amount of captured exhaust. The exhaust holding tank 122 may be configured to or have a capacity to hold exhaust from a number of vehicles e.g., such as, 50 vehicles, 100 vehicles, 200 vehicles, 500 vehicles, or more. The exhaust holding tank 122 may be configured to hold an amount of exhaust equivalent to a number of motorist vehicles off-loading exhaust each day for about several days, 1 week, 2 weeks, 1 month, or more. In such examples, the exhaust holding tank's 122 size may be determined based on how frequently a delivery vehicle may pick up the exhaust from the exhaust holding tank. The exhaust holding tank 122 may be configured to hold the exhaust at high pressure and/or low temperatures or, if the exhaust is off-loaded as a liquid, hold the exhaust at about 300 psig to about 350 psig at low temperatures. As exhaust or carbon dioxide is pumped/transported from the motorist vehicle 101, the exhaust may flow through the exhaust nozzle 108 to the exhaust pipe 112 to pipe 116 and finally to the exhaust holding tank 122. In an embodiment, the scalable greenhouse gas capture system 100 may include one or more fuel tanks and one or more exhaust holding tanks. In such embodiments, the one or more exhaust tanks may be located, disposed, or situated above-grade and/or below-grade.

In an embodiment, the fuel tank 120 may include a delivery vehicle port 124 or ports. The delivery vehicle port 124 or ports may allow for delivery vehicle connection. Such a connection may allow for the delivery vehicle 132 to transfer fuel to the fuel tank 120 from the delivery vehicle 132, e.g., to re-fill the fuel tank 120. In another embodiment, the exhaust holding tank 122 may include a delivery vehicle port 124 or ports. The delivery vehicle port 126 or ports may allow for delivery vehicle connection. Such a connection may allow for the delivery vehicle 132 to transfer exhaust or carbon dioxide from the exhaust holding tank 122 to the delivery vehicle 132, e.g., to empty the exhaust holding tank 122.

Figure 3A:
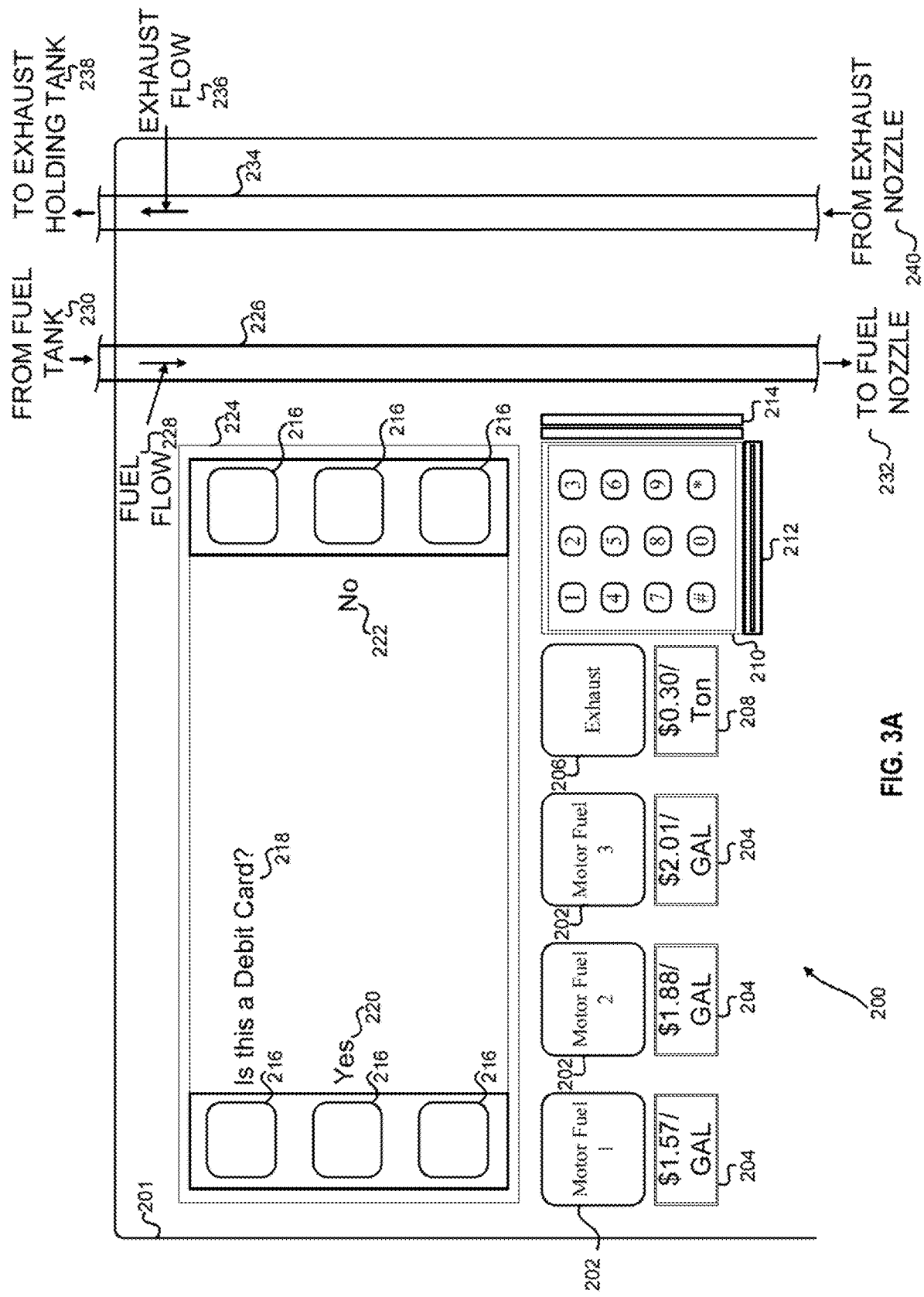
FIG. 3A and FIG. 3B are simplified diagrams that illustrate a novel implementation of a fuel and exhaust pump for transporting fuel to a vehicle and off-loading exhaust from the vehicle in which the fuel and exhaust pump include two separate nozzles for fuel and for exhaust, according to one or more embodiments of the disclosure.
Figure 3B:
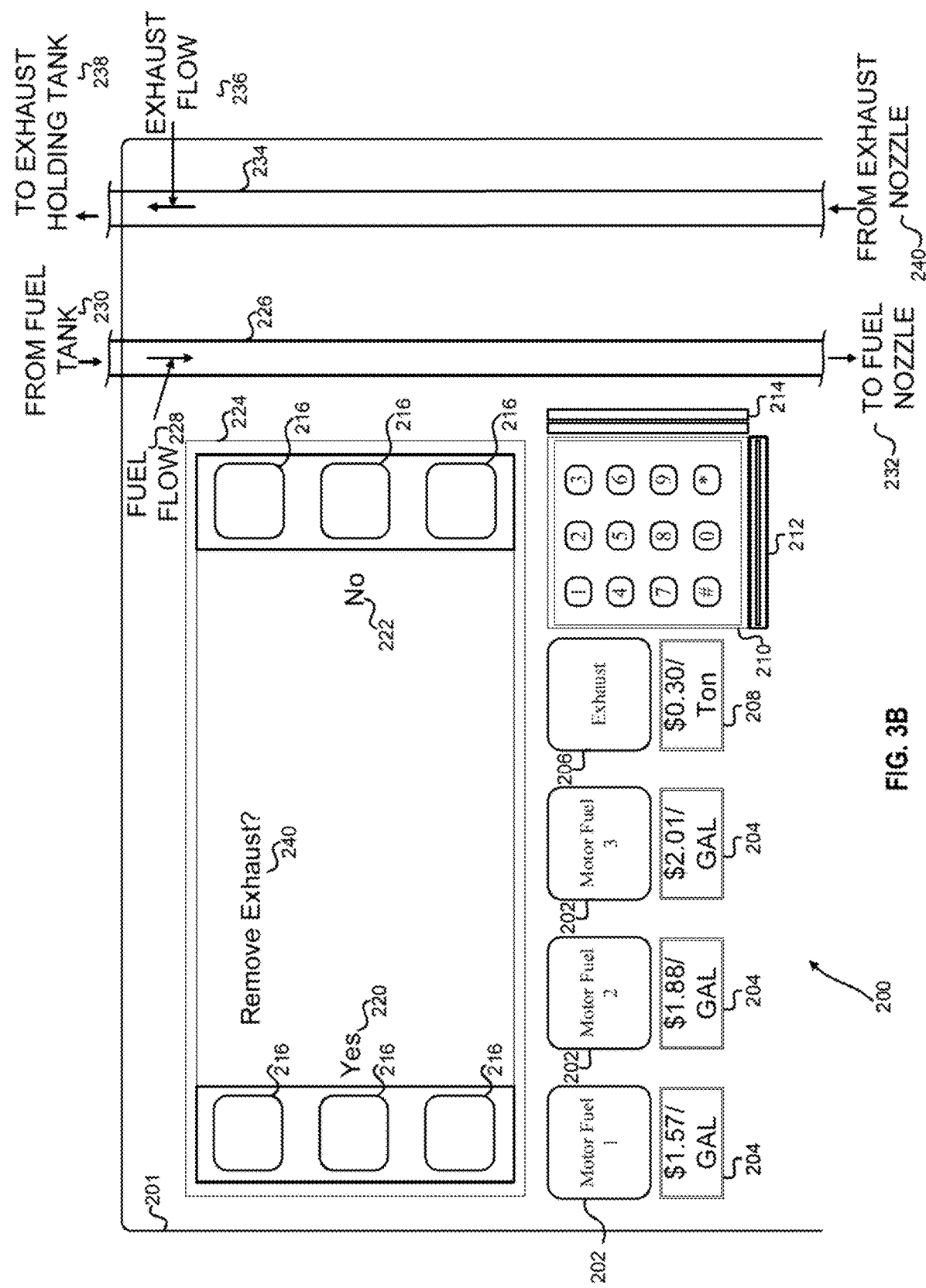
Figure 4A:
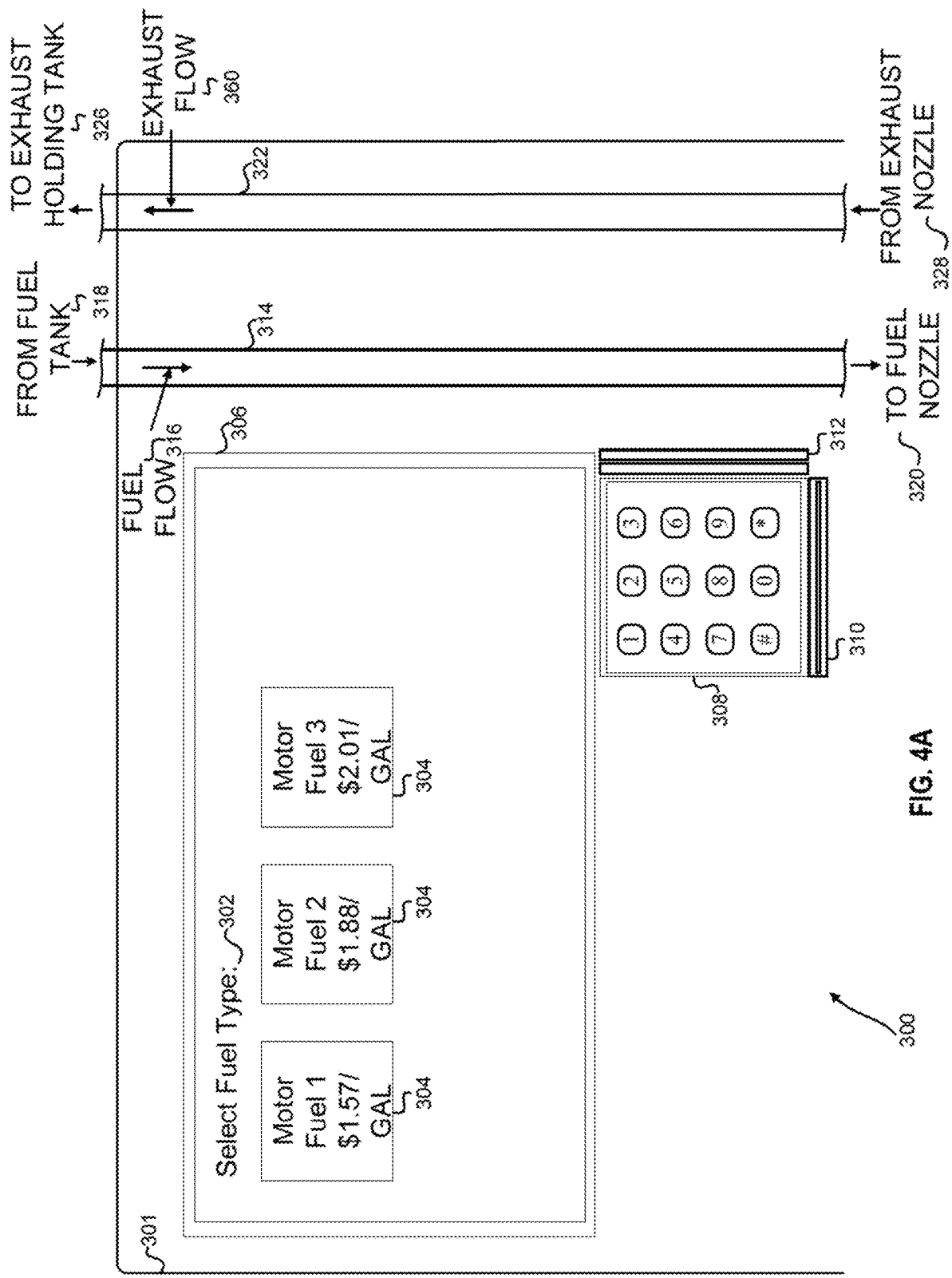
FIG. 4A, FIG. 4B, FIG. 4C, and FIG. 4D are simplified diagrams that illustrate a novel implementation of a fuel and exhaust pump for transporting fuel to a vehicle and off-loading exhaust from the vehicle in which the fuel and exhaust pump include two separate nozzles for fuel and for exhaust, and a touchscreen user interface for motorist or user interaction, according to one or more embodiments of the disclosure.
Figure 4B:
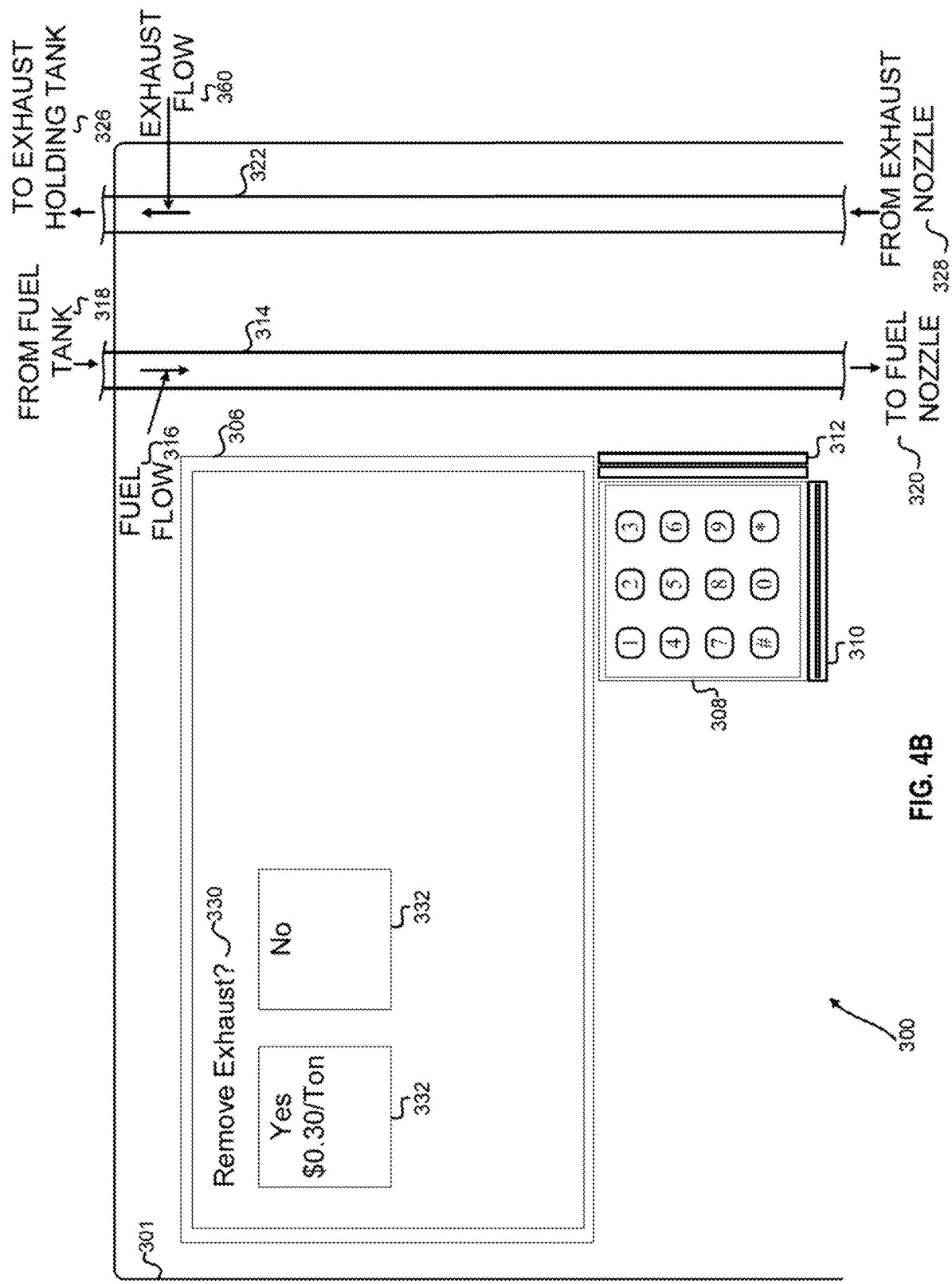
Figure 4C:
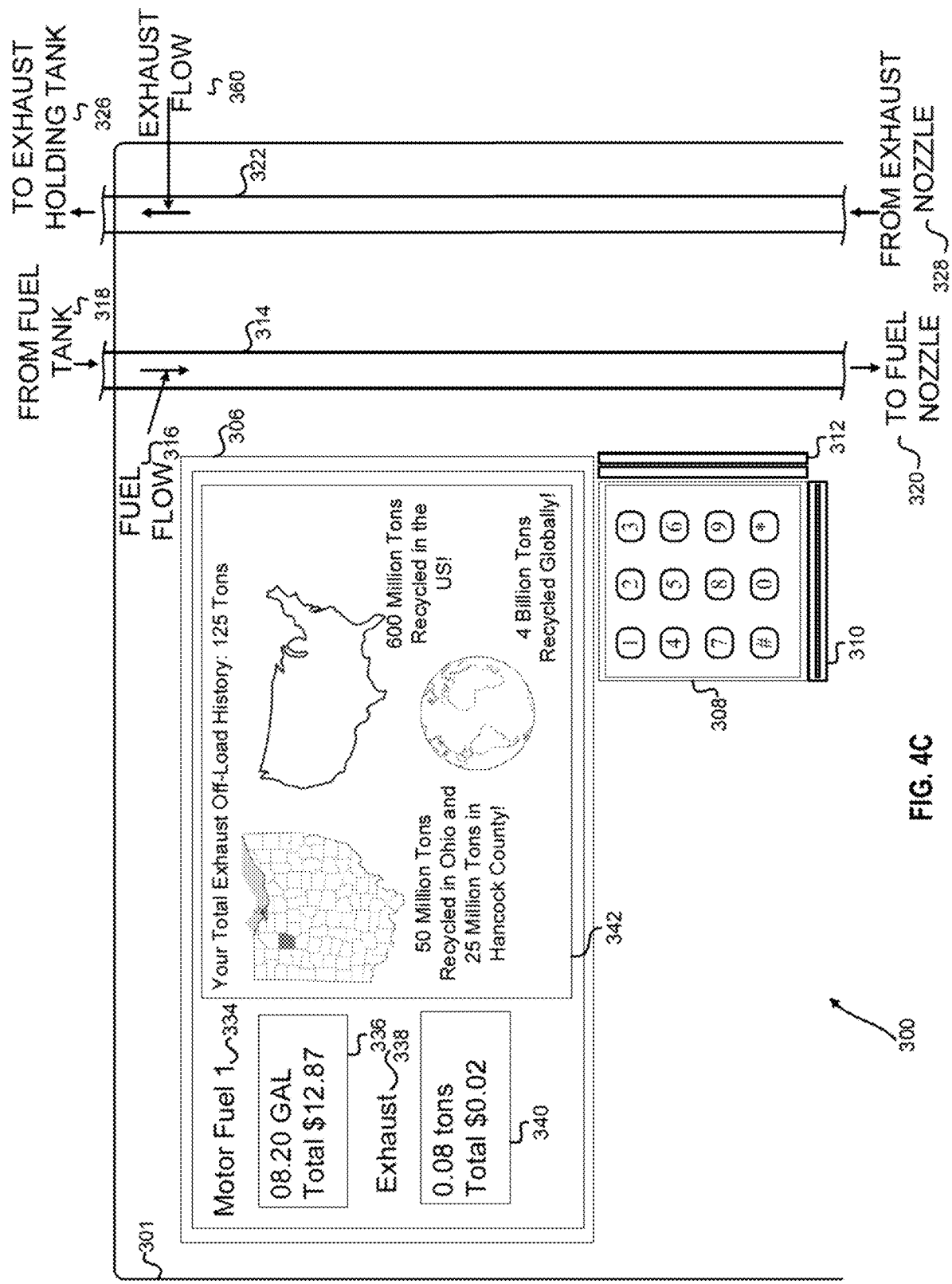
Figure 4D:
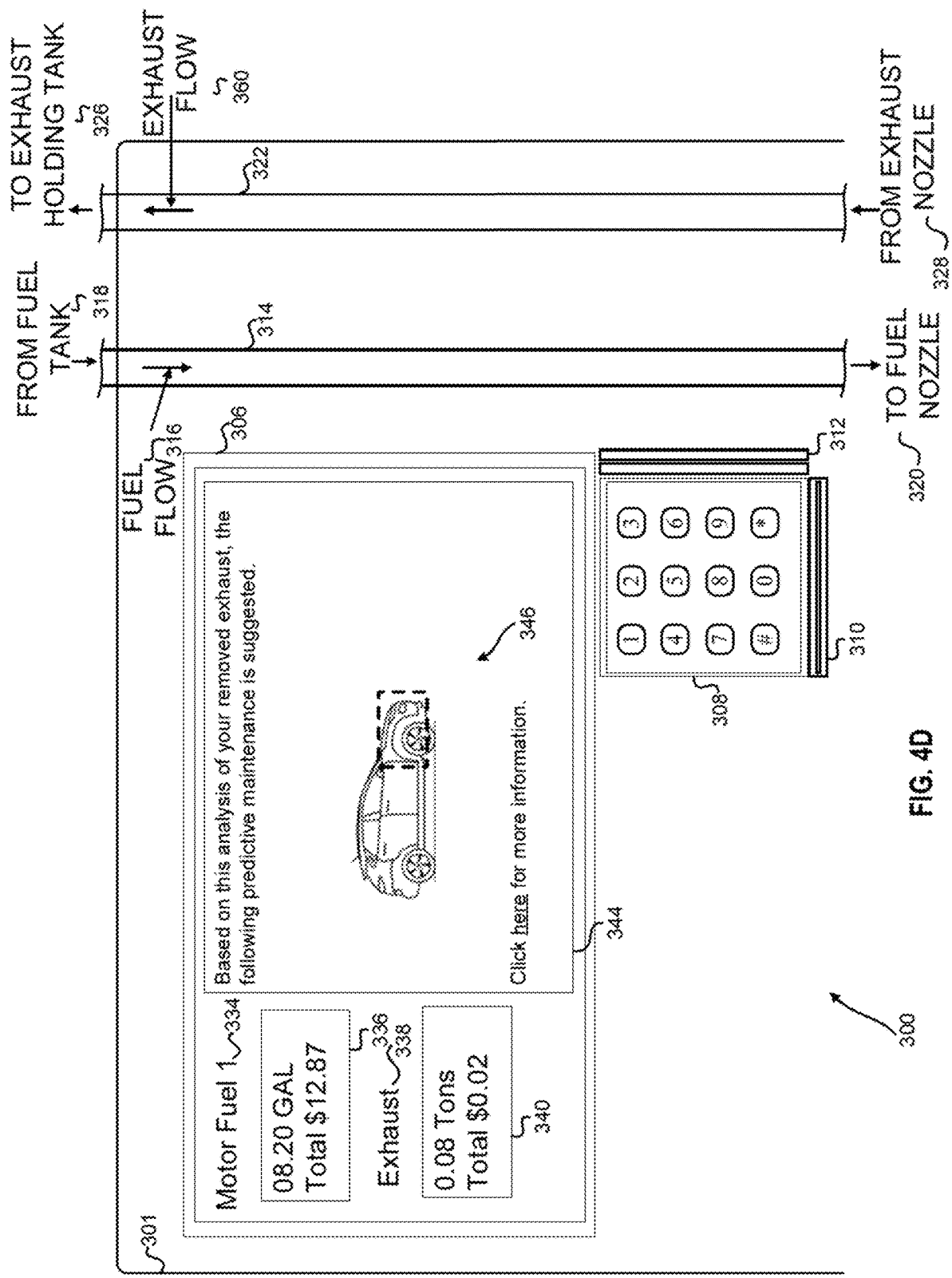

FIG. 3A and FIG. 3B are simplified diagrams that illustrate a novel implementation of a fuel and exhaust pump 200 for transporting fuel to a vehicle and off-loading exhaust from the vehicle in which the fuel and exhaust pump 200 has two separate nozzles for fuel and for exhaust, according to one or more embodiments of the disclosure. The fuel and exhaust pump 200 may be dual sided or include nozzles, user interfaces, and other components on both sides. The fuel and exhaust pump 200 may include a series of fuel selection buttons 202 and a series of fuel price displays 204. The series of fuel selection buttons 202 may allow for a user to select a particular fuel when prompted via the user interface 224. The series of fuel price displays 204 may update periodically to display an up-to-date fuel price. Another button, e.g., an exhaust or carbon dioxide button 206, and corresponding exhaust or carbon dioxide price display 208 may be included on the fuel and exhaust pump 200. The exhaust or carbon dioxide price display 208 may indicate that the user must pay an amount to off-load exhaust, will receive an amount back for off-loading exhaust, or may off-load exhaust free of charge. The amount received back may be a fixed amount, may be an amount per ton of exhaust off-loaded, or may be points used in a rewards program.

A user may push the exhaust or carbon dioxide 206 button to indicate to the fuel and exhaust pump 200 that the user will off-load exhaust or carbon dioxide. The fuel and exhaust pump 200 may also include a keypad 210, a card chip reader 212, and a card magnetic strip reader 214, or a touchscreen, or other device or digital and/or wireless interface (e.g., an application on a user's computing device and/or at an interface of the fuel and exhaust pump 200) designed or configured to accept user interaction and payment. Such components may allow a user to transact payment for user fuel and/or to off-load exhaust or carbon dioxide. In such examples, a user may drive a user vehicle in front of the fuel and exhaust pump 200. The display 224 may show or display a prompt noting that the user may insert a credit or debit card. Instructions may be included or provided on the fuel and exhaust pump 200 with respect to how such actions are to be performed. After insertion and removal of the credit or debit card, the display 224 may include a prompt 218 asking whether the card is a debit card. If the card is a debit card, which the user may indicate by depressing or pushing buttons 216 corresponding to "Yes" 220 or "No" 222, the display 224 may prompt the user to enter a pin number corresponding to the debit card into the keypad 210. Other prompts associated with other forms of payment may be displayed. Upon payment, the display 224 may prompt the user to select a type of fuel, via the series of fuel buttons 202. Upon selection of a fuel type, the display 224 may prompt 240 the user to select whether to off-load exhaust or carbon dioxide, either via the exhaust or carbon dioxide button 206 or via selection on the display 224 through buttons 216 corresponding to "Yes" 220 or "No" 222. In another embodiment, a user may want to only off-load exhaust or carbon dioxide. In such an embodiment, after selection of payment type and payment, the user may depress or push the exhaust or carbon dioxide button 206 and not select any of the series of fuel buttons 202.

The fuel and exhaust pump 200 may include two separate nozzles. A fuel nozzle (see 232) may connect to the fuel pipe 226 and an exhaust nozzle (see 240) may connect to the exhaust pipe 228. The fuel nozzle (see 232) may correspond to a vehicles fuel port. The other end of the fuel pipe 226 may connect to a fuel tank (see 230.) Such connections may allow for fluid communication between the fuel nozzle (see 232), the fuel pipe 226, and the fuel tank (see 230) or fuel holding tank. A selected fuel may have a fuel flow 228 through the fuel pipe 226 from the fuel tank (see 230) to the fuel nozzle (see 232). In such examples, the pipe may be comprised of varying and/or different segments. For example, a segment of the fuel pipe 226 visible to the customer or user may be a flexible pipe or flexible hose. Other segments or portions may be underground and may be rigid or flexible, depending on the type of material used for the fuel pipe 226 or site specific layouts. Such flexibility may allow a user to place the fuel nozzle 232 into the corresponding vehicle fuel port while the motorist vehicle or other vehicle is in a range near the fuel and exhaust pump 200.

The exhaust nozzle (see 240) may correspond to the exhaust port of a vehicle. An exhaust nozzle (see 240) may connect to and be in fluid communication with the exhaust pipe 234. The other end of the exhaust pipe 234 may connect to an exhaust holding tank (see 238). Such connections may allow for fluid communication between the exhaust nozzle (see 240), the exhaust pipe 234, and the exhaust holding tank (see 238) or exhaust tank. An exhaust flow 236 may flow through the exhaust pipe 234 from the exhaust nozzle 240 to the exhaust holding tank 238. In such examples, the exhaust pipe 234 may include varying and/or different segments. For example, a segment of the exhaust pipe 234 visible to the customer may be a flexible pipe or flexible hose. Other segments or portions may be underground and may be rigid or flexible, depending on the type of material used for the exhaust pipe 234 or site specific layouts. Such flexibility may allow a user to place the exhaust nozzle (see 240) into the corresponding vehicle exhaust port while the vehicle is in a range near the fuel and exhaust pump 200. Each segment utilized may be configured to withstand the pressure and/or temperature of the exhaust or carbon dioxide off-loaded.

In an embodiment, the fuel and exhaust pump 200 may initially include components related to fueling a vehicle or may be considered a fuel pump or fuel dispenser. The portions or components related to pumping exhaust may be retrofitted or be added to the fuel pump or fuel dispenser, thus creating the fuel and exhaust pump 200. In another embodiment, the portions or components related to pumping exhaust may be a part of a kit. The kit may be added to or installed on existing fuel dispensers. In other embodiments, the fuel and exhaust pump 200 may be constructed as illustrated in FIG. 3A through FIG. 3B. In yet other embodiments, an exhaust pump may not include portions or components related to fuel pumping or fuel dispensing. The exhaust pump may be a standalone system for removing exhaust.

FIG. 4A, FIG. 4B, FIG. 4C, and FIG. 4D are simplified diagrams that illustrate a novel implementation of a fuel and exhaust pump for transporting fuel to a vehicle and off-loading exhaust from the vehicle in which the fuel and exhaust pump includes two separate nozzles for fuel and for exhaust and a touchscreen user interface for user interaction, according to one or more embodiments of the disclosure. In such embodiments, the fuel and exhaust pump 300 may include a user interface 306. The user interface 306 may be disposed on one or both sides of the fuel and exhaust pump 300. The user interface 306 may be a touchscreen or include another input device, such as a mobile or electronic application on a user's device and in signal communication with the fuel and exhaust pump 300.

As a user begins the operation of fueling and/or off-loading exhaust, a computing device within or connected to the fuel and exhaust pump 300 may transmit prompts to the user interface 306 with the prompts being displayed on the user interface 306. As used herein, a "computing device" may refer to an electronic device including or connected to one or more processors and non-transitory machine-readable storage medium, e.g., including, but not limited to, a controller, a desktop computer, a microcontroller connected to memory, a server, an edge server, a cloud server, or other devices, as will be understood by those skilled in the art. As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory may store or include instructions executable by the processor. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), application specific integrated circuit (ASIC), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

The computing device may prompt (see 302) the user to select a fuel type. A series of selectable buttons 304 may then be displayed on the user interface 306. Each of the series of selectable buttons 304 may include a price associated with a type of fuel. The user may then select a type of fuel. In other examples, an option to skip fuel selection may be displayed on the user interface 306. In yet other examples, options to select fuel and exhaust off-load may be displayed together to allow a user to select fuel and/or exhaust off-loading simultaneously. The user interface 306 may also include or display other information related to each different type of fuel. For example, the user interface 306 may display the type of fuel, a carbon intensity of the fuel, an origin of the fuel, certifications regarding fuel sustainability, cost of the fuel, and/or any other quantifiable aspects of the fuel. The carbon intensity of a fuel may be represented by the amount of carbon dioxide by weight per the energy consumed and/or expended to obtain/refine/create/transport the fuel from wellhead to the fuel and exhaust pump 300 and/or the inherent or theoretical carbon dioxide by weight per the energy consumed during future combustion of the fuel. Stated another way, the carbon intensity may represent the amount of carbon dioxide or other greenhouse gases produced at each step of the fuel's lifecycle; scope 1, scope 2, and scope 3 emissions, e.g., exploration and production at a wellhead, transporting to a refinery, processing at a refinery, production at a bio-fuel or ethanol plant or facility, transporting to a convenience store or the like, storage, combustion of the fuel, other processes related to the production and/or use of the fuel (e.g., the Greenhouse gases, Regulated Emissions, and Energy use in Transportation (GREET) model, etc.). In addition to displaying the carbon intensity of a fuel, the user interface 306 may also determine a carbon intensity reduction based on an amount of exhaust or carbon dioxide pumped from a vehicle. For example, if a user selects a particular fuel at a particular carbon intensity and then pumps an amount of exhaust or carbon dioxide via the fuel and exhaust pump 300, the user interface 306 may display the net carbon intensity, e.g., the carbon intensity of the fuel reduced by the amount of carbon dioxide captured by the user during transportation. The carbon intensity measured for particular vehicles may be used as a metric to compare to other options of transportation, e.g. internal combustion engine vehicle as compared with a battery electric vehicle or as compared to a hydrogen fuel cell or hydrogen fueled vehicle.

After selection of a fuel or if the user skips fuel selection, the computing device may generate a prompt 330, to display on the user interface 306, for the user to select whether to remove captured exhaust or carbon dioxide from the vehicle or the on-board exhaust capture device of the vehicle. The user interface 306 may display a series of selectable pop-up buttons 332, including the option of whether to off-load exhaust or not and a potential cost associated with off-loading the exhaust. In at least embodiment, off-loading exhaust may not include a cost, but a savings. In another embodiment, off-loading exhaust may include a fee or nominal cost, but also include an incentive, such as free goods and/or services, discounts on goods and/or services, and/or a discount on fuel. In yet another embodiment, a user may be compensated for off-loading exhaust and the user interface 306 may indicate the amount a user may be compensated for a certain amount or quantity of exhaust.

After selecting a fuel and/or selecting whether to off-load exhaust, the user may be prompted to transact payment for the selected fuel and/or exhaust off-loading operation. In an embodiment, the user interface 306 may include options to pay, for example, via entering a username and credentials for a payment account. In another embodiment the fuel and exhaust pump 300 may include a keypad 308, chip reader 310, and/or magnetic strip reader 312. The user interface 306 may then include a prompt to effectuate payment.

Once a payment has been made, the user interface 306 may prompt the user, if the selection to fuel the vehicle has been made by the user, to insert a fuel nozzle (see 320) into a corresponding fuel port of a vehicle and to insert an exhaust nozzle (see 328) into a corresponding exhaust port of a vehicle, if the selection to off-load exhaust from the vehicle has been made by the user. The fuel nozzle (see 320) may be in fluid communication with a fuel pipe 314 and the fuel pipe 314 may be in fluid communication with a fuel tank (see 318). Fuel may flow, e.g., fuel flow 316, from the fuel tank (see 318) through the fuel pipe 314 and to the fuel nozzle (see 320), and thus to the vehicle. The exhaust nozzle (see 328) may be in fluid communication with an exhaust pipe 322 and the exhaust pipe 322 may be in fluid communication with an exhaust holding tank (see 328). Exhaust may flow, e.g., exhaust flow 360, from the on-board exhaust capture device of the vehicle to the exhaust nozzle (see 328) through the exhaust pipe 322 and to the exhaust holding tank (see 326). In an embodiment, the fuel and exhaust pump 300 may prevent pumping of exhaust until it is determined that the exhaust nozzle (see 328) is sealingly engaged with the corresponding exhaust port of the vehicle.

In an embodiment, the fuel and exhaust pump 300 may include meters, sensors, and/or analyzers. The meters, sensors, and/or analyzers may be positioned upstream of the fuel nozzle 320 and/or downstream of the exhaust nozzle 328. The meters may be positioned to measure an amount of fuel and/or exhaust, in relation to fuel flowing through the fuel pipe 314 and in relation to exhaust flowing through the exhaust pipe 322, respectively. As the fuel is pumped to the vehicle, the fuel meter may transmit an amount, e.g., volume, of fuel to the user interface 306 or a computing device in signal communication with the user interface 306. A rolling or continuously updating total 336, e.g., a total increasing as fuel is pumped, may be displayed, along with an associated cost, on the user interface 306. The type of selected fuel 334 may be identified on the user interface 306. As the exhaust is pumped from the vehicle, the exhaust meter may transmit an amount of exhaust to the user interface 306 or a computing device in signal communication with the user interface 306. A rolling or continuously updating total 340, e.g., a total increasing as exhaust is pumped from the vehicle, may be displayed, along with an associated cost or payment, on the user interface. The flow of exhaust 338 may be identified on the user interface 306. In another embodiment, the rolling or continuously updating total 340 may count down from a total amount of exhaust in the vehicle as such total amount may be measured, calculated, or estimated. In a further embodiment, the rolling or continuously updating total 340 may include a time until the amount of exhaust is completely off-loaded. In such embodiments, the amount of exhaust stored on a vehicle may be determined by the computing device via connections to the vehicle through pins or input/outputs on the exhaust nozzle 328. The pins or input/outputs may correspond to pins or inputs/outputs on a vehicle's exhaust port. Data, including the amount of exhaust stored in a vehicle, may be transferred from the vehicle to the fuel and exhaust pump 300 via the pins or inputs/outputs. In such examples, the data may be utilized to determine an amount of exhaust to off-load and, based on that amount, estimate or determine the time to off-load the exhaust. In another embodiment, the corresponding pins or inputs/outputs of the vehicle may connect to an on-board diagnostic module of the vehicle. The on-board diagnostic module may include an amount of exhaust currently captured by the vehicle based on factors, such as, the amount of fuel consumed by an internal combustion engine and the exhaust flow.

Measurements of the flow rate or amount of exhaust flowing from the vehicle may be stored in the non-transitory machine readable storage medium or memory of: a computing device associated with a convenience store that is in signal communication with the fuel and exhaust pump 300 at that location, or of a computing device external to the convenience store (e.g., off-site or remote therefrom) that is in signal communication with the fuel and exhaust pump 300. Data relating to exhaust off-loading may be accumulated over a period of time or until the exhaust is picked up by a delivery vehicle. The data may be included in a report. The report may be generated by a computing device internal or external to the convenience store or wherever the fuel and exhaust pump 300 may be located. The report may be in a format suitable for environmental reports to be sent to local, state, and or federal government agencies. The data may also be listed or displayed on the user interface 306. The data may be displayed as an exhaust off-load history for a particular user, a local exhaust off-load history (e.g., city, town, county, etc.), a state off-load exhaust history, a country-wide exhaust off-load history, and/or global exhaust off-load history as illustrated by portion 342 of the user interface 306.

In another embodiment, an analyzer may be disposed at a point between the exhaust nozzle 328 and exhaust holding tank (see 326). The analyzer may obtain or receive a sample of the exhaust. The analyzer may determine, via predictive analytics, machine learning, and/or artificial intelligence, the composition of the sample. The analyzer may send the composition of the exhaust to the computing device for storage, for reporting, or for display on the user interface 306. The user interface 306 may display the composition of the exhaust. The computing device may determine, based on the composition of the exhaust, whether a vehicle may be ready for or in need of service or preventative maintenance. The computing device may determine that the vehicle may require servicing or maintenance. The user interface 306 may display the suggestion or determination. Based on differing amounts of different chemicals, or purity, in the exhaust, the computing device may determine potential issues with the vehicle, the on-board vehicle exhaust capture device, or the thermal efficiency of the vehicle. For example, if the exhaust includes high amounts of unburned fuel, then the computing device may determine that the vehicles engine may be experiencing issues. In another example, the computing device may determine, based on higher than typical amounts of nitric oxides in exhaust, that an issue exists with a catalytic converter.

Figure 5A:
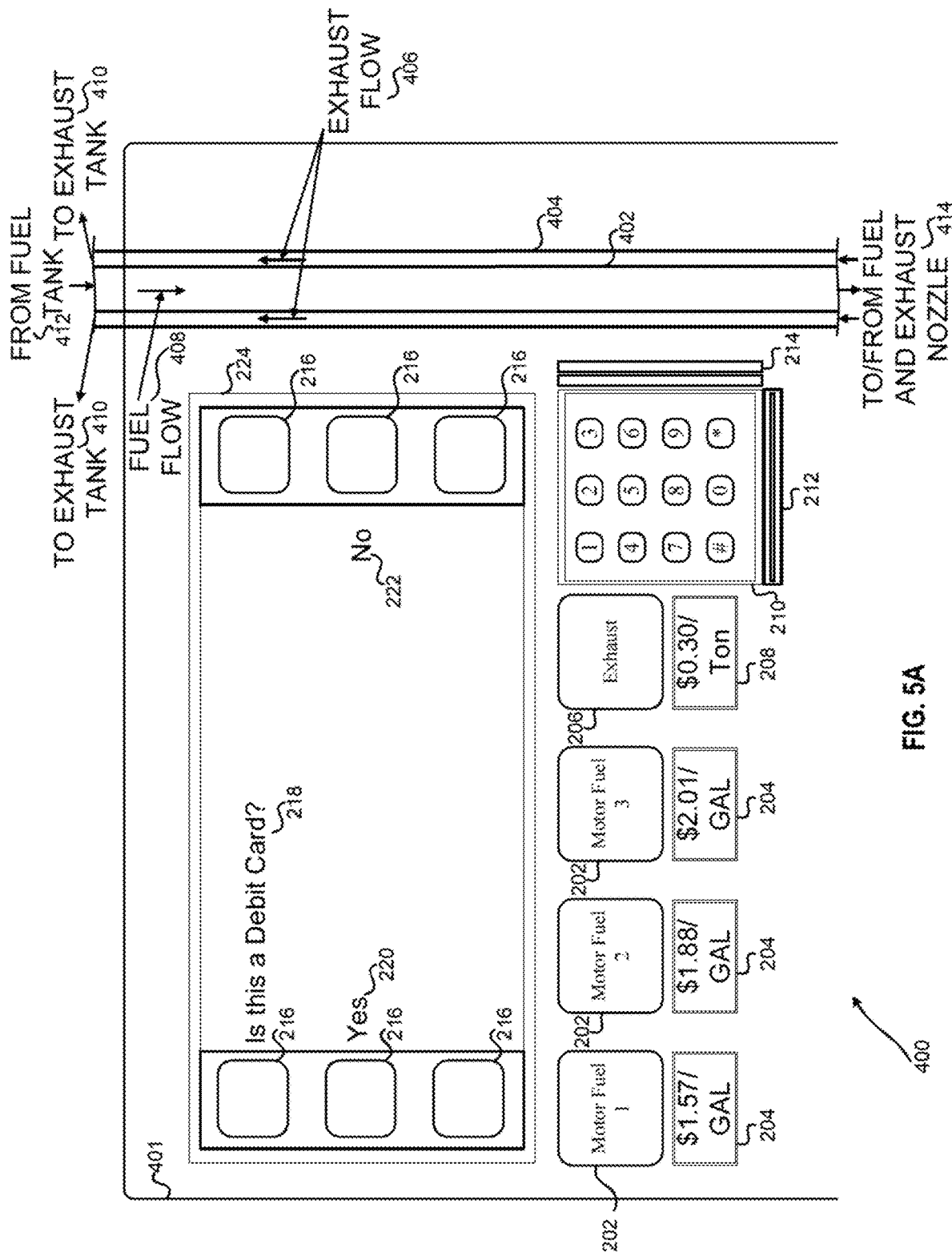
FIG. 5A, FIG. 5B, FIG. 5C, FIG. 5D, FIG. 5E, FIG. 5F, FIG. 5G, FIG. 5H, and FIG. 5I are simplified diagrams that illustrate a novel implementation of a fuel and exhaust pump for transporting fuel to a vehicle and off-loading exhaust from the vehicle, in which the fuel and exhaust pump includes a single nozzle for fuel and exhaust that has an annular cavity for fuel or exhaust and an inner cavity for exhaust or fuel, respectively, according to one or more embodiments of the disclosure.
Figure 5B:
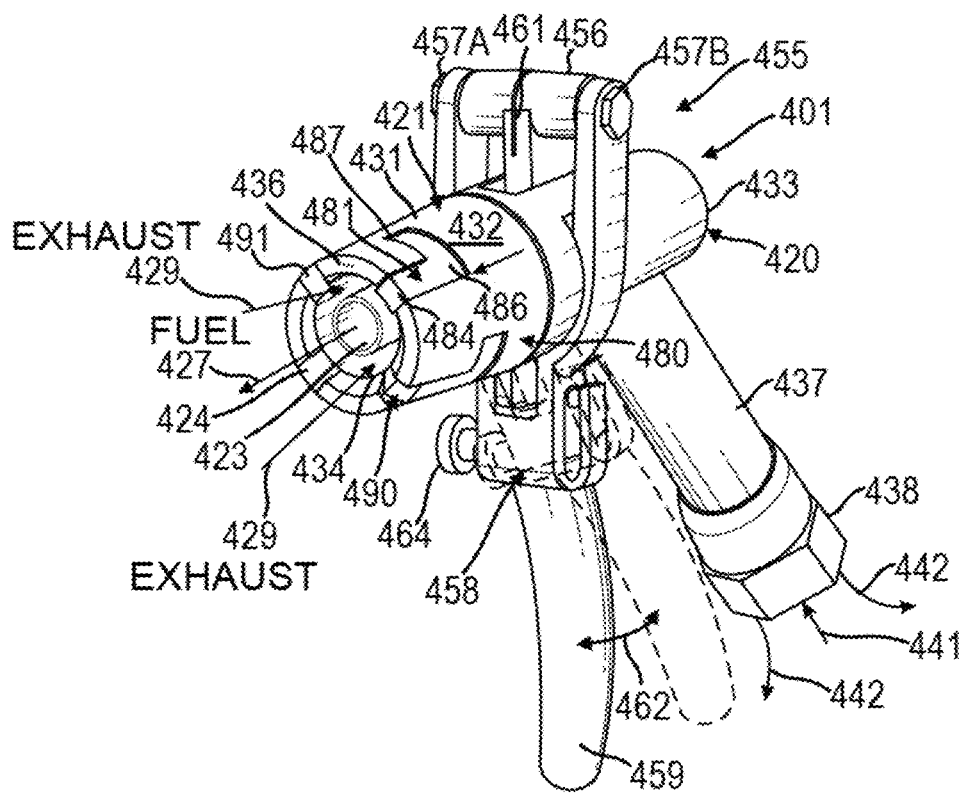
Figure 5C:
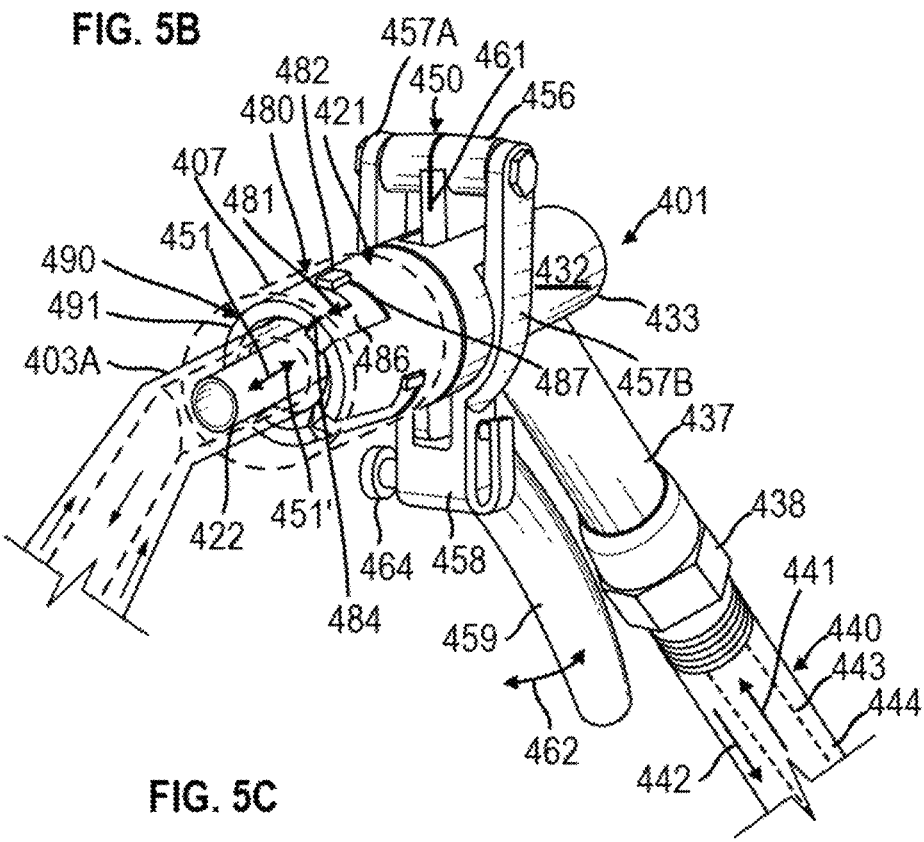
Figure 5D:
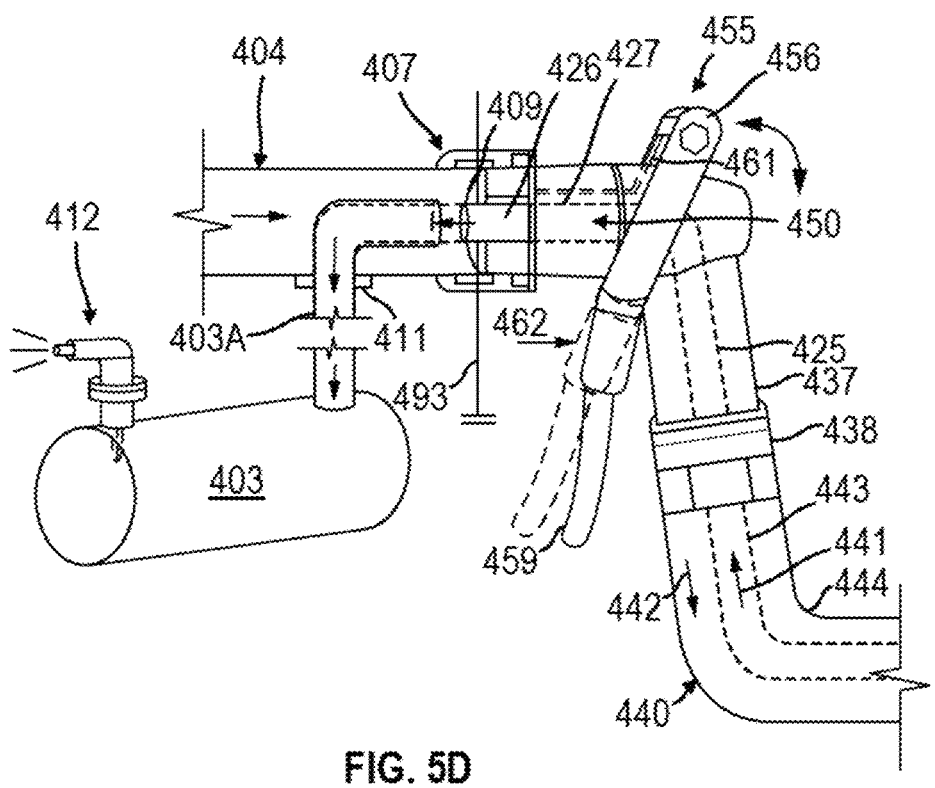
Figure 5E:
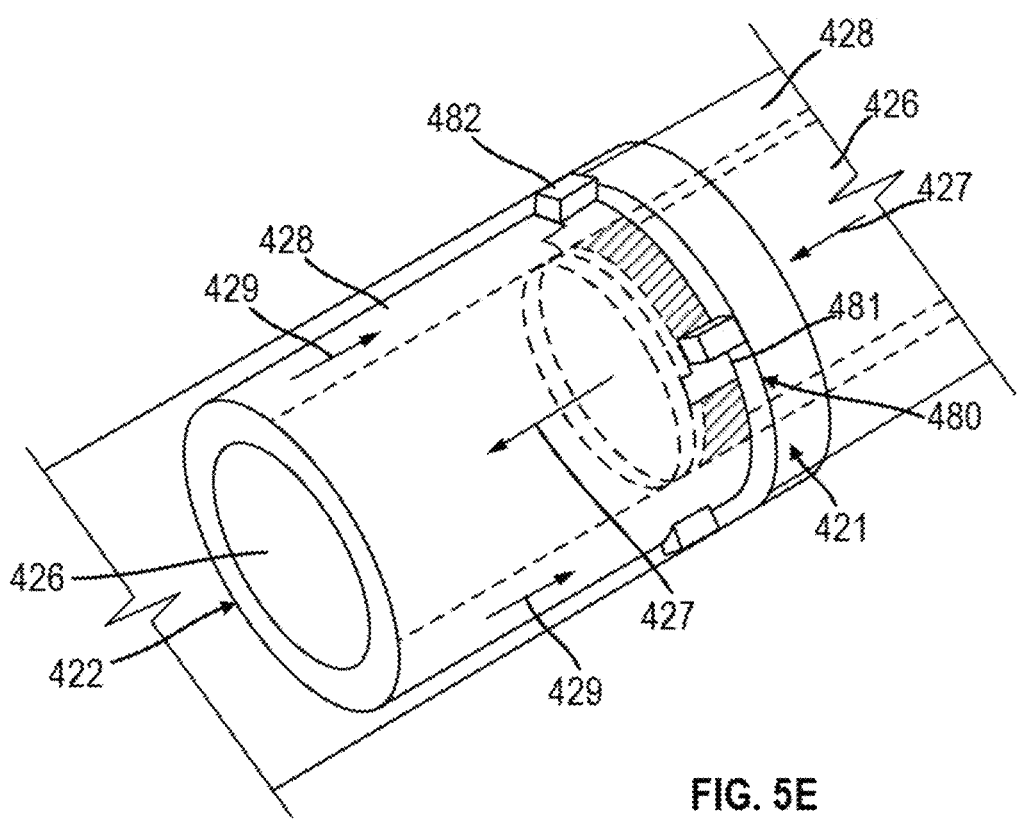
Figure 5F:
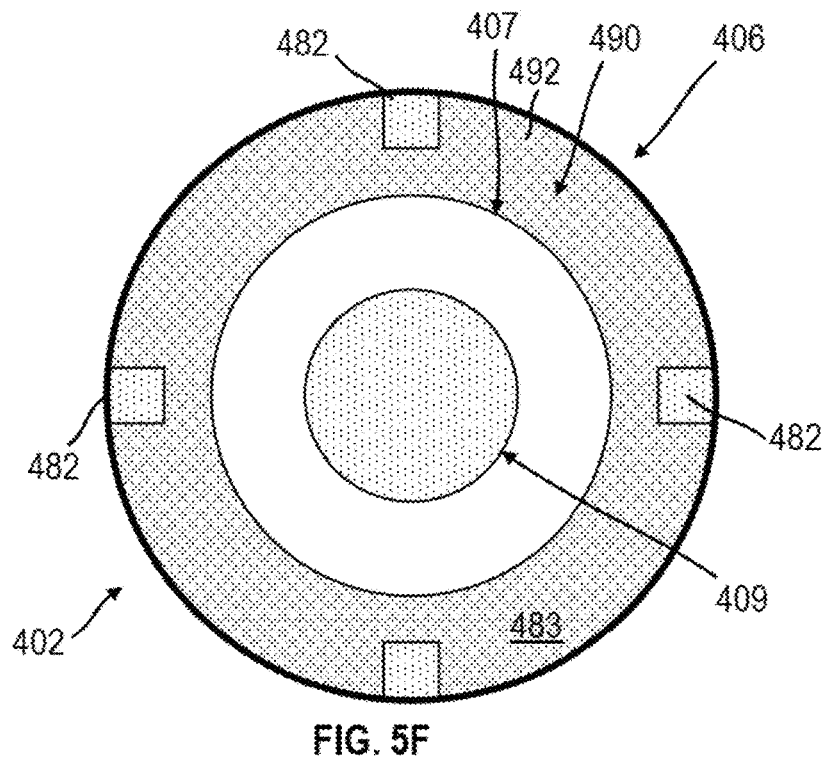
Figure 5G:
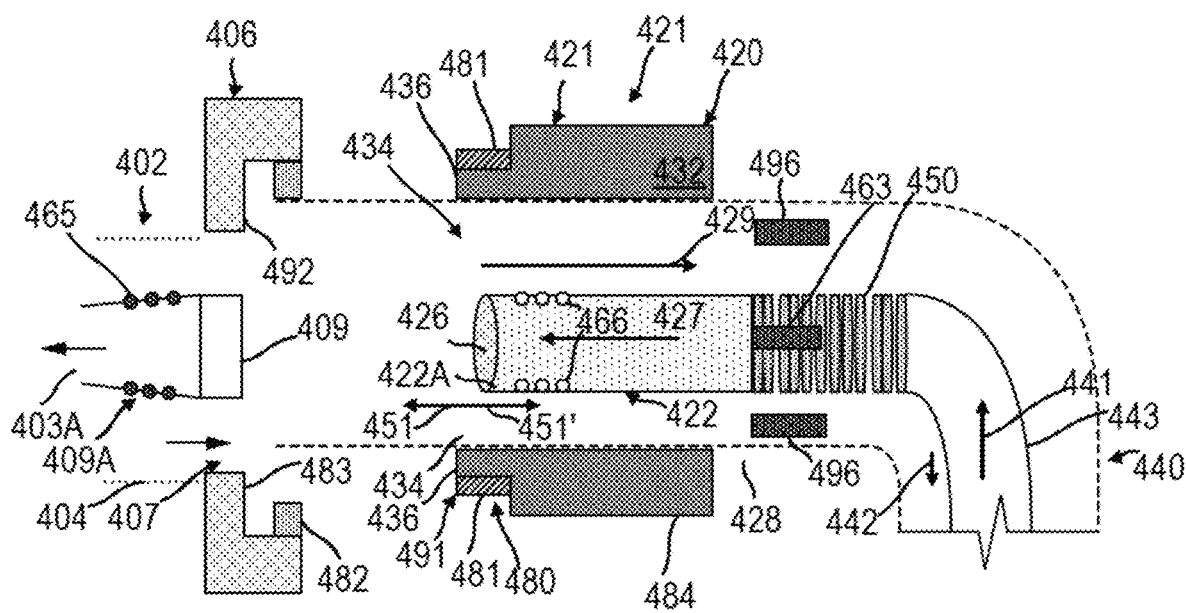
Figure 5H:
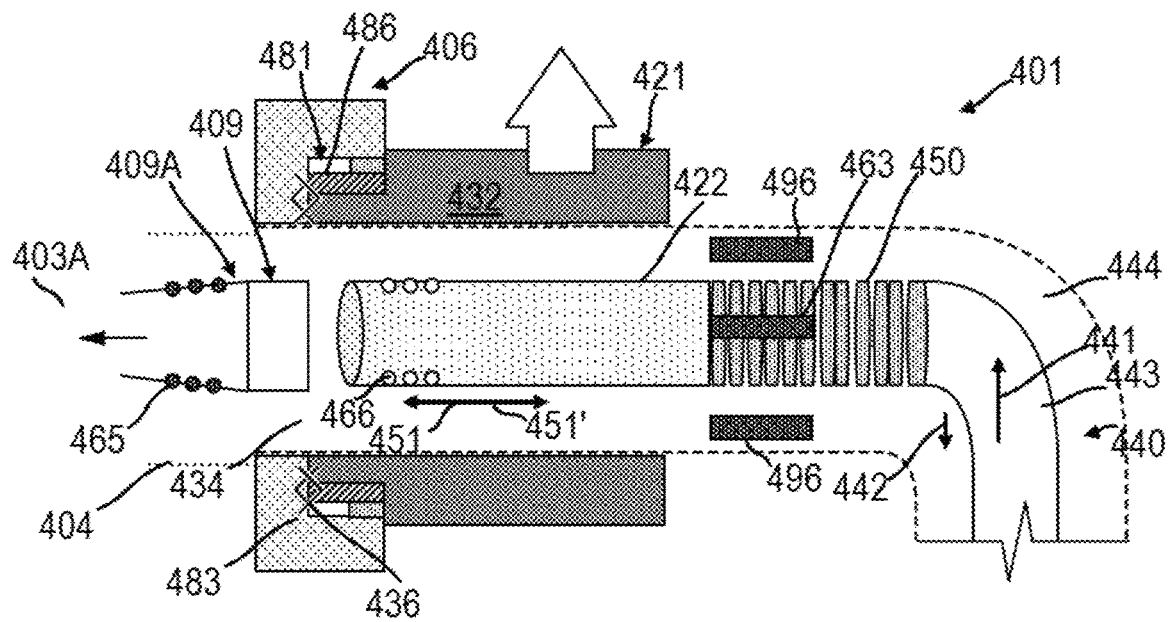
Figure 5I:
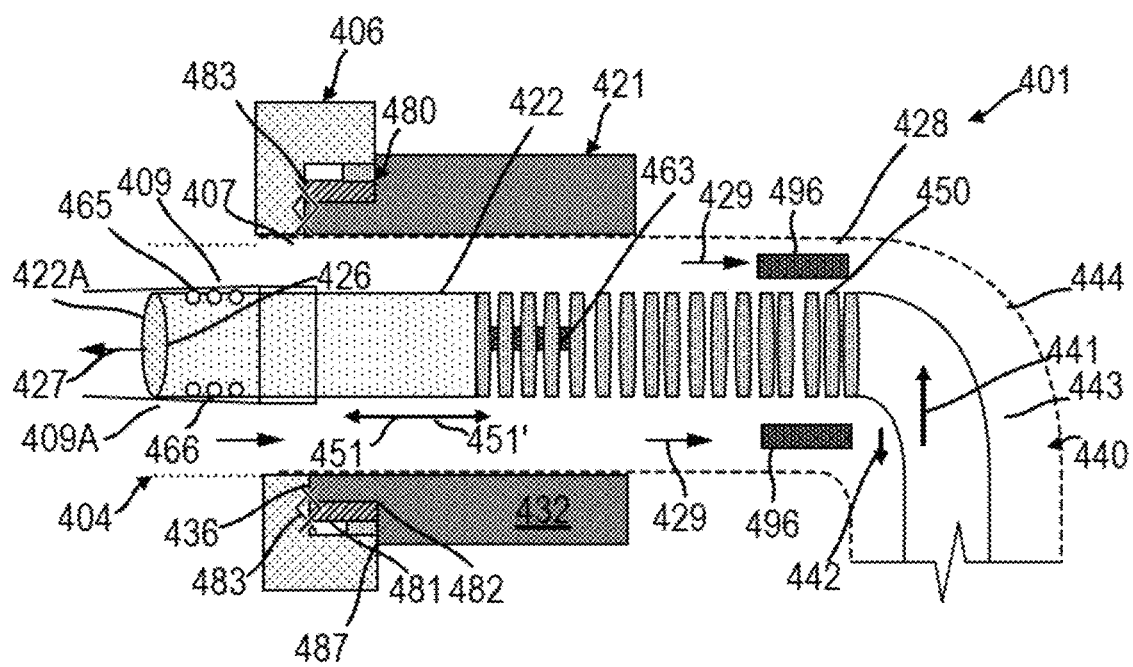
Figure 6:
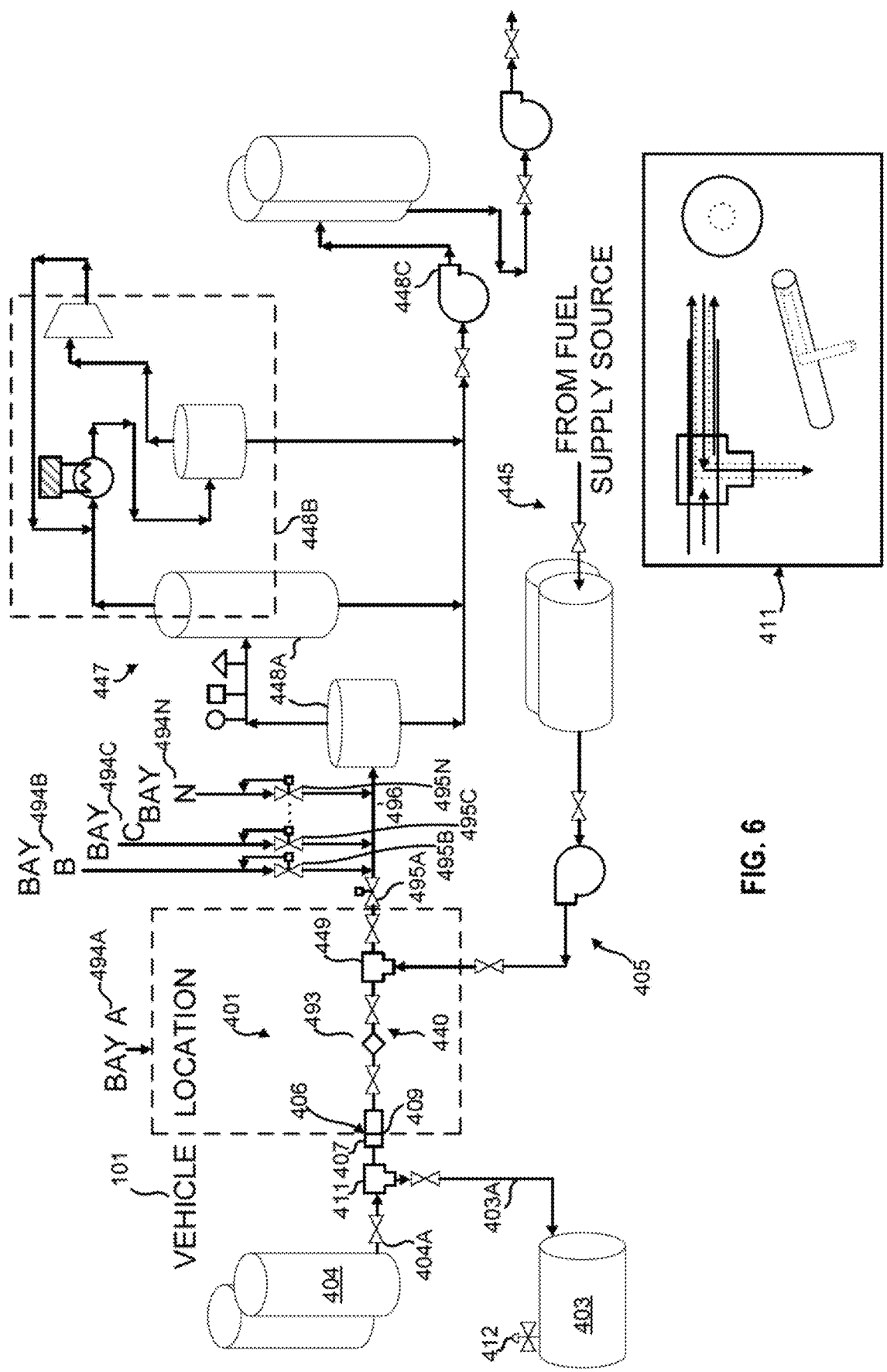
FIG. 6 is a simplified diagram that illustrates a novel implementation of a fuel and exhaust station that offers off-load of captured exhaust from a vehicle and pick-up or transport to a delivery vehicle, according to one or more embodiments of the disclosure.

FIGS. 5A-6 are simplified diagrams that illustrate a further novel implementation of a fuel and exhaust pump 400 (FIG. 5A). In embodiments, the fuel and exhaust pump 400 may be similar to the fuel and exhaust pump 200 or fuel and exhaust pump 300 of FIGS. 2A-2D and FIGS. 3A-3B. In the present embodiment shown in FIGS. 5B-6, the fuel and exhaust pump incorporates a multi-function nozzle assembly 401 (FIG. 5B-5E) as part of a combined fueling and exhaust capture system 405 schematically illustrated in FIG. 6 for supplying fuel (e.g. gasoline, diesel fuel, etc.) to a vehicle 402, while also enabling off-loading captured exhaust from the vehicle 402. In such an implementation the vehicle 402 will include both a liquid fuel tank 403 and an on-board vehicle exhaust capture device 404 configured to capture $CO_2$ and other vehicle exhaust gasses.

Figure 2A:
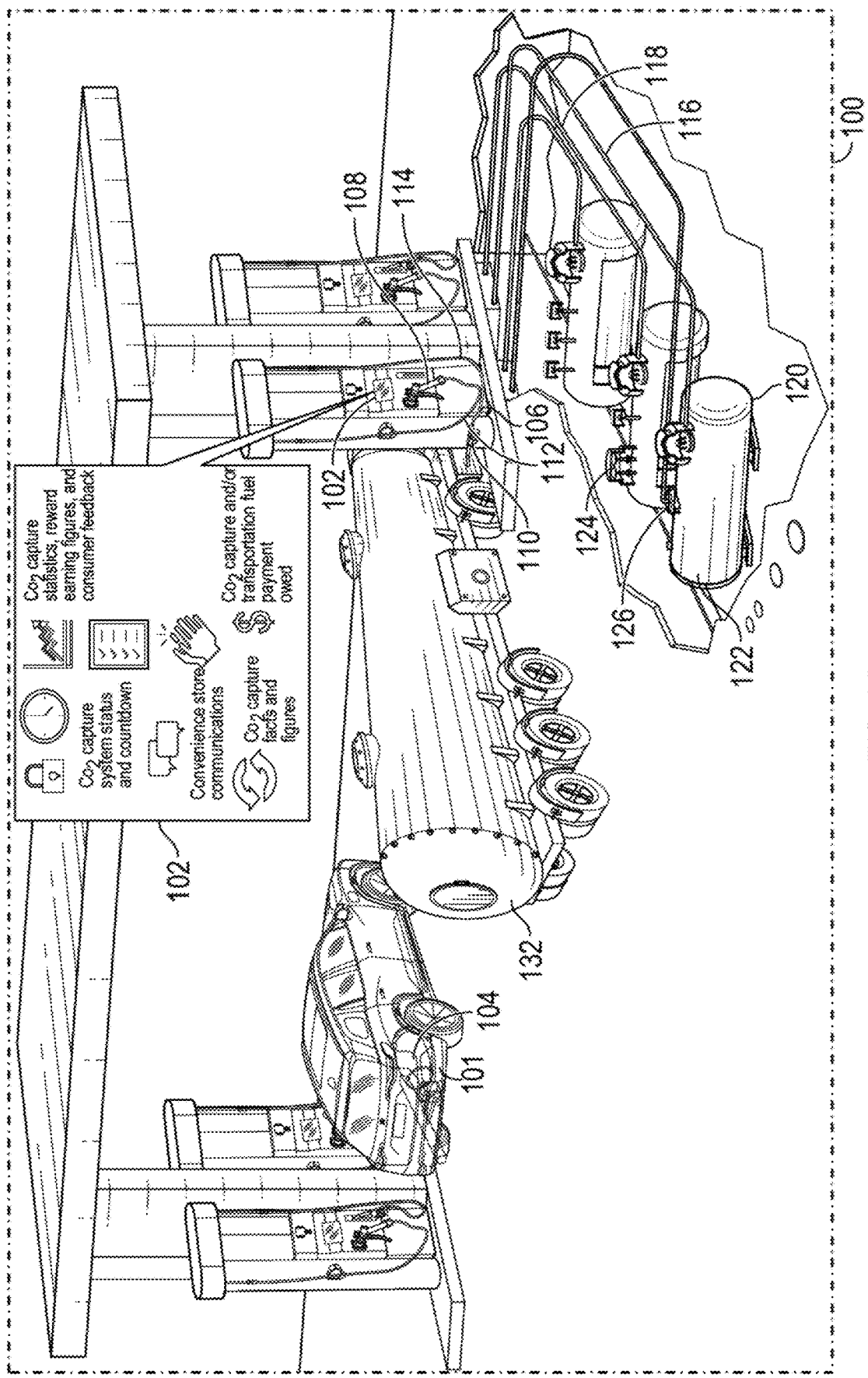
FIG. 2A, FIG. 2B, FIG. 2C, FIG. 2D, and FIG. 2E are schematic diagrams that illustrate scalable greenhouse gas capture systems and configurations of vehicle fuel inlet and exhaust outlet ports for supplying fuel to a vehicle and for off-loading captured exhaust from a vehicle to an exhaust holding tank and to a delivery vehicle or other transportation mode for re-use, recycle, or permanent storage, according to one or more embodiments of the disclosure.
Figure 2C:
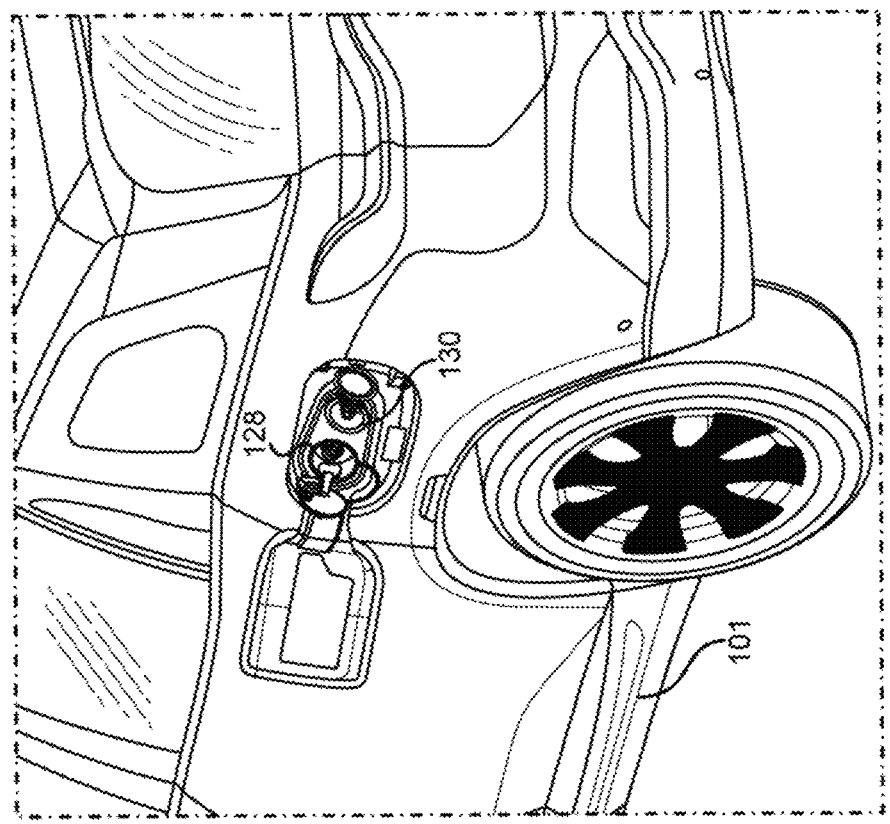
Figure 2B:
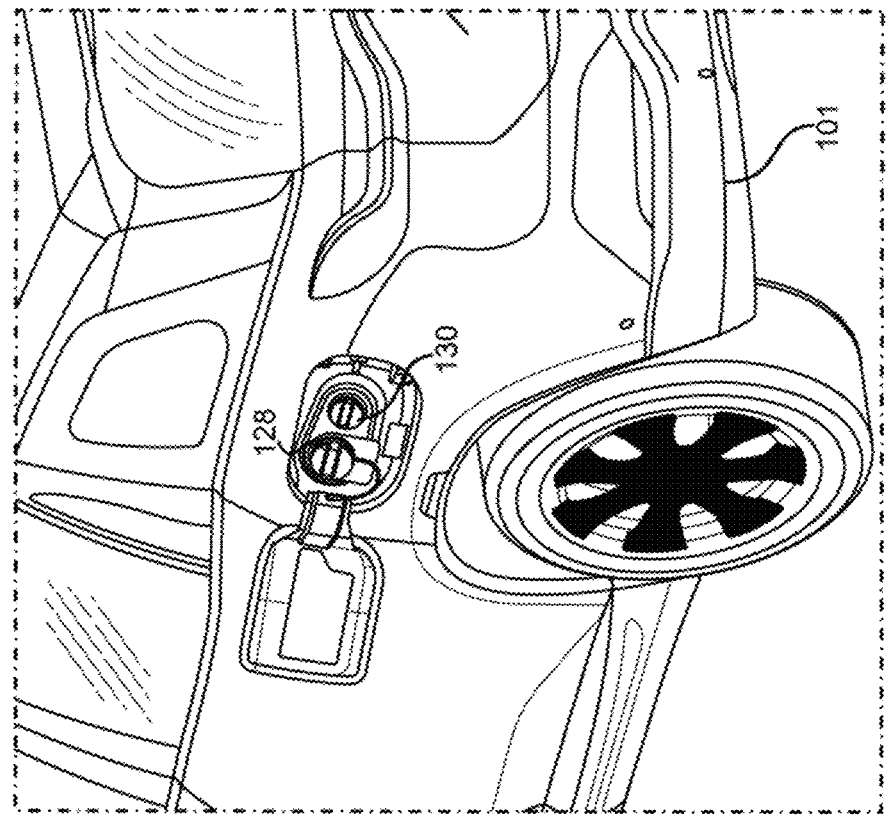
Figure 2D:
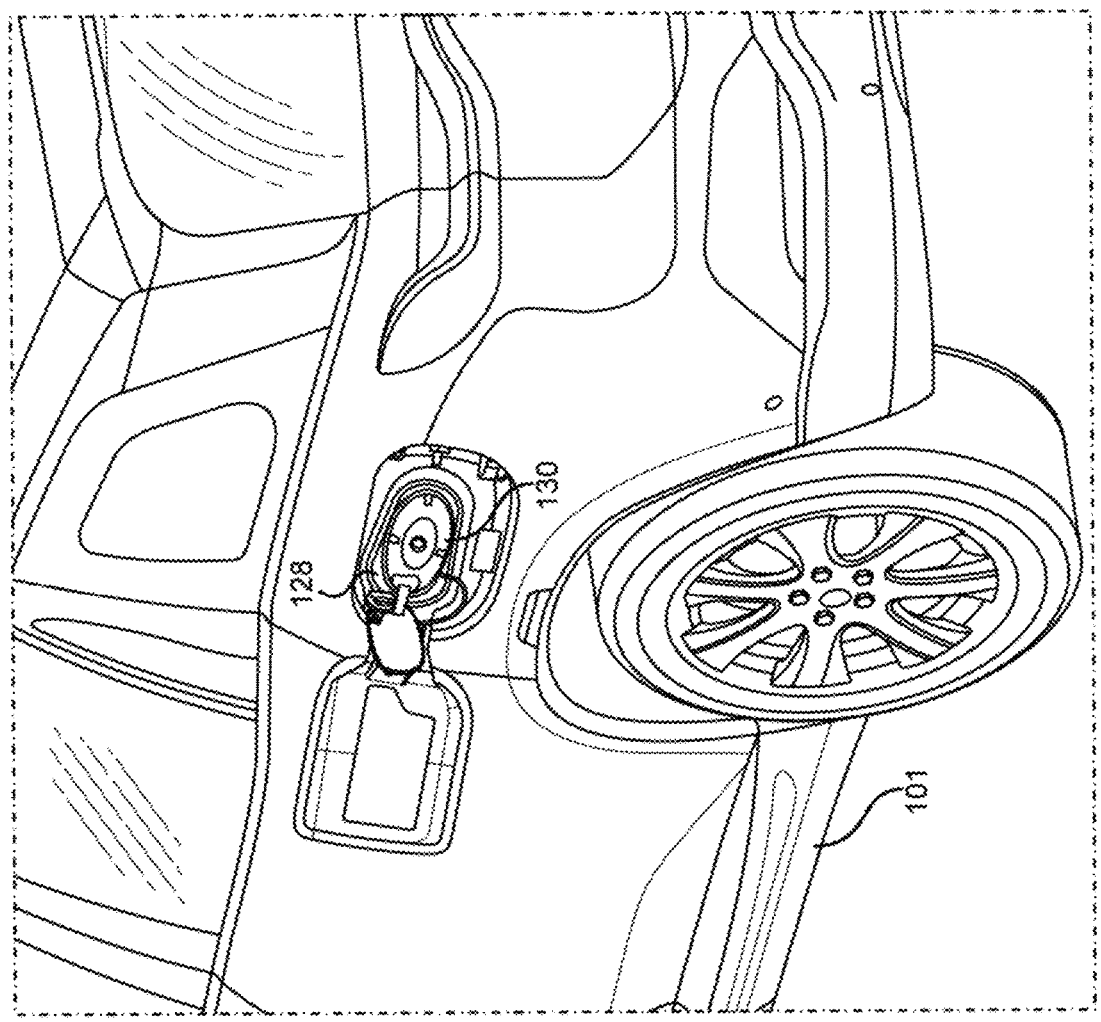
Figure 2E:
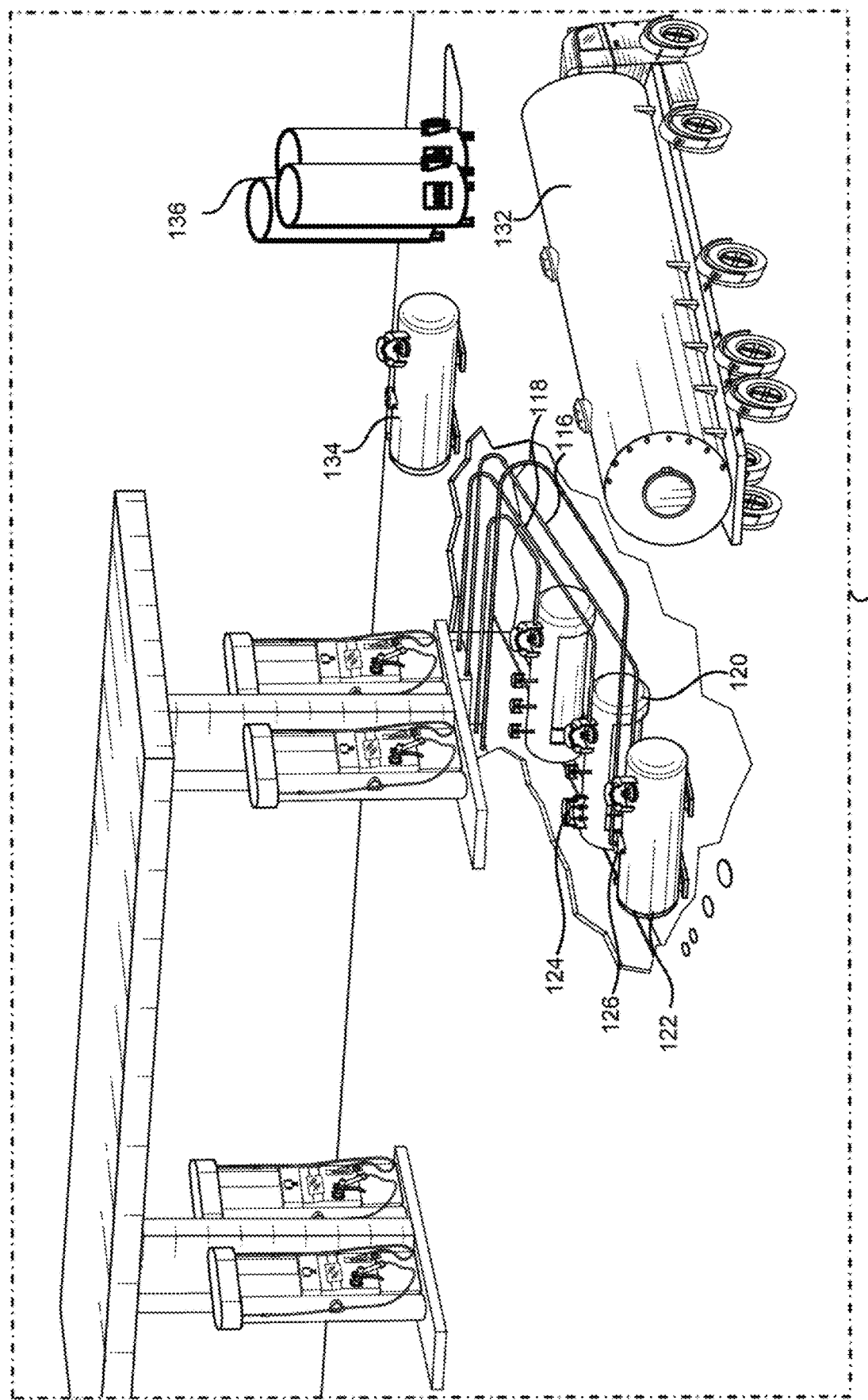

The vehicle 402 generally will include a fuel intake line 403A and an exhaust outflow line 404A that can be integrated, e.g. with the fuel intake line contained within the exhaust outflow line, so as to enable both removal of exhaust (e.g. $CO_2$) from the exhaust capture device of the vehicle and fueling of the vehicle via the multi-function nozzle assembly 401 through a combined inlet/outlet, such, as indicated at 406 in FIGS. 2D, 5F and 6. The inlet/outlet 406 can include both an exhaust port or outlet 407 connected to the exhaust capture device 404 (FIG. 6), such as one or more $CO_2$ tanks 408 for collection of $CO_2$ and other vehicle exhaust gasses on-board the vehicle, by exhaust outflow line 404A; and a fuel port or inlet 409 connected to the fuel tank 403 of the vehicle by the fuel intake line 403A. As indicated in FIG. 6, the fuel intake line 403A and exhaust outflow line 404A can be joined or integrated together at a T-Joint 411 such that the fuel intake line will be received within and extend along the exhaust outflow line 404A to the inlet/outlet.

In addition, as shown in FIGS. 5D and 6, the fuel tank 403 can include a pressure relief valve 412 adapted to vent excess fuel gases to a vapor recovery system or to the atmosphere. The pressure relief valve will be configured to be biased or otherwise maintained in a closed position until a gas pressure within the fuel tank 403, due to formation of excess fuel gas therein, exceeds a selected threshold pressure for the fuel tank 403, causing the pressure relief valve to open for venting the excess gas to the vapor recovery system or to atmosphere, as indicated in FIG. 6, to reduce pressure within the fuel tank and help minimize cavitation of the liquid fuel in the fuel pump or in the fuel tank.

Each fuel and exhaust pump 400 (FIG. 5A) of the combined fueling and exhaust capture system 405 (FIG. 6) can include a multi-function nozzle assembly 401 for use in both fueling the vehicle and extracting $CO_2$ therefrom through a single nozzle, which fueling and exhaust off-load operations can be conducted in a substantially simultaneous operation or in separate operations as needed. As illustrated, in FIGS. 5B-5D and 5G-5I the multi-function nozzle assembly 401 can include a housing 420 or body that defines an exhaust nozzle 421, and a fuel nozzle 422 housed within and movable along the exhaust nozzle 421, and which is coupled to a fuel intake line 425. The fuel nozzle 422 and fuel intake line 425 define a first or inner annular fuel inlet passage or cavity 423 configured for supplying fuel to the fuel tank of the vehicle, while the exhaust nozzle 421 defines a second or outer annular exhaust outlet passage, indicated at 424, circumscribed about the fuel nozzle 422 and configured for enabling removal or off-loading of captured exhaust. The fuel nozzle 422 is generally centrally located within the exhaust nozzle 421, as shown in FIGS. 5B-5D and 5G-5I, and extends through the exhaust nozzle 421 of the multi-function nozzle assembly 401 for receiving and supplying fuel along the inner fuel passage to the vehicle fuel tank, indicated by arrow 427, while exhaust is removed via the outer annular exhaust passage, as indicated by arrow 429, according to one or more embodiments of the disclosure. The exhaust can be captured and/or removed in a liquid phase or gaseous phase, or combination thereof.

As indicated in FIGS. 5B-5D, the exhaust nozzle 421 can be configured with or include a first or main body portion 431 having an outer wall 432, a closed rear or distal end 433A and an inlet or proximal end 433B defining an opening 434 with an annular rim 436. A second or rear body portion 437 extends downwardly and away from the first or main body portion 431 and includes a connector 438 at a distal end thereof. The connector 438 can include a common threaded connector or female joint type connector adapted to engage and mate with a corresponding coupling connection of a combined fuel and exhaust conduit or conduit 440 (FIGS. 5D-5E).

As indicated in FIGS. 5D and 6, the fuel inlet passage 423 and exhaust outlet passage 424 extend through the multi-function nozzle assembly 401 with the exhaust outlet passage circumscribed about the fuel inlet passage 423. Thus, the flow of fuel can be provided along the fuel inlet passage 423 in the direction of arrows 441, while exhaust, such as $CO_2$ or other combustion byproducts, can be off-loaded or exhausted in an opposite direction through the exhaust outlet passage 424 as shown by arrows 442. As additionally indicated in FIG. 5D, the combined fuel and exhaust conduit 440 includes a fuel hose or line 443 contained within an outer exhaust hose 444 and extending along an outer annular passage 446 defined between the exhaust hose 444 and fuel hose 443.

The fuel nozzle 422 and fuel intake line 425 of the multi-function nozzle assembly 401 are coupled to the combined fuel and exhaust conduit 440 at a common connection point through the connector 438. The fuel hose 443 connects the fuel nozzle to a fuel system 445, which generally will include one or more fuel supplies (e.g. one or more tanks and/or or pumps supplying a fuel such as gasoline, diesel fuel, marine fuel, or other liquid or gaseous fuels, as illustrated in FIG. 6) for providing an inflow of fuel during a fueling operation; while the exhaust hose connects the exhaust nozzle to an exhaust removal and logistics system 447 for off-load of captured exhaust from the on-board vehicle exhaust capture device. In embodiments, the exhaust removal and logistics system 447 can include at least one exhaust holding tank, such as $CO_2$ tanks 448A (which can include one or more knock-out tanks and one or more holding tanks), a refrigeration system/package 448B, and one or more pumps 448C, as well as other components as shown in FIG. 6. The fuel hose or line 443 will be contained within the outer exhaust hose so as to be movable with the exhaust hose 444, and will separate therefrom at an upstream junction 449 (e.g. a T-junction as illustrated in FIG. 6) and connect to the fuel supply 445.

In an embodiment, multi-function nozzle assembly 401 can be used as part of a joint refueling and exhaust capture system at a refueling site such as a gas station, truck stop or other refueling station or operation, which refueling station, as illustrated in FIG. 6, will include at least one bay, e.g., bay A 494A; and further may include one or more bays, e.g., bay A 494A, bay B 494B, bay C 494 C, and/or up to bay N shown at 494N. Each bay 494A-494N may include equipment for both off-load of exhaust from a vehicle, and/or for re-fueling other the vehicle, either as separate operations or as a joint/concerted refueling and exhaust off-load operation that can include the use of a multi-function nozzle assembly 401, such as illustrated, in one embodiment, in FIG. 5B-6.

As illustrated in FIG. 6, at any particular point in time, any number of the plurality of bays 494A-494N may be active (e.g., exhaust is being off-loaded from a vehicle and/or a vehicle is being re-fueled). During such operations, an exhaust capture nozzle and/or a fuel nozzle (e.g. in embodiments, the multi-function nozzle assembly 401) will be engaged with the exhaust outlet and/or fuel intake ports of the vehicle, and once a seal is determined to be in effect, an exhaust off-load and/or fueling operation is initiated upon the user engaging and squeezing or otherwise moving the trigger of the nozzle, whereupon the controller for the fuel pump can signal a station controller to begin draw-out of the exhaust and/or pumping of fuel. To regulate or control pressure during such operations, for example, to control the suction for off-load of exhaust and/or for fueling, the site may include pressure control devices. Such pressure control devices may include a control valve, spillback loops, pumps, and/or other devices configured to adjust pressure.

As shown in FIG. 6, in an embodiment, the site may include control valves and spillback loops to regulate and/or control pressure (e.g., control valve 495A, control valve 495B, control valve 495C, and/or up to control valve 495N). During an exhaust off-load operation, the pressure of fluid from a vehicle 101 may be high (e.g., as high as about 1400 psig). The exhaust holding tanks of the site may be configured to hold fluid at a particular pressure, for example about 300 psig to about 350 psig. Preferably, the pressure of the captured exhaust being supplied to the exhaust removal and logistics system 447 (as indicated at line 496 which connects the exhaust conduits of each bay to the exhaust removal and logistics system 447) and the suction or back-pressure for the off-load of exhaust from each bay will be substantially stable. As more than one bays operate, the pressure drop from the vehicles may vary or fluctuate decrease. To adjust pressure of exhaust flowing from any particular vehicle, the control valve between the exhaust line 496 and the exhaust conduit of each bay will be adjusted or controlled by the station controller to regulate its operation, e.g. opening and closing of the control valves, to maintain a substantially consistent pressure. Such control valves may be controlled by a computing device or station controller on site. Further, the pressure at any given point throughout the piping or pipeline of the site may be determined via one or more pressure sensors or transducers. For example, a pressure transducer or sensor may be positioned proximate to the control valves and upstream and/or downstream of the control valves.

In embodiments, the fuel hose or line 443 also can include an insulating material, such as a heat tracing, or a sleeve, cover or a coating of a thermal insulation material, or a combination thereof, to help protect the fuel therein from the substantially lower temperature $CO_2$ passing by the fuel line through the exhaust hose. In embodiments the combined fuel and exhaust conduit can have a diameter of about 2.75" to about 4", including a fuel line with a dimeter of about 0.75" to about 1". Other diameters/sizes also can be provided. In addition, to aid in use and movement of the combined fuel and exhaust conduit at the fuel pump, the combined fuel and exhaust conduit can be supported at the fuel pump by an overhead arm, cable, or other moveable support.

A flexible connector or coupling 450 (FIGS. 5D and 5G-5I) couples the fuel nozzle 422 to the fuel intake line 425 within the multi-function nozzle assembly. The connector 450 will comprise a flexible conduit or tube configured to expand and contract, and is located between the fuel nozzle and fuel intake line. The connector expands and contracts to maintain the connection between the fuel nozzle and the fuel intake line as the fuel nozzle translates along the exhaust passage, moving forward and rearward along the exhaust passage of the exhaust nozzle as indicated by arrows 451/451', into and away from engagement with the area 409A of the fuel port 409 for the fuel tank 403 of the vehicle.

As indicated in FIGS. 5B-5D, the multi-function nozzle assembly 401 further includes a handle 455 that is pivotally attached to the housing 420. In embodiments, the handle 455 includes a hand grip 456 with side portions 457A/457B projecting downwardly to a hinge 458 that pivotally couples to a trigger 459 thereto. The trigger 459 of the handle generally can be biased toward a forward position, and is coupled to the fuel nozzle 422 by linkage 461 that extends through the outer wall of the housing and into the exhaust passage. The linkage 461 will be coupled to the fuel nozzle such that as the trigger is engaged and squeezed or moved rearwardly, toward the second body portion, in the direction of arrow 462, the fuel nozzle will be urged forwardly in the direction of arrow 451 toward and into engagement with the port of the vehicle fuel tank.

As the fuel nozzle 422 is moved forwardly upon a user squeezing the trigger 459 of the handle 344, the flexible connector 450 will expand as illustrated in FIG. 5I to maintain the connection between the fuel nozzle and fuel intake line, and once the fuel nozzle is detected to be in sealed engagement with the fuel port of the vehicle, a fueling operation can be initiated. For example, one or more sensors, such as shown at 463 in FIGS. 5G-5I, can be provided within the fuel passage or along the fuel nozzle. The one or more sensors can be configured to detect when the fuel nozzle is in a substantially air-tight sealing engagement with the fuel port of the vehicle, and/or to detect and measure a backpressure within the fuel nozzle indicative of the fuel tank nearing or reaching a full capacity, and can send a feedback signal to the fuel pump to stop fueling.

After the trigger 459 of the handle 455 has been released, such as after completion of a fueling operation, the trigger 459 can be biased or otherwise moved toward or reset to its forward position so that the fuel nozzle is retracted in the direction of arrow 451', to retract the fuel nozzle out of the fuel port. During a fueling operation, the trigger will be locked/secured in place. In embodiments, the trigger can be locked in place by the hinge, e.g. by a locking pin 464 (FIGS. 5B-5D) or clutch mechanism that will need to be disengaged before the trigger can be repositioned to its forward, disengaged or deactivated position. As the fuel nozzle is retracted into the exhaust outlet passage of the exhaust nozzle, with the flexible conduit likewise will be retracted back to its compressed, initial position shown in FIG. 5G.

As further indicated in FIGS. 5G-5I, the fuel nozzle 422 generally will be urged into the fuel port 409 of the vehicle fuel tank 403 in a tight fitting engagement to insure sealing. For example, the area 409A behind the fuel port 409 can have a taper or narrowed configuration so as to create a friction or interference fit between the forward end/portion 422A of the fuel nozzle 422 and the fuel port.

In addition, sealing materials 465 can be provided along the interface between the fuel nozzle and the fuel port to ensure that a substantially air-tight seal will be created between the fuel nozzle and the fuel tank of the vehicle. Such sealing materials 465 can include one or more gaskets, o-rings or other sealing elements located at speed intervals along the area 409A behind the fuel port 409. In addition, the forward end 422A of the fuel nozzle 422 can be formed with corresponding grooves, recesses or other features 466 configured to receive such sealing materials 465 therein. For example, as indicated in FIGS. 5G-5I, the o-rings, gaskets, etc. 465 can be engaged and seated within the grooves 466 of the fuel nozzle create one or more sealing surfaces between the outer circumference or wall 423B of the fuel nozzle and the fuel port 409 the vehicle fuel tank. When the fuel nozzle is inserted into the fuel port of the vehicle, the sealing features can be urged into overlapped or otherwise engaging contact to create the seal between the fuel nozzle and fuel tank of the vehicle to resist leakage of fuel from the fuel nozzle, as well as leakage of exhaust into the fuel tank as the exhaust materials such as $CO_2$, and/or other byproducts of combustion, are extracted and off-loaded through the exhaust passage 424 of the exhaust nozzle 421, which off-loaded exhaust materials could be at high pressure and variable temperatures, as shown in FIGS. 5B-5D.

Figure 7A:
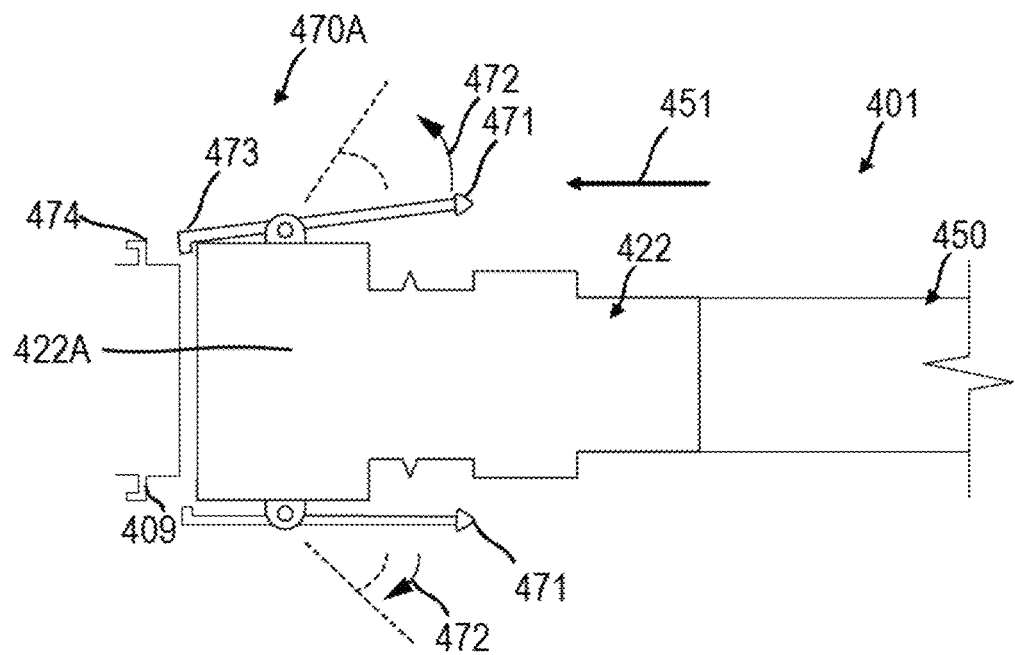
FIG. 7A and FIG. 7B are simplified diagrams that illustrate the single nozzle for fuel and exhaust, according to one or more embodiments of the disclosure.
Figure 7B:
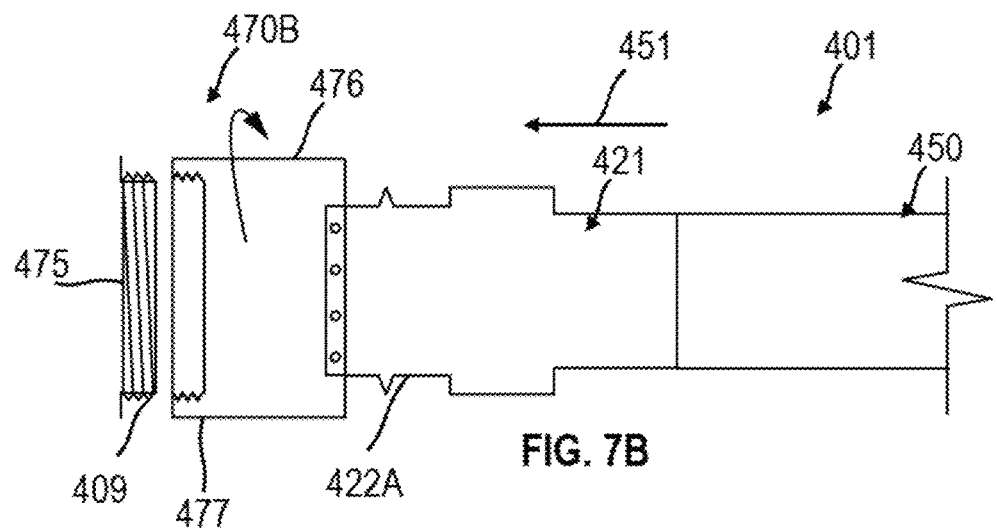

FIGS. 7A and 7B illustrate additional, alternative embodiments of locking mechanisms 470A and 470B for providing a locked, substantially sealed engagement between the fuel port 409 of the vehicle fuel tank and the fuel nozzle 422. In FIG. 7A, the locking mechanism 470A includes 2 or more cam arms 471 arranged at spaced intervals (e.g. at 12 and 6 o'clock positions, and/or at 12, 3, 6, and 9 o'clock positions, etc.). The cam arms 471 can be pivoted outwardly as indicated by arrows 472, such that forward edges or catch portions 473 of the cam arms can engage a rim 474 or other surface of the fuel port for locking of the forward end 422A of the fuel nozzle 422 with the fuel port 409. The cam arms can be pivoted between an engaged, locked position, and a retracted or disengaged position manually or automatically. For example, in embodiments, the cam arms could be coupled to rods, cables, or other connectors connected to the linkage that drives the forward and rearward movement of the fuel nozzle such that as the linkage moves forwardly to urge the fuel nozzle into engagement with the fuel port, the connectors can cause the arms or prongs to be pivoted to their engaged, locking position. As the linkage is retracted, and causing the retraction of the fuel nozzle out of engagement with the fuel port and back into the exhaust nozzle, these connectors likewise will be retracted by the rearward movement of the linkage, causing the cam arms to pivot in the direction of arrows 472 back to their disengaged position against the outer wall of the fuel nozzle.

In FIG. 7B, the locking mechanism 470B rises a threaded connection or lock. In this embodiment, the port can be provided with a series of threads 475 arranged about the rim 474 or other surface of the fuel port 409, and with the fuel nozzle can include a connector 476 having a series of corresponding threads 477 formed therein. The connector 476 can comprise a female type connector in which the threads of the fuel port will be received, and as the fuel nozzle is rotated, for example, with the rotation of the multi-function nozzle assembly for locking the multi-function nozzle assembly in place for a combined fueling and exhaust offload operation, the threads 477 of the connector 476 and the corresponding threads 475 of the fuel port 409 will engage and create a sealed engagement between the fuel nozzle and the fuel port. Rotation of the connector 476 can be by rotation of the fuel nozzle; or alternatively, can be accomplished without rotation of the fuel nozzle. For example, the connector 476 can rotate independently from the fuel nozzle and can be biased or spring-loaded by a bearing such that in response to the fuel nozzle being urged into and against the threads of the fuel port as the fuel nozzle is urged forwardly against the fuel port, the threads of the fuel port and the connector are caused to slide or rotate along each other. Other types of locking or coupling mechanisms configured to the fuel nozzle and fuel port of the vehicle fuel tank in a sealed, substantially airtight engagement also can be provided.

In addition, as shown in FIGS. 5B-5D, the multi-function nozzle assembly 401 generally will include locking or latching features 480 for locking the exhaust nozzle into sealed engagement with the exhaust port of the vehicle for off-loading of captured exhaust therefrom. The locking features may be spring loaded or friction or dynamic based, and in some embodiments, can utilize a twisting motion or action for locking the multi-function nozzle assembly in place in a sealed engagement with the fuel port and exhaust port of a vehicle.

By way of example and not limitation, in embodiments, as indicated in the Figures, the locking features 480 can include one or more locking channels 481 defined along the outer surface or wall 432 of the main body portion 431 of the exhaust nozzle 421, and corresponding to locking features, e.g. projections 482 (FIG. 5F) arranged at intervals about an annular rim 483 surrounding the exhaust port 407 of the vehicle, and projecting inwardly therefrom as shown in FIG. 5F. Each of the locking channels 481 (FIGS. 5D-5C) generally can include an open receiving end 484 formed in the annular rim 436 of the main body portion 431 of the exhaust nozzle 421 and configured to receive a corresponding projection therein, a rearwardly extending passage or channel 486, and locking section 487 that extends in a substantially perpendicular direction to the rearwardly extending channel 486.

As a user inserts the multi-function nozzle assembly 401 into the inlet/outlet of the vehicle, the open ends 484 of each of the locking channels 481 of the exhaust nozzle 421 will be brought into alignment with the locking projections 482 formed along the rim or annular surface 483 of the exhaust port 407. The locking projections 482 will slide along the locking channels 481 as the forward end of the exhaust nozzle 421 is moved forwardly and into engagement with the surface of the exhaust port 407. The entire multi-function nozzle assembly then will be rotated, e.g. approximately one-quarter of a turn either clockwise or counterclockwise, to position the locking projections into the locking sections 487 of the locking channels 481 and lock the multi-function nozzle assembly in engagement with the inlet/outlet 406 of the vehicle. During insertion, the multi-function nozzle assembly may need to be rotated, so as to position the locking projections 482 of the exhaust port into alignment with the receiving ends 484 of the locking channels 481 the multi-function nozzle assembly in place.

The annular rim 436 defined about the open front end 434 of the exhaust nozzle also can include a sealing material such as a gasket, o-ring, etc. Such sealing materials will be adapted to seal against the corresponding annular outer surface of the exhaust port. Further, in embodiments, the exhaust port can include a sealing material, such as a plastic or rubberized material coating or compressible sealing material, located thereabout and which can be engaged against the annular rim of the exhaust nozzle to help create a tight, locked seal so as to prevent leakage of exhaust from the exhaust nozzle into the surrounding atmosphere during an exhaust off-load operation. Other locking, latching and/or sealing features also may be utilized. For example, and not by limitation, a threaded connector or other type of locking or press fit connector also can be used.

In addition, in embodiments, the multi-function nozzle assembly also can include guiding of self-locating features 490 (FIGS. 5B, 5C, 5E, and 5G-5I) configured to facilitate alignment of the locking channels 481 of the exhaust nozzle with the corresponding locking projections 482 or features of the exhaust port of a vehicle. By way of example, and not limitation, in some embodiments, a self-locking feature 490 can include a series of magnets 491 that can be arranged in one or more sections about the annular rim 436 of the exhaust nozzle. The magnets 491 of the exhaust nozzle will be attracted to corresponding magnetic elements 492 (FIGS. 5G-5I) that can be arranged about the annular outer surface of the exhaust port. For example, sections of metal or other magnetically attractive materials can be positioned about the annular outer surface of the exhaust port at spaced locations selected to direct or help locate the locking channels of the exhaust nozzle with the corresponding locking features of the exhaust port.

The magnetic self-locating features 490 further can help create a tight, sealed engagement between the exhaust nozzle and the exhaust port by the additional magnetic attraction force created between the exhaust nozzle and the annular outer surface of the exhaust port. The magnetic locating features further can be coated with a plastic, rubber or composite coating material that acts as a sealing materials and prevents direct metal to metal contact between the exhaust nozzle and the annular outer surface of the exhaust port, without diminishing the magnetic attraction force there between, and still allowing rotational movement of the exhaust nozzle. Other types of self-locating or guiding mechanisms also can be used.

FIGS. 5G-5I schematically illustrate operation of the multi-function nozzle assembly 401 according to principles of the present disclosure as part of a combined fueling and exhaust capture system 405 (FIG. 6) for use in vehicle fueling and exhaust off-load operations at a fueling station, e.g. a gas station, railyard, marina, truck-stop, etc. . . . . . The fueling and exhaust off-load operations can be conducted substantially simultaneously, i.e. fuel can be supplied to the fuel tank of the vehicle from the fuel supply 445 via the fuel nozzle, while at substantially the same time, captured exhaust gasses, such as $CO_2$ and/or other byproducts of combustion stored on the vehicle, can be off-loaded through the exhaust nozzle and collected at the exhaust removal and logistics system 447 for downstream processing. Such fueling and exhaust off-loading operations also could be conducted separately using the multi-function nozzle assembly as needed. It further will be understood by those skilled in the art that while the present embodiment illustrates use of the multi-function nozzle assembly for use with a combined fueling and exhaust capture system 405 (FIG. 6), the multi-function nozzle assembly also can be used in other applications, such as, by way of example and not limitation, with a fuel delivery vehicle that is configured to provide a supply of fuel, as well as for removal of exhaust from an exhaust capture device.

As shown in FIGS. 5G-5I, a user or operator will place the multi-function nozzle assembly into the combined inlet/outlet port 406 of the vehicle, and will engage the locking features 480 between the exhaust nozzle 421 and the exhaust port 407, e.g. by moving the locking projections 482 arranged from the exhaust port 407 into and along the locking channels 481 of the exhaust nozzle. In addition, the self-locating features of the multi-function nozzle assembly can cooperate with corresponding self-locating features of the exhaust port so as to position or locate the locking channels of the multi-function nozzle assembly with the corresponding locking features of the exhaust port.

The user or operator will extend the exhaust nozzle of the multi-function nozzle assembly into the exhaust port until the locking projections reach the end of the locking channels, and thereafter will rotate the exhaust nozzle (e.g. by rotating the entire multi-function nozzle assembly) approximately one-quarter of a turn to lock the multi-function nozzle assembly in place, with the exhaust nozzle being sealed against the annular or outer surface of the exhaust port 407. Once the multi-function nozzle assembly has been locked into position, and a proper air-tight seal is indicated between the exhaust nozzle and the exhaust port (e.g. via the use of sensors that can be located along the housing of the multi-function nozzle assembly, along the exhaust outlet passage, and/or between the annular rim thereof and the annular outer surface of the exhaust port), the user or operator can engage the trigger 459, e.g. pull or squeeze the trigger rearwardly in the direction of arrow 461, causing the corresponding linkage 461 coupling the handle to the fuel nozzle 422 to extend. In addition, once a lock position is reached, the magnetic attraction between the surface of the exhaust port and the exhaust nozzle, e.g. through the engagement of the magnetic self-locating features, can intensify to help create a substantially tighter seal due to the sealing over-coating applied over the magnets and magnetically attractive surfaces 492 of the exhaust nozzle and exhaust port, creating seal compression.

As indicated in FIG. 5I, the forward end 422A of the fuel nozzle 422 will be urged or driven fuel nozzle into a friction fit within the fuel port of the vehicle fuel tank, whereupon the sealing features, e.g. the gaskets, o-rings etc. located along or adjacent the area 409A behind the fuel port 409 and cooperative features positioned along the fuel nozzle engage to create a substantially air-tight fully sealed condition.

Once the fueling and exhaust capture system 405 (FIG. 6) recognizes that the exhaust and fuel nozzles have been properly connected, with adequate seals between the fuel and exhaust nozzles and their respective exhaust outlet and fuel ports, the fueling and exhaust capture system can initiate a fueling operation during which fuel will be supplied through the fuel intake line and the fuel nozzle of the multi-function nozzle assembly 401 and into the vehicle's fuel tank. At substantially the same time, the fueling and exhaust capture system also can start an off-load of the exhaust gasses, such as $CO_2$ and other combustion byproducts, through the exhaust nozzle of the multi-function nozzle assembly and along the combined fuel and exhaust conduit. As noted, the fueling and exhaust off-load operations can be conducted together, with the fuel flowing in from the fuel supply as shown in FIG. 6, and the exhaust flowing out, in an opposite direction along the combined fuel and exhaust conduit.

As further indicated in FIGS. 5I-5I, the fuel nozzle generally will include one or more sensors, including at least one fuel sensor 463 that can be located along the fuel passage 426, as well as at least one sensor 496 configured to monitor pressure of the outflow of exhaust along the exhaust passage of the exhaust nozzle. Other sensors, such as for measurement of temperature of the exhaust, also can be provided. The sensor 463 can monitor the flow of fuel and signal the fueling and exhaust capture system to substantially slow and then stop the flow of to the fuel nozzle upon detection of a predetermined back-flow pressure as an indication that the fuel tank is reaching a full condition.

In addition, the exhaust outlet passage can have one or more built-in pressure sensors 496 (FIG. 5D) that can monitor the outflow of exhaust and can shut down the outflow of exhaust along the exhaust passage upon a predetermined or selected pressure reading. For example, as the captured exhaust is off-loaded, the pressure of the flow of exhaust may decrease. The fueling and exhaust system can be programmed to stop an exhaust off-load operation when a pre-determined or selected back-flow pressure at the outflow of exhaust is detected. This pressure can be selected to leave some exhaust gas within the vehicle to provide a remaining working volume and/or pressure of exhaust within the vehicle. In addition, temperature of the outflow of exhaust also can be measured to provide a further control point for stopping the exhaust off-load.

The multi-function nozzle assembly 401 may also include pin or input/output connectors 493 as indicated in FIG. 5C that connect the sensors therein, to the fuel pump for providing sensor feedback, e.g. fuel and exhaust flow back pressure readings, temperature, etc. to the fueling and exhaust capture system, and for communication between the fuel pump and a vehicle. Such input/output connectors may correspond to associated pins or input/output connectors located on, disposed in or on, or connected to the exhaust port of the vehicle. In such an embodiment, the vehicle may include corresponding pins or input/output connectors. The pin or input/output connectors of the vehicle may attach to, be in signal communication with, or connect to the on-board vehicle exhaust capture system. In some example, the fuel and exhaust pump 400 also may connect via wireless connection, e.g., such as Wi-Fi, Bluetooth, near field communication (NFC), and/or another method of wireless communication, to the on-board vehicle exhaust capture system.

In embodiments, the on-board vehicle exhaust capture system may store data regarding an amount or quantity of exhaust currently in the on-board vehicle exhaust capture device. The data may be stored in a memory accessible via the pins or inputs/outputs of the vehicle. The data may be accessible in an off-line or powered down state. The data may, as noted, include the amount of exhaust stored in the on-board vehicle exhaust capture system. The data may also include a tag that can identify a specific vehicle engaged by the multi-function fuel nozzle for associating with such an amount of exhaust off-loaded with the vehicle. The tag may be arbitrary numbers and/or text. The tag may be specific to a vehicle, e.g., a vehicle identification number (VIN). As the data is transferred to the fuel and exhaust pump 400 via the pins or input/output, connections between the vehicle and the multi-function nozzle, the tag information may be transferred as well. As such, the data gathered regarding an amount of exhaust off-loaded may be associated to a specific or particular vehicle and any further data gathered may indicate how much exhaust has been off-loaded from that specific or particular vehicle.

Figure 8A:
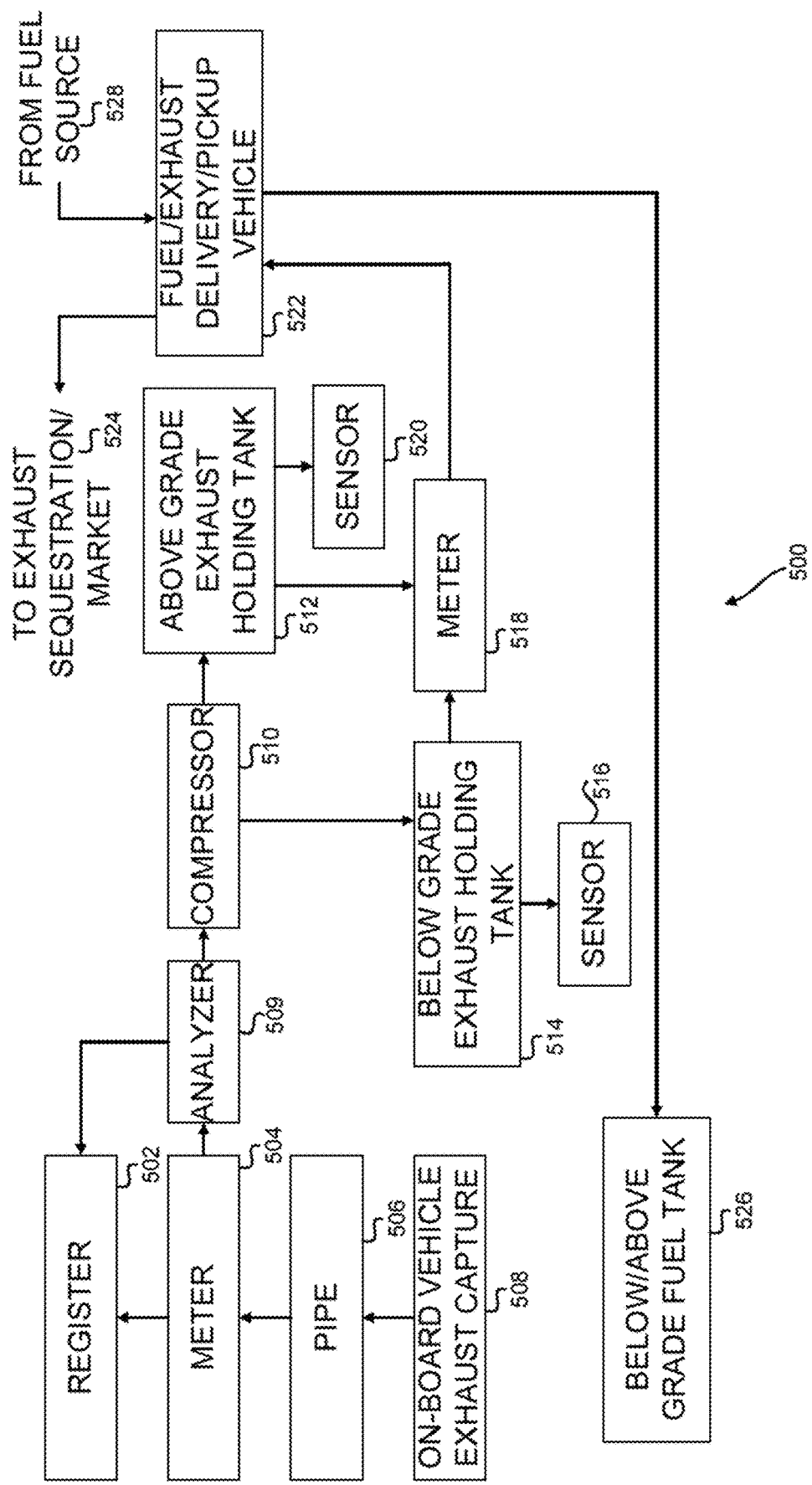
FIG. 8A, FIG. 8B, and FIG. 8C are simplified diagrams that illustrates a novel implementation of a fuel and exhaust station that offers off-load of captured exhaust from a vehicle and pick-up or transport to a delivery vehicle, according to one or more embodiments of the disclosure.
Figure 8B:
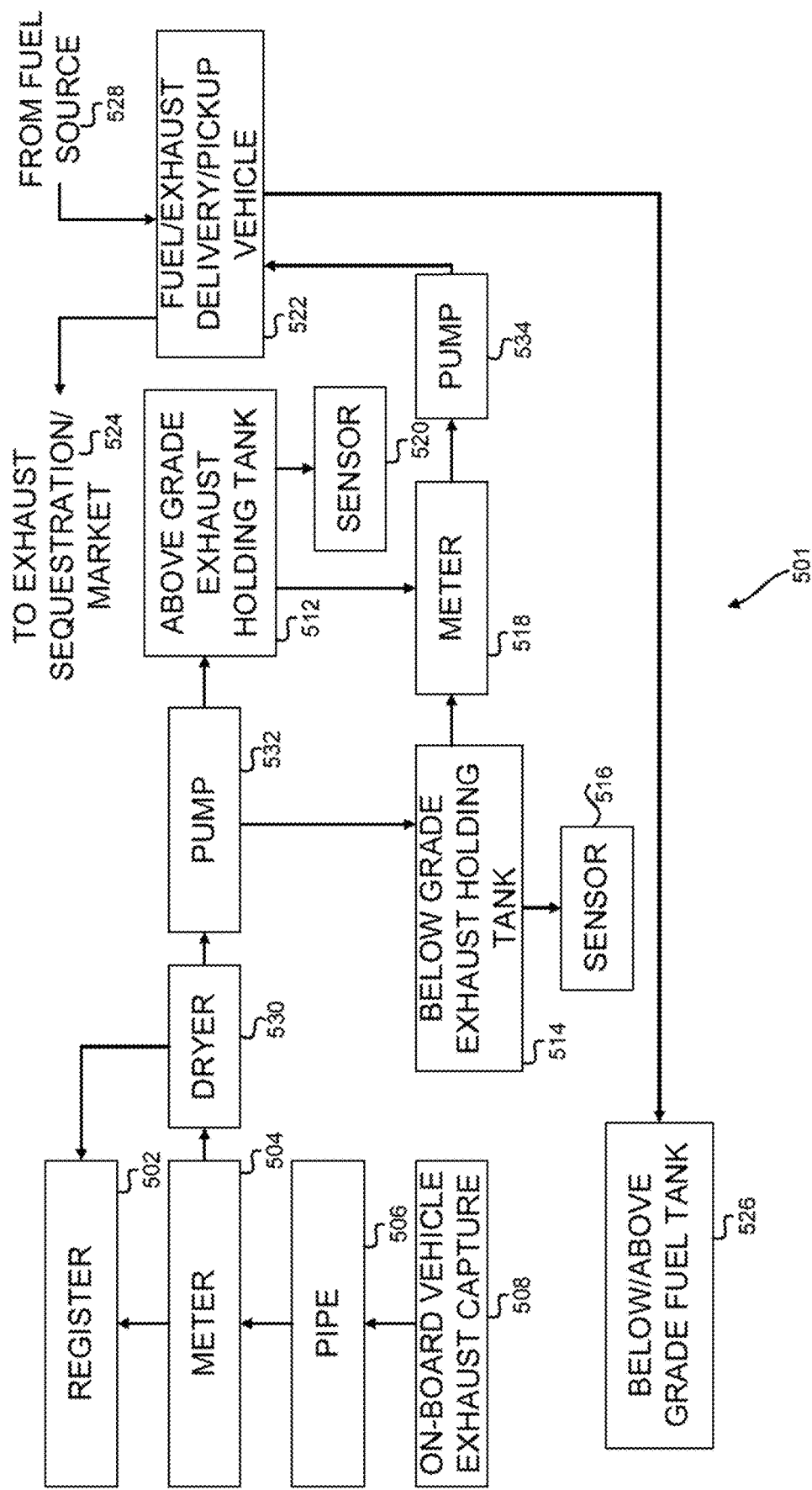

FIG. 8A and FIG. 8B are simplified diagrams that illustrate novel implementations of a fuel and exhaust station offering off-load of captured exhaust from a vehicle and pick-up or transport to a delivery vehicle, according to one or more embodiments of the disclosure. The on-board vehicle exhaust capture device 508 may be included on or in a vehicle. The on-board vehicle exhaust capture device 508 may include various components to capture exhaust from an internal combustion engine or any other type of engine which may produce exhaust. In another embodiment, the on-board vehicle exhaust capture device 508 may additionally or solely capture gases, chemicals in and/or from the atmosphere. In such examples, the on-board vehicle exhaust capture device 508 may capture carbon dioxide. Other gases and/or chemicals may be captured inadvertently. Further, in the example where the on-board vehicle exhaust capture device 508 captures or sequesters greenhouse gases from the atmosphere, the on-board vehicle exhaust capture device 508 may be added to or integrated into or onto any type of vehicle, such as an electric vehicle, a fuel-cell based vehicle, a natural gas based vehicle, and/or any other alternative fuel based vehicle, such vehicles including motorist vehicles, locomotives, airplanes, marine vessels, equipment, and other types of vehicles. In such examples, the carbon dioxide offset by the use of the alternative fuel based vehicle may be further offset by the use of the on-board vehicle exhaust capture device 508. Further, during the operational lifetime of an alternative fuel vehicle equipped with an on-board vehicle exhaust capture device 508, the carbon intensity or amount of carbon generated by the production of such alternative fuel based vehicle and/or by the production of the type of fuel used by the alternative fuel based vehicle may be completely offset and/or even be a negative value.

Captured exhaust from the on-board vehicle exhaust capture device 508 may be transferred to a pipe 506. The exhaust may be transferred from the on-board vehicle exhaust capture device 508 to the pipe 506 via an exhaust nozzle, such as an exhaust nozzle of a multi-function nozzle assembly as described herein with respect to FIGS. 5B-5I, or by a separate exhaust nozzle as described with reference to FIGS. In another embodiment, the on-board vehicle exhaust capture device 508 may include a module to store the exhaust. The module may be swappable and/or removable from the corresponding vehicle. To remove exhaust, a motorist, technician, mechanic, or other user may remove the module. The module may have a portion thereof that corresponds to a slot, notch, or portion of the exhaust pump. As the module is inserted into the slot, notch, or portion of the exhaust pump, a corresponding pipe or component may insert into the module. The exhaust may then be transferred, via the pipe or component, from the module to the pipe 506. In another embodiment, a full module may be exchanged with an empty module. The full module may be emptied at the scalable greenhouse gas capture system 500.

As exhaust travels through the pipe 506, the exhaust may come into contact with or travel through a meter 504. The meter 504 may measure or determine the amount of exhaust flowing through the pipe 506. The meter 504 may send such a determination to a register 502. The register 502 may determine the cost or value of such an amount of exhaust, such as carbon dioxide therein. The register 502 may display the amount of exhaust flowing through the pipe 506. The register 502 may display a continuously updated real-time amount of exhaust being off-loaded. The amount may be an increasing amount, indicating the cumulative amount of exhaust. The amount may be a decreasing amount, indicating the decreasing amount from the on-board vehicle exhaust capture device 508. The meter 504 may be a flow meter, mass flow meter, Coriolis meter, or other meter suitable for determining an amount of exhaust flowing through pipe 506. Such a meter 504 may be configured to withstand high and low pressures and/or high and low temperature, based on the phase or form of the exhaust (e.g., liquid or gas).

After exhaust flows through the meter 504, the exhaust may travel to or through an analyzer 509. In one or more embodiments, a portion or sample of the exhaust may travel to or through the analyzer 509, rather than the entirety of the exhaust traveling to or through the analyzer 509. The analyzer 509 may perform a composition analysis of the exhaust. The analyzer 509 may determine the composition of the exhaust, e.g., percentages of exhaust components. The analyzer 509 may be a chromatographic analyzer or spectroscopic analyzer, e.g., an infrared analyzer, residual analyzer, orsat analyzer, thermal analyzer, Raman analyzer, and/or any type of analyzer to determine composition of a fluid. The analyzer 509 may transfer a representation of the exhaust composition to the register 502 for display. The analyzer 509 may store or transfer the composition data to a computing device as well, e.g., for reporting purposes. Such a report may include one or more of: an amount or quantity of exhaust captured from a vehicle or from a set of vehicles, an analysis of exhaust from a vehicle or from a set of vehicles, and/or an analysis of the total stored exhaust. Such a report may be utilized in determining carbon credits. The report may also be transferred or sent to the local, state, and/or federal government, e.g., to provide information in relation to compliance with standards and/or participation in carbon reduction programs or as a jurisdictional tax requirement. The analyzer 509 may also prompt the system to safely shut-down in the event of specification discrepancies, for example, for downstream logistics and/or carbon dioxide markets where carbon dioxide is used as a feedstock.

Such stored data, analysis, and/or reports from the analyzer 509 may be associated with a vehicle that the exhaust is off-loaded from. The vehicle may be identified based on data received via the register 502 or other device from the vehicle or on-board vehicle exhaust capture device 508. In such examples, a baseline may be generated for exhaust composition of a particular vehicle. As additional exhaust is analyzed, new compositional data may be compared with the baseline. Based on differences between the baseline and new compositional data.

With respect to the vehicle, the exhaust may be compressed, e.g., via the on-board vehicle exhaust capture device 508 or prior to transfer to the pipe 506. However, as the exhaust travels through the pipe 506, pressure may decrease, due to, for example, the length of the pipe 506 and/or friction of the interior of the pipe 506. The pressure of the exhaust may also decrease after flow through analyzer 509 and/or meter 504 as described above. After analysis via the analyzer 509 and/or measurement via the meter 504 as disclosed above, the exhaust may flow to a compressor 510. Compressor 510 may be used to compress the exhaust such that a larger amount of exhaust may be stored. In another example, the exhaust or carbon dioxide may be converted into a liquid, either through compression and/or temperature changes or through a catalyst. In such examples, the compressor 510 may or may not be utilized. In another embodiment, the exhaust holding tank may be configured to withstand a particular pressure and the pressure of the exhaust may be significantly higher than the particular pressure. In such embodiments, the pressure drop above may be utilized to ensure that the exhaust is at the proper pressure prior to reaching the exhaust holding tank. However, as multiple vehicles output exhaust, the pressure drop may decrease or increase past a specified point or threshold. In such examples, the pressure of the exhaust may be controlled via pressure control devices positioned throughout the system. Pressure control devices may include the compressor 510, pumps, control valves, control valves, and/or some combination thereof.

After compression, via compressor 510, or conversion of the exhaust to a liquid (or solid), the exhaust may be transferred to an exhaust holding tank. The exhaust may be transferred to a below-grade exhaust holding tank 514 and/or an above-grade exhaust holding tank 512. Such a scalable greenhouse gas capture system 500 may include one or more below-grade exhaust holding tanks and/or one or more above-grade exhaust holding tanks. The exhaust holding tanks may be configured to store a highly compressed gas. The exhaust holding tanks may also be configured to store a low temperature fluid or, in particular, a liquid.

In another embodiment, the scalable greenhouse gas capture system 500 may include a pump in addition to or rather than the compressor 510. In another embodiment, neither the pump or the compressor 510 may be included in the scalable greenhouse gas capture system 500. In an example, where the exhaust or greenhouse gas is obtained from the vehicle in a liquid form, the scalable greenhouse gas capture system 500 may include a pump or other means to create suction or pressure to allow for the liquid to flow through the scalable greenhouse gas capture system 500 to an exhaust holding tank. In another example, where the exhaust or greenhouse gas is obtained from the vehicle in a gaseous form, the scalable greenhouse gas capture system 500 may include a compressor 510, a pump, and/or other means to create suction or pressure to allow for the gas to flow through the scalable greenhouse gas capture system 500 to an exhaust holding tank. In such examples, the scalable greenhouse gas capture system 500 may include one or more pumps, compressors, other means to create suction or pressure, and/or some combination thereof, at varying points throughout the scalable greenhouse gas capture system 500.

As exhaust is transported to the exhaust holding tanks, e.g., below-grade exhaust holding tank 514 and/or above-grade exhaust holding tank 512, the exhaust holding tanks may fill up to or near a safely defined working capacity. Each exhaust holding tank may include a capacity to store a certain amount of fluid. As the exhaust holding tank reaches working capacity, the exhaust holding tank may not be able to accept more exhaust or fluid. A sensor, e.g., sensor 516 and/or sensor 520, may be connected to, integrated in or on, or disposed inside the exhaust holding tank to determine or measure an amount of exhaust within the exhaust holding tank. The sensor, e.g., sensor 516 and/or sensor 520, may determine the level of the exhaust within the exhaust holding tank or the amount of capacity available in the exhaust holding tank. In another embodiment, the amount of capacity may be determined via a computing device or the register, based on signals from the sensor, e.g., sensor 516 and/or sensor 520 or based on meter readings. Any of the components described herein may include a redundant or back-up component to ensure continued operation during component failure. For example, if meter 518 fails, an identical or similar meter disposed nearby meter 518 may be utilized. When the exhaust holding tank reaches working capacity, the register 502, an exhaust pump, or computing device may prevent the further off-loading or transport of exhaust to the exhaust holding tank. In such an example, a user attempting to off-load exhaust may be prevented from off-loading exhaust. Further, the register 502 may notify or display a notification to the user of another location offering similar exhaust off-loading capabilities. Such a notification may include multiple nearby locations offering similar capabilities. Such nearby locations may additionally be indicated via roadside signs or other advertisements.

Each exhaust holding tank, e.g., below-grade exhaust holding tank 514 and/or above-grade exhaust holding tank 512, may be connected to an exhaust delivery/pickup vehicle port 522. The exhaust delivery/pickup vehicle port 522 may allow for a delivery vehicle to accept or obtain the exhaust from the exhaust holding tanks 512. In one or more embodiments, the delivery vehicle, e.g., originating from a fuel source 528, may provide fuel to a fuel tank, e.g., a below-grade fuel tank 526, prior to obtaining or on-boarding of exhaust through exhaust delivery/pickup vehicle port 522. A meter 518 may be disposed between the exhaust holding tank and exhaust delivery/pickup vehicle port 522. The meter 518 may measure the amount of exhaust flowing from the exhaust holding tank and/or may determine a total amount of exhaust that was stored in the exhaust holding tank. The meter 518 may provide such data to a computing device, which may be included in the scalable greenhouse gas capture system 500. The computing device may be external to the scalable greenhouse gas capture system 500, e.g., at a remote and/or separate location. The computing device may take such data and store the data with tags that associate the data with a user and location. The tags may include data such as location, users associated with quantities of exhaust, time of each exhaust off-load, and/or time of each exhaust pickup. The computing device may further determine pick-up schedules based on the tags and data, e.g., if the exhaust holding tanks reach capacity at close to the same amount of days at different time intervals, then the computing device may update or alter pick-up schedules to maximize the amount of time to reach capacity, or in other words, to maximize the capacity utilization and reach optimization within the downstream logistic network. The computing device may calculate or determine and offer for sale an amount of carbon credits based on the amount of returned or off-loaded exhaust.

As noted, off-loaded exhaust may comprise a liquid. For example, the off-loaded exhaust may be liquid carbon dioxide, which may or may not include portions of nitrogen and/or varying amounts of water. The amount of water in the liquid carbon dioxide may be based on the ambient environment temperature or, in other words, the temperature of the environment around the vehicle off-loading carbon dioxide. As such, and as illustrated in FIG. 8B, the system 501 may include, rather than or in addition to including compressors (e.g., compressor 510), a pump 532. The pump 532 may be configured to generate flow of the liquid carbon dioxide from the on-board vehicle exhaust capture device 508 to an exhaust holding tank (e.g., the below grade exhaust holding tank 514 and/or the above grade exhaust holding tank 512). Further, a pump 534 may be included to transport the liquid carbon dioxide from the exhaust holding tank (e.g., the below grade exhaust holding tank 514 and/or the above grade exhaust holding tank 512) to a delivery/pickup vehicle.

In embodiments, due to the low temperatures and/or potentially high pressure of such a system, the exhaust holding tank (e.g., the below grade exhaust holding tank 514 and/or the above grade exhaust holding tank 512) may be configured to withstand high pressures. A non-limiting example may include a tank configured to withstand about 350 psig. The exhaust holding tank (e.g., the below grade exhaust holding tank 514 and/or the above grade exhaust holding tank 512) may be further configured to withstand and maintain low temperatures, such as via insulation, refrigeration units, heat tracing, and/or other methods as will be understood in the art.

In a non-limiting, illustrative example, a vehicle may store liquid carbon dioxide at about 1450 psia, which may be considered a super-critical liquid or fluid. The temperature of the liquid carbon dioxide may vary based on the ambient temperature of the vehicle. As the liquid carbon dioxide is off-loaded, the pressure drop from the on-board vehicle exhaust capture device 508 to the exhaust tank may cause the temperature of the liquid carbon dioxide to fall further (e.g., about 10 degrees Fahrenheit to about 12 degrees Fahrenheit per 100 psi reduction). As such, temperatures of the liquid carbon dioxide may reach as low about 0 degrees Fahrenheit.

To prevent damage to devices within the system 501, the devices or equipment may be configured to withstand such low temperatures. Further, this temperature change may cause issues for the vehicle, since the pressure within the on-board vehicle exhaust capture device is lowered as exhaust is off-loaded. To prevent such an issue, the system 501 may be configured to cause the pressure drop after a point where the exhaust enters the system 501. Pressure control devices (e.g., pressure control device 554A, pressure control device 554B, pressure control device 554C, and/or up to pressure control device 554N) may be included or positioned throughout the system, such as pumps, control valves, spillback loops, and/or other devices and/or equipment configured to maintain or adjust pressure.

Due to potential temperature drops below 32 degrees Fahrenheit, as described above, any water included in the liquid carbon dioxide may freeze at any point within the system 501. Freezing of water may cause blocks or clogs within the system 501. As such the system 501 may include a dryer 530. The dryer 530 may be positioned along the pipe 506. The dryer 530 may be positioned immediately or substantially immediately, or in some examples further downstream, after a point where liquid carbon dioxide enters the system 501 from the on-board vehicle exhaust capture device 508. The dryer 530 may include a desiccant configured to allow liquid to flow therethrough and absorb water therein. All piping, equipment, devices, storage vessels or tanks, and the like may be configured to include a material property and operating life to safely handle and transport carbon dioxide as well as residual water and other constituents at varying pressures and/or temperatures. For example, the piping, equipment, devices, storage vessels or tanks may be comprised of stainless steel or some other material, may be coated, may be insulated, and/or may include heat tracing.

Figure 8C:
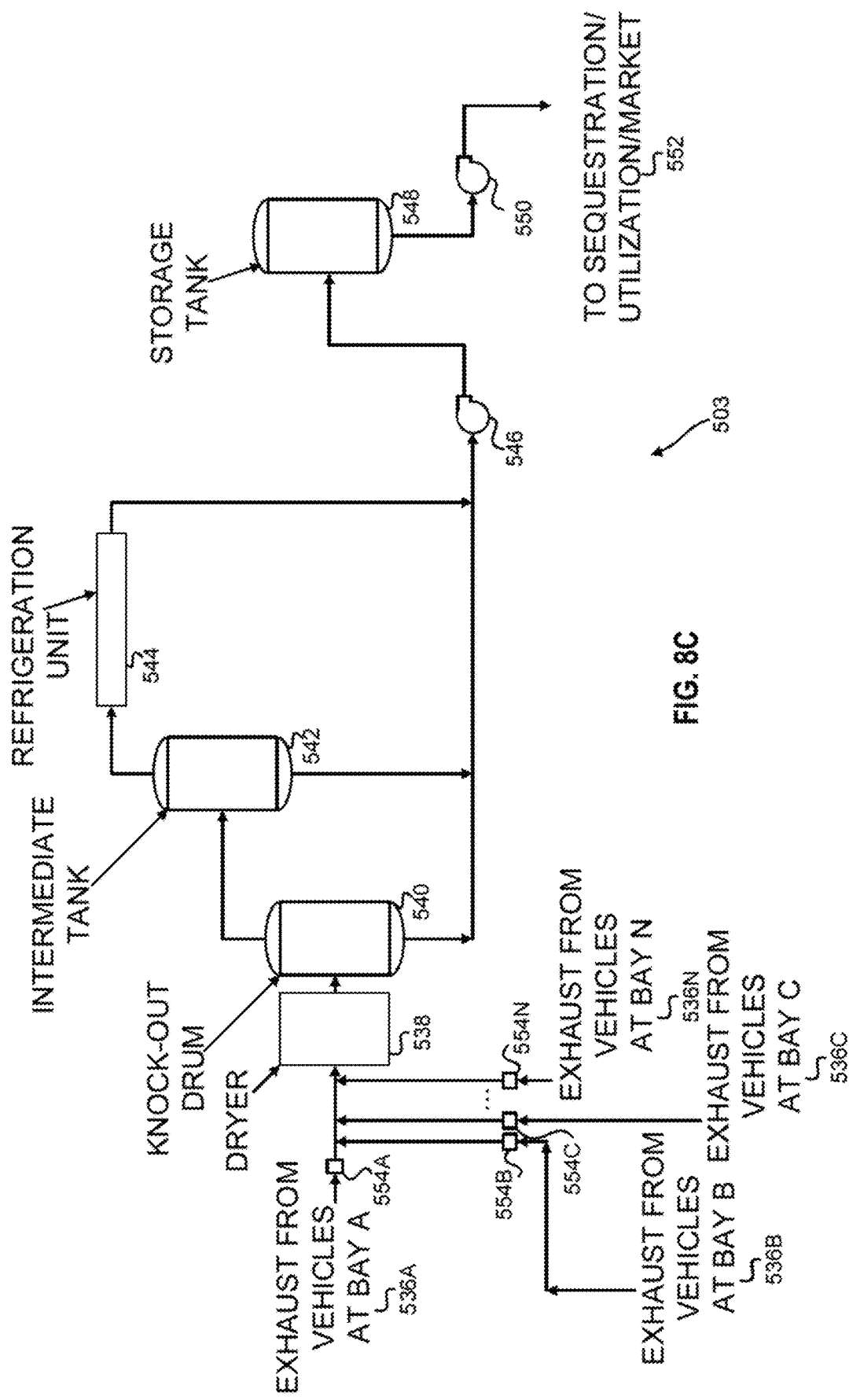

FIG. 8C is a simplified diagram that illustrate a novel implementation of a fuel and exhaust station offering off-load and processing of captured exhaust, according to one or more embodiments of the disclosure. Similar to FIG. 6B, the system 503 of FIG. 6C may include a dryer 538. The dryer 538 may remove any water from a liquid exhaust transported from a vehicle 536. The liquid may be transported to a knock-out drum 540. The knock-out drum 540 may separate any vapor that has formed from the liquid to an intermediate tank 542, while the liquid is pumped, via pump 546, to the storage tank 548. The intermediate tank 542 may store the vapor and transport the vapor to a refrigeration unit 544. The intermediate tank 542 may include a metal organic framework. The metal organic framework may store the vapor thereby controlling the amount of vapor flowing through the refrigeration unit 544. The vapor may be circulated through the refrigeration unit 544, until the vapor is condensed to a liquid. The liquid may also be transported, via pump 546, to the storage tank 548. The liquid carbon dioxide may be stored in the storage tank 548 until ready for pickup. Upon pickup, the liquid carbon dioxide may be pumped, via pump 550, to a delivery vehicle for sequestration or market (see 552).

Figure 9A:
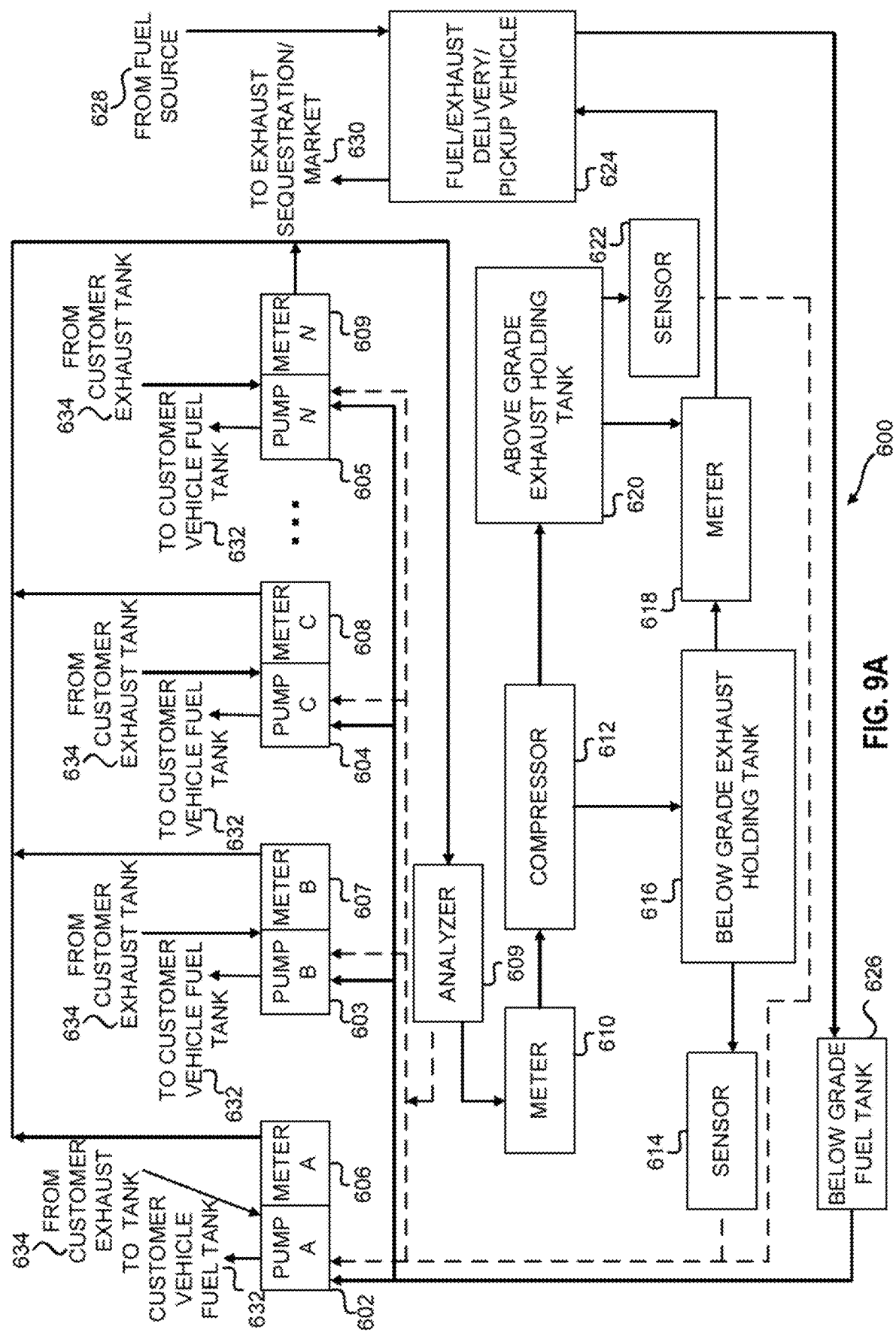
FIG. 9A, FIG. 9B, and FIG. 9C are simplified diagrams that illustrates a novel implementation of a fuel and exhaust station that offers off-load of captured exhaust from a vehicle and pick-up or transport to a delivery vehicle, according to one or more embodiments of the disclosure.
Figure 9B:
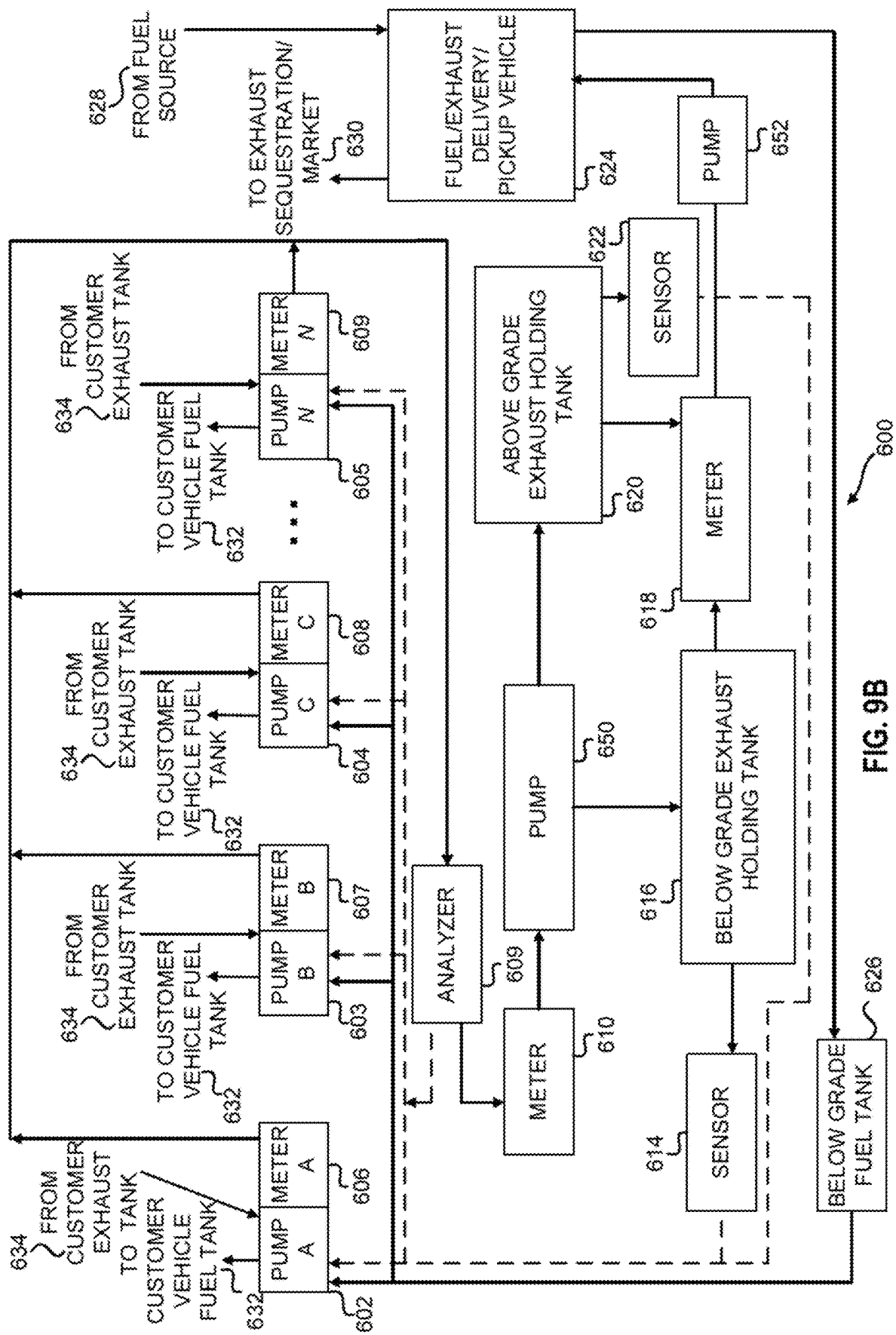
Figure 9C:
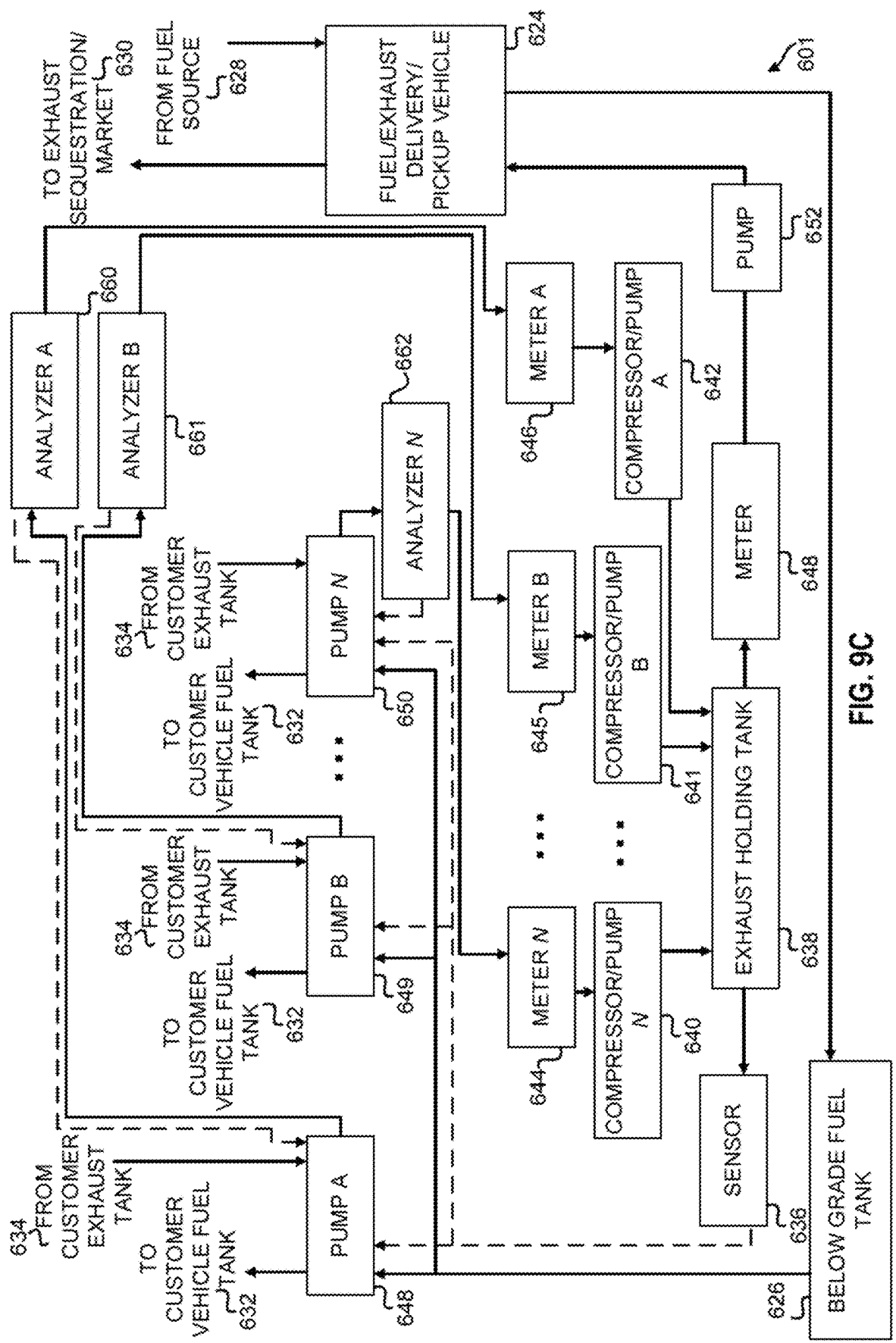

FIG. 9A, FIG. 9B, and FIG. 9C are simplified diagrams that illustrate a novel implementation of a fuel and exhaust station offering off-load of captured exhaust from a vehicle and pick-up or transport to a delivery vehicle, according to one or more embodiments of the disclosure. Similar to FIGS. 2A and 2C, a system may include one or more pumps, e.g., pump A 602, pump B 603, pump C 604, and up to pump N 605. The pumps may include nozzles to provide fuel to vehicle fuel tanks 632 and nozzles to pump exhaust from the vehicle exhaust tanks 634. The pumps may include a meter or meters to determine an amount of fuel being transported to the vehicle and a meter or meters to determine an amount of exhaust being transported from the vehicle e.g., meter A 606, meter B 607, meter C 608, and up to meter N 609. Such a meter may transmit or send data to a computing device and/or the pumps. The pumps may include a user interface that displays the amount of fuel flowing to the vehicle and exhaust exiting the vehicle. The amount of exhaust being transported may be determined in real-time to provide the user a compounded amount of exhaust transported through the systems. The pumps may include a counter that provides a decrementing exhaust total, e.g., beginning with a total exhaust in a vehicle exhaust tank that counts down to zero. The total may, as exhaust is pumped from the vehicle exhaust tank, decrement. In another example, the counter may start at zero and incrementally increase as exhaust is pumped from the vehicle exhaust tank. The meter or meters may be co-located with, adjacent with, or included with or in the pumps, see FIG. 9A. The meter or meters may be located separate from the pumps, e.g., such as meter A 646, meter B 645, and/or meter N 644.

Another meter 610 may be situated or disposed prior to the compressor 612. Such a meter 610 may measure the total amount of exhaust flowing to an exhaust holding tank, e.g., below-grade exhaust holding tank 616, above-grade exhaust holding tank 620, and/or exhaust holding tank 638. The meter 610 may be redundant in case of failure of any of the other meters disposed throughout the scalable greenhouse gas capture system 600. In another example, the meter 610 may provide data to ensure that the exhaust holding tank(s) are not overfilled. The scalable greenhouse gas capture system 601 may include multiple smaller compressors, e.g., compressor A 642, compressor B 641, or compressor N 640, per each pump (e.g., a fuel and/or exhaust dispenser/pump), rather than one compressor, e.g., compressor 612, for all pumps (e.g., a fuel and/or exhaust dispenser/pump).

After flowing through the meter 610, the exhaust may flow to a compressor 612 to be compressed or further compressed. Thereafter, the compressed exhaust may flow to one or more exhaust holding tanks, e.g., below-grade exhaust holding tank 616, above-grade exhaust holding tank 620, and/or one or more of each. The exhaust may, when a pickup operation occurs, flow through a meter 618. Further, as described herein, each exhaust holding tank may include or be connected to a sensor to provide data to determine whether each of the exhaust holding tanks are near, approaching, or at working capacity. The sensor may provide data to be utilized to determine a total capacity or actual capacity of each of the exhaust holding tanks. In another embodiment, the scalable greenhouse gas capture system 600 may include an analyzer, e.g., analyzer A 660, analyzer B 661, and/or analyzer N 662, per pump or one analyzer 609 for multiple pumps.

The exhaust holding tank may connect to one or more compressed exhaust delivery/pick-up vehicle connections or ports 624, while the below grade fuel tank 626 may connect to one or more fuel delivery vehicle connections or ports. A delivery vehicle may deliver fuel (see 624), from a fuel source 628, to the below grade fuel tank 626 via the fuel delivery vehicle connections or ports. Further, via exhaust pick-up vehicle connections or ports, a delivery or pick-up vehicle may obtain exhaust.

As noted, the exhaust off-loaded from a vehicle may be a liquid. In such examples, rather than a compressor, the system may include a pump 650 to transport or pump the exhaust from a vehicle to the below grade exhaust holding tank 616 and/or the above grade exhaust holding tank 620. Further, a pump 652 may be positioned to pump the liquid exhaust from the below grade exhaust holding tank 616 and/or the above grade exhaust holding tank 620 for delivery/pickup.

Figure 10:
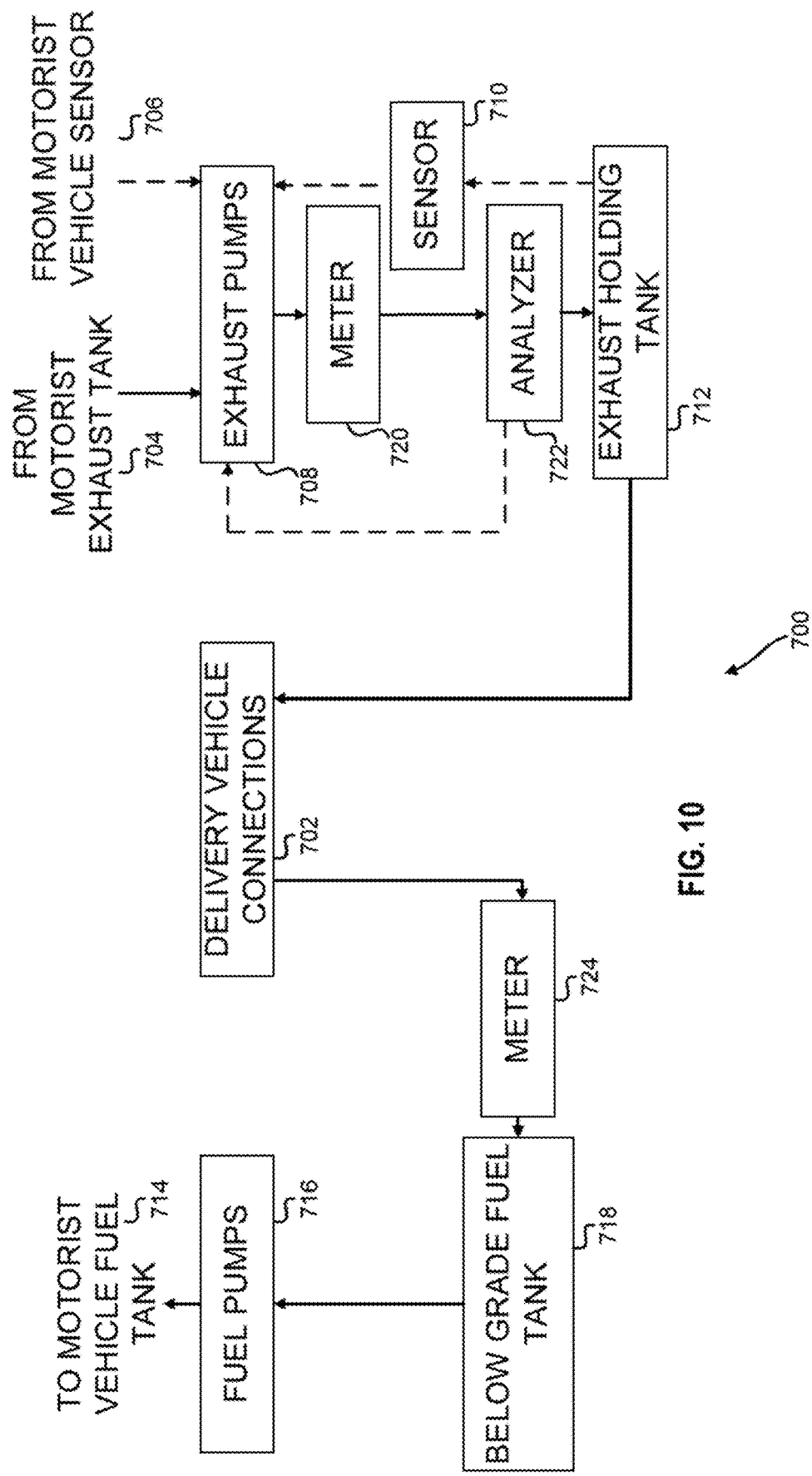
FIG. 10 is a simplified diagram that illustrates a novel implementation of a fuel and exhaust station that offers separate areas for off-load of captured exhaust from a vehicle and fueling of a vehicle, as well as pick-up or transport to a delivery vehicle, according to one or more embodiments of the disclosure.

FIG. 10 is a simplified diagram that illustrates a novel implementation of a fuel and exhaust station offering separate areas for off-load of captured exhaust from a vehicle and fueling of a vehicle, as well as pick-up or transport to a delivery vehicle, according to one or more embodiments of the disclosure. The scalable greenhouse gas capture system 700 may include a set of fuel pumps 716 and a set of exhaust pumps 706 (e.g., similar to fuel and exhaust pump 200, 300, 400). In one or more embodiments, the fuel pumps 716 may be separate from the exhaust pumps 706. In an example, the scalable greenhouse gas capture system 700 may include sets of, rows of, or islands of fuel pumps 716. At each set, row, or island of fuel pumps 716, one or more separate and distinct exhaust pumps 708 may be included. In another embodiment, the exhaust pumps 708 may be located separate from any fuel pumps 716. In at least one embodiment, the scalable greenhouse gas capture system 700 may not include fuel pumps 716. In such examples, the exhaust pumps 708 may be included at a variety of locations, such as, including, but not limited to, a service station, an automotive repair center, a convenience store, a parking garage or lot, a seaport, a truck stop, a truck terminal, a truck depot, a bus depot, a truck weighing station, or any location with space to include the components related to the exhaust pumps 708 and exhaust holding tank 712.

Each of the fuel pumps 716 may be connected to a below-grade fuel tank 718 that has a meter 724 associated therewith. The meter 724 may be disposed within delivery vehicle connections 702 of the below-grade fuel tank 718 such that the amount or quantity of fuel is provided to the below-grade fuel tank 718 via the delivery vehicle connections 702 (e.g., from a delivery vehicle) may be measured. Other components may be included in relation to the fuel pumps 716, as described throughout. Thus, users may re-fuel a vehicle fuel tank 714 via one of the fuel pumps 716.

Figure 20A:
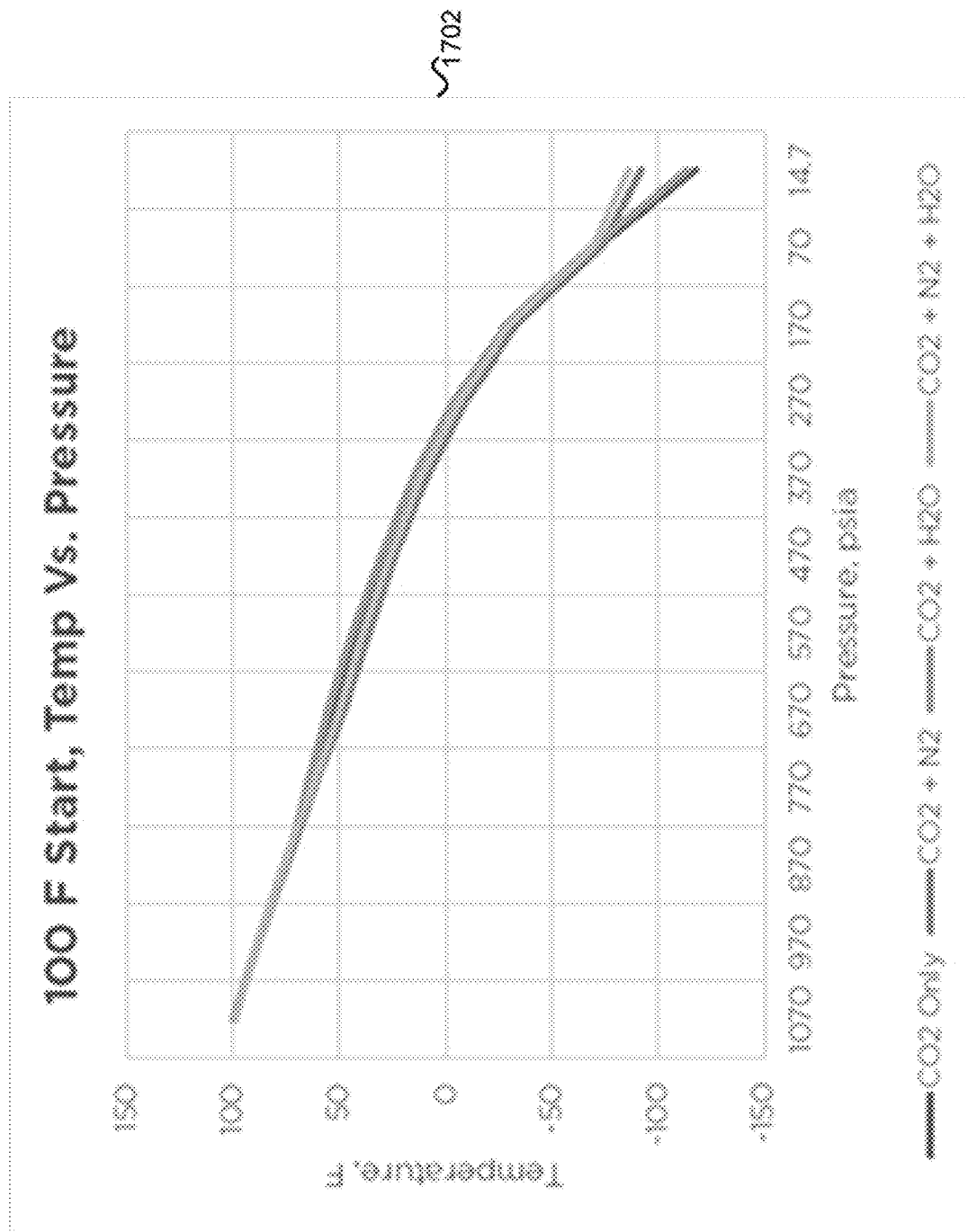
FIG. 20A, FIG. 20B, FIG. 20C, and FIG. 20D are charts illustrating the relationship between pressure, temperature, and vapor fraction according to an embodiment.
Figure 20B:
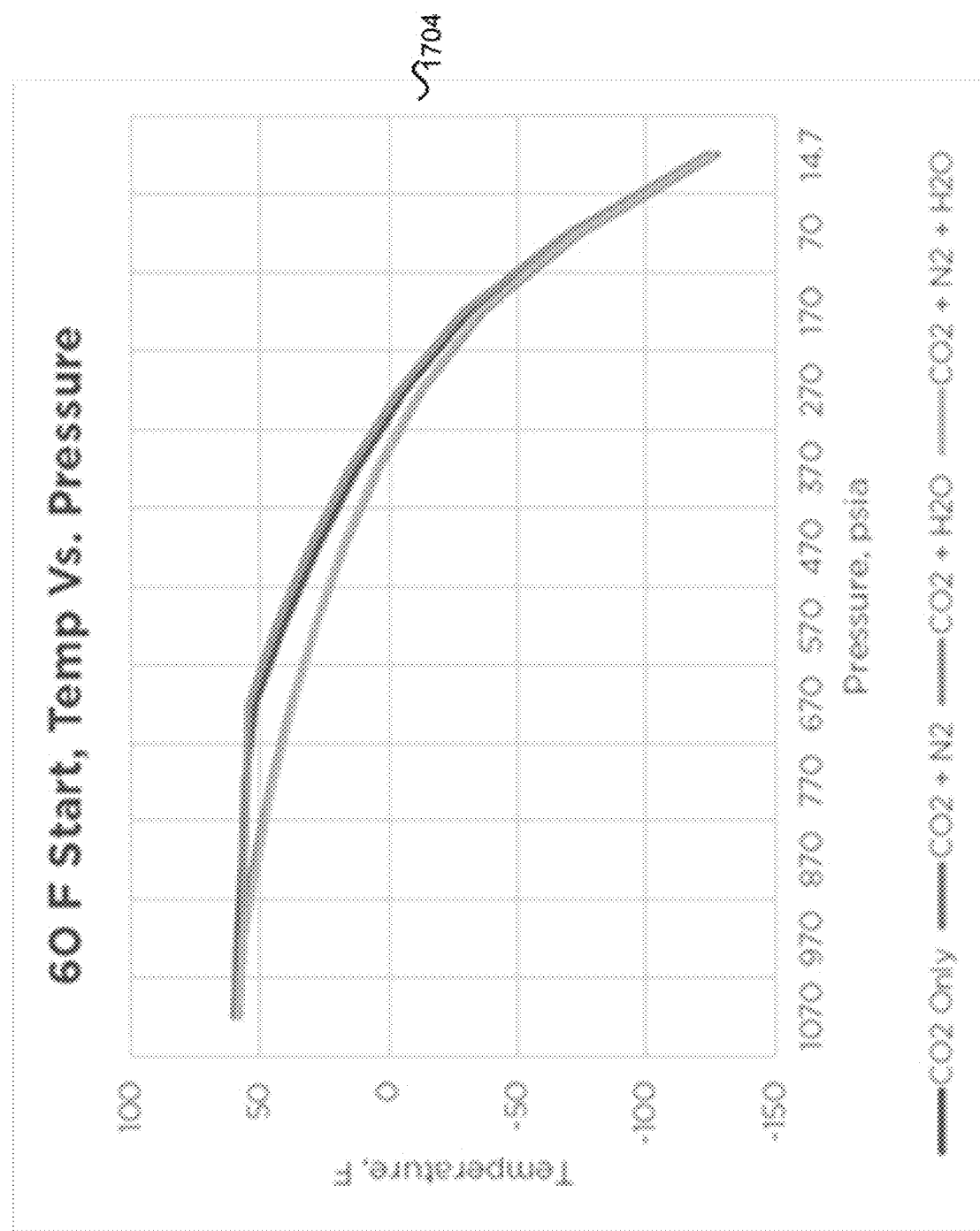
Figure 20C:
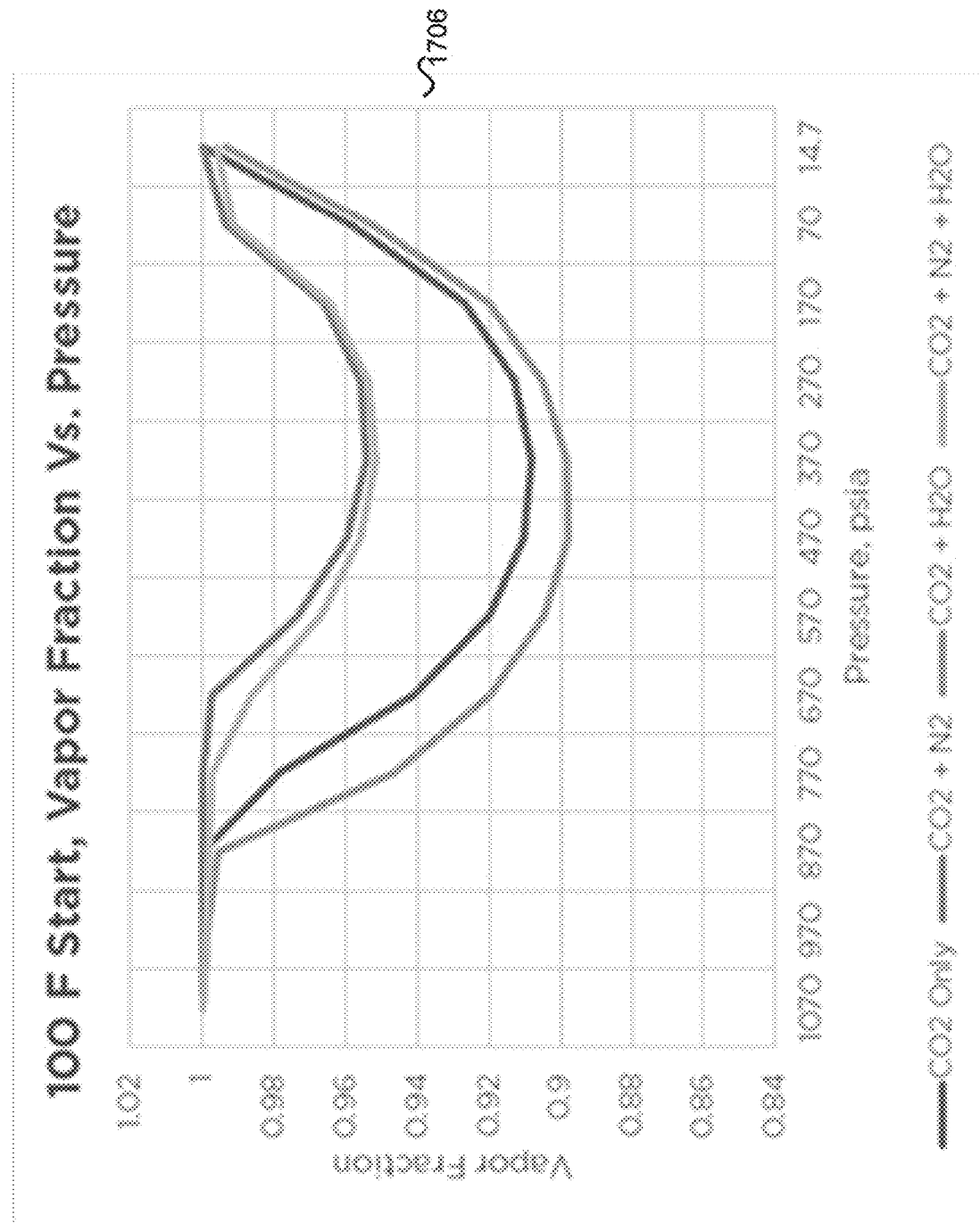
Figure 20D:
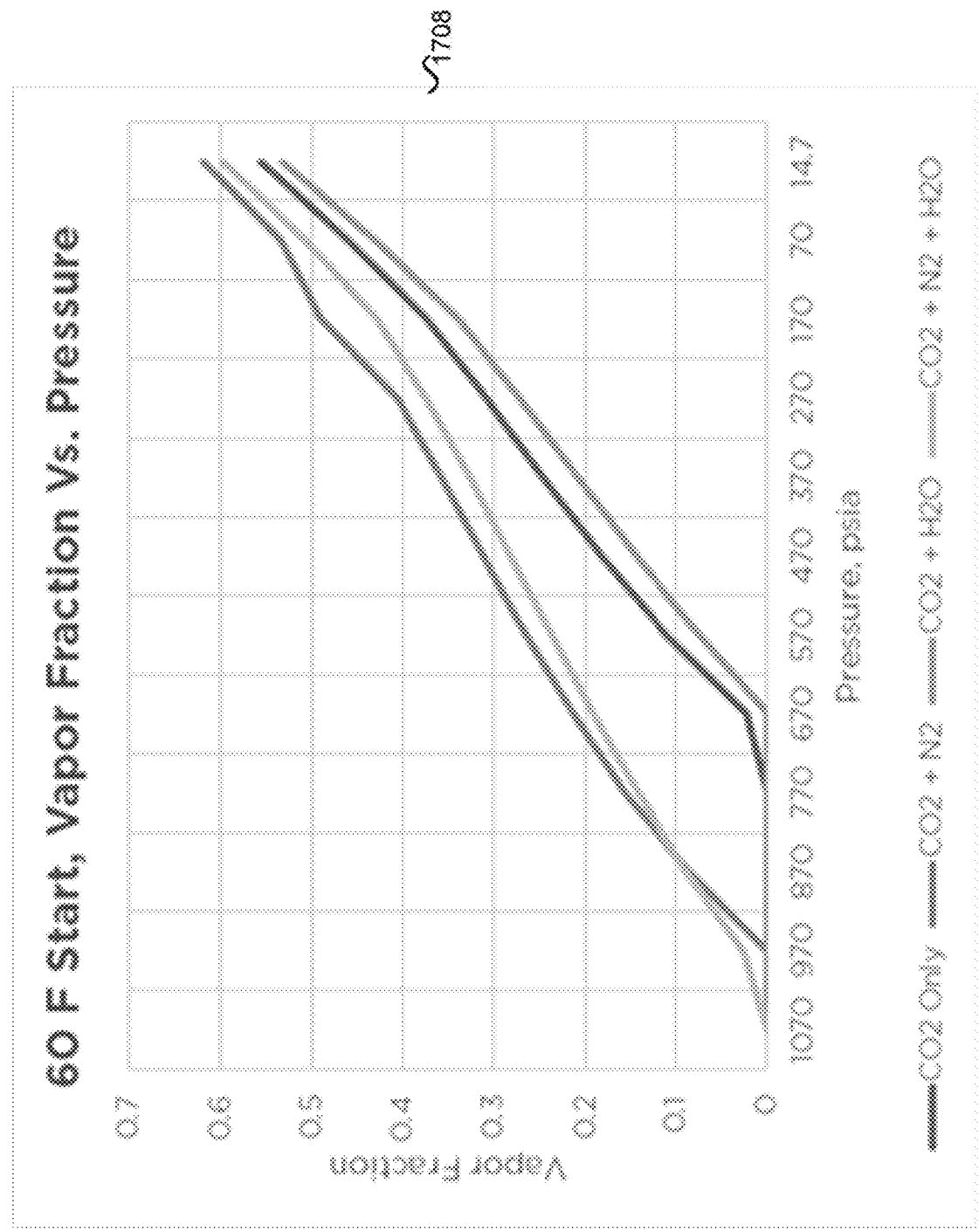

In another embodiment, the scalable greenhouse gas capture system 700 may be designed or configured to mitigate issues caused by overcooling, as well as the use of a compressor. Further, a vehicle capture and storage system may be configured to maintain a minimum allowable working capacity. In such embodiments, the scalable greenhouse gas capture system 700 may be configured to utilize the naturally occurring temperature and pressure swings, or other phase changes, to facilitate removal of the exhaust or carbon dioxide from the vehicle. For example, exhaust from a vehicle with a starting temperature of 100 or 60 degrees Fahrenheit may exhibit a temperature drop as pressure decreases (see 1702 and 1704 of FIGS. 20A and 20B respectively), where the exhaust is comprised of carbon dioxide, carbon dioxide and nitrogen, or carbon dioxide and nitrogen with water). Even as temperature decreases, the exhaust may begin to change phases or exhibit two phases (e.g., liquid and gas) (see 1706 and 1708 of FIGS. 20C and 20D respectively). As such, the scalable greenhouse gas capture system 700 may include equipment or devices to capture any gas that may be formed and condense the gas back to a liquid.

Each of the exhaust pumps 708 may include a user interface to allow for interaction between one of the exhaust pumps 708 and the user. Each of the exhaust pumps 708 may be connected to a meter 720 or meters. The meter 720 or meters may measure the amount of exhaust that flows, is pumped, or is obtained in another way from a vehicle exhaust tank 704. The exhaust pumps 708 may further be connected to a sensor 710 that is associated with the exhaust holding tank 712 to measure its capacity. The sensor 710 may provide data to be utilized by the exhaust pumps 708 to determine whether to allow or prevent further pumping of exhaust based on a full, near full or less than full capacity of the exhaust holding tank 712. Further, the exhaust pumps 708 may obtain data from a vehicle sensor 706 to determine if an amount of exhaust stored in the exhaust tank 704 is less than or greater than an amount of the available capacity of the exhaust holding tank 712.

The scalable greenhouse gas capture system 700 may include an analyzer 722 that is connected to and in fluid communication with the exhaust in the exhaust holding tank 712. The analyzer 722 may receive a sample of the exhaust via connections to the pipe or pipelines leading to the exhaust holding tank 712. The analyzer 722 may measure the composition of samples of the exhaust that are provided to it. Composition data from analyzer 722 may be transmitted to the exhaust pumps 708 and/or to a computing device for inclusion in an environmental report, governmental report, or other report as described herein.

The exhaust holding tank 712 is designed with a capacity to store an amount of exhaust that would equal or exceed the amount of exhaust that would be off-loaded by vehicles within a specified time, e.g., one day, two days, three days, or more. When the exhaust holding tank 712 becomes full or near full, or at regular or periodic intervals, a transportation vehicle, e.g., such as a delivery vehicle, or other logistics means configured to off-load the exhaust, such as pipe or pipeline, rail, or marine vessel, may be used to retrieve the exhaust from the exhaust holding tank 712 and transport the exhaust away from the scalable greenhouse gas capture system 702 to its final disposition. The exhaust may be transported to a number of locations for its final disposition, which may include re-use, recycling, and/or permanent storage. Such locations may include a refinery, an underground cavern or other location configured to store exhaust or carbon dioxide long-term, exhaust or carbon dioxide recycle centers, and/or other locations which may utilize exhaust or carbon dioxide.

Figure 11:
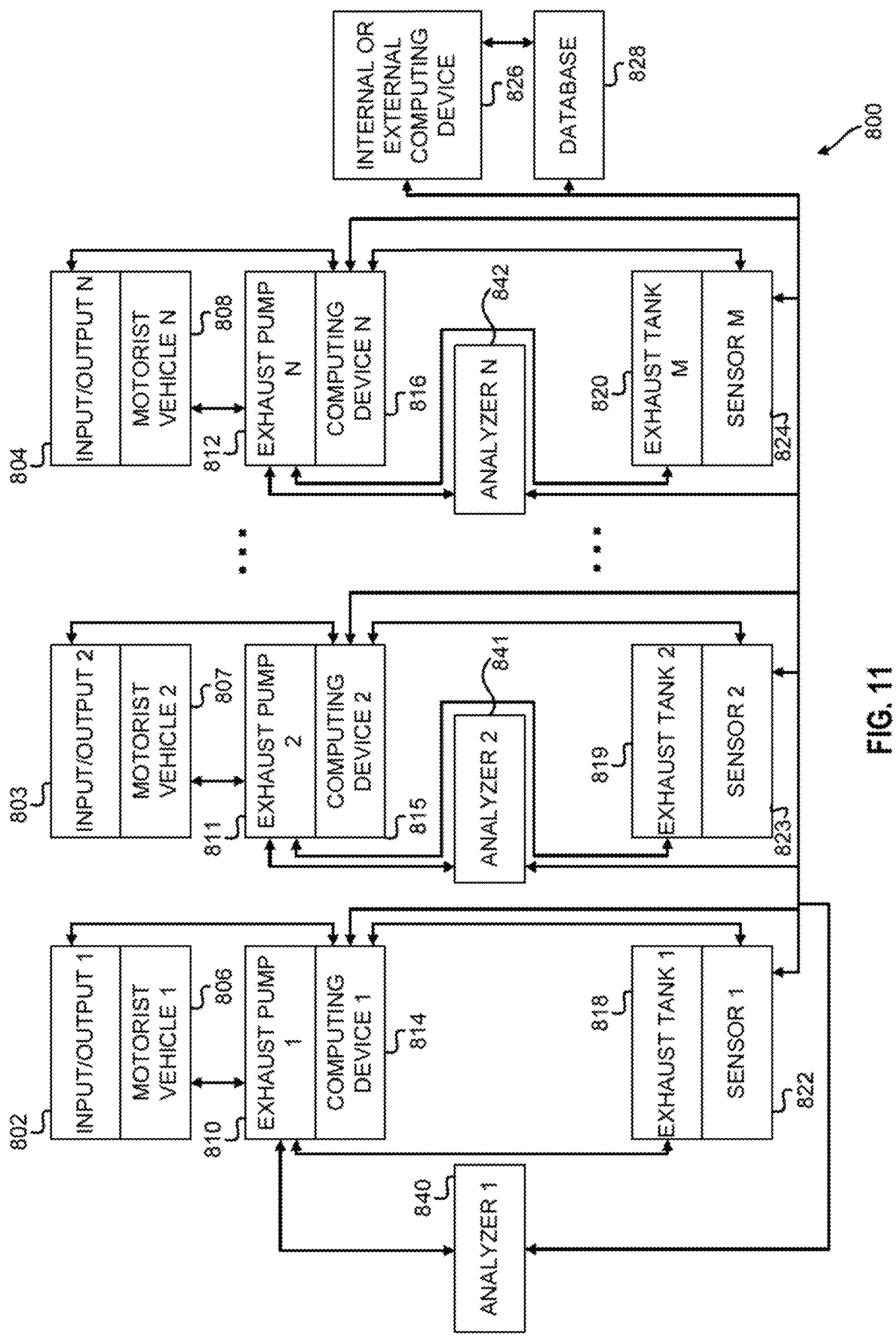
FIG. 11 is a simplified diagram that illustrates a novel implementation of an exhaust off-loading station that includes collection and determinations relating to captured exhaust, off-loaded exhaust, and transported exhaust, according to one or more embodiments of the disclosure.

FIG. 11 is a simplified diagram that illustrates a novel implementation of an exhaust off-loading station 800 or location including collection and determinations relating to captured exhaust, off-loaded exhaust, and transported exhaust, according to one or more embodiments of the disclosure. The exhaust off-loading station 800 or location may include various components. For example, an exhaust pump may include a user interface, a nozzle, and piping connecting the exhaust pump, e.g., exhaust pump 1 810, exhaust pump 2 811, and/or up to exhaust pump N 812, to an exhaust tank, e.g., exhaust tank 1 818, exhaust tank 2 819, and/or up to exhaust pump M 820. The exhaust pump may also include or be connected to a computing device or controller, e.g., computing device 1 814, computing device 2 815, and/or up to computing device N 816. The computing device or devices may include memory to store instructions. The instructions may be executed by a processor of the computing device or devices. The computing device may include instructions to determine whether the exhaust pumps may continue to pump exhaust from different vehicles, e.g., vehicle 1 806, vehicle 2 807, and/or up to vehicle N 804. Such a determination may be based on data provided by the sensors associated with each exhaust tank, e.g., sensor 1 822, sensor 2 823, and/or up to sensor M 824 and input/outputs associated with each vehicle, e.g., input/output 1 802, input/output 2 803, and/or up to input/output N 804. The sensors may provide data for utilization by the computing device to determine the current capacity of the exhaust tank. In another embodiment, meters disposed throughout the exhaust off-loading station 800 may be utilized to determine current capacity of each exhaust tank, e.g., such a determination being based on the summation of values provided by each meter minus the available working capacity. Further, the computing device may determine the composition of the exhaust, via an analyzer, e.g., analyzer 1 840, analyzer 2 841, and/or up to analyzer N 842. The analyzer may take one or more samples of the exhaust and analyze the samples, determining the gases or chemicals included in the exhaust. In one or more embodiments, the analyzer may determine and provide data regarding the relative percentages of the various gases and/or chemicals within the exhaust samples. The computing device may display such data as described above, to the user via a user interface associated with the exhaust pump. The computing device may further create a report including such data. Such data or reports, along with other data and analysis gathered by the exhaust off-loading station 800 or location, may be transmitted to an internal or external computing device 826 and/or database for further analysis.

Figure 12:
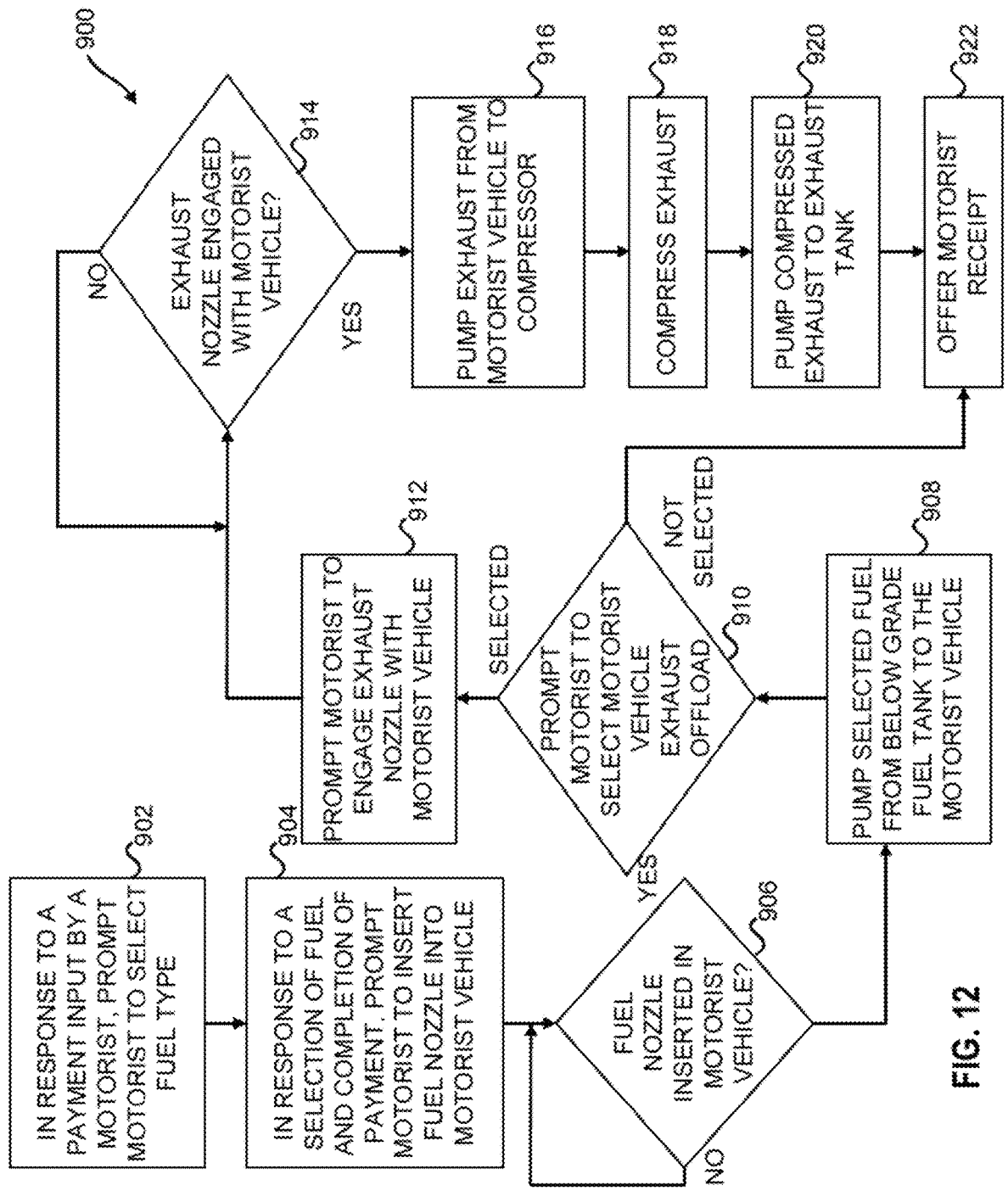
FIG. 12 is a flow diagram for off-loading exhaust and fueling a vehicle sequentially, according to one or more embodiments of the disclosure.

FIG. 12 is a flow diagram, implemented in a computing device, for off-loading exhaust and fueling a vehicle sequentially, according to one or more embodiments of the disclosure. While method 900 is detailed with reference to the fuel and exhaust pump 200 of FIG. 3A and FIG. 3B, other components of FIGS. 4A through 11 may be utilized in such a method. Unless otherwise specified, the actions of method 900 may be completed within the fuel and exhaust pump 200. Specifically, method 900 may be included in one or more programs, protocols, or instructions loaded into memory of a computing device of the fuel and exhaust pump 200 or memory of the fuel and exhaust pump 200. The order in which the operations are described is not intended to be construed as a limitation, and any number of the described blocks may be combined in any order and/or in parallel to implement the disclosed methods.

At block 902, the fuel and exhaust pump 200 may, in response to a payment input by a customer or user, prompt the customer or user to select a fuel type. The customer or user may depress one of the series of buttons 202 or use a voice command to select a type of fuel. As described herein, a user interface 224 may include pop-ups or selectable options, as well as voice recognition. Such a prompt may include a verbal or non-verbal message displayed on the user interface for the customer or user to select a fuel type, such as "Select a fuel type to proceed".

At block 904, the fuel and exhaust pump 200 may, in response to a selection of a fuel type and completion of payment, prompt the customer or user to insert the fuel nozzle 232 into the vehicle. Such a prompt may include a message displayed on the user interface 224 for the customer or user to insert the fuel nozzle 232 into the vehicle, such as "Insert fuel nozzle to proceed".

At block 906, the fuel and exhaust pump 200 may determine whether the fuel nozzle 232 has been inserted into a fuel port of the vehicle, motorist vehicle, or fuel containing component. In such examples, such a determination may be made based on customer or user input, feedback or signals from a sensor or sensor disposed in or connected to the fuel nozzle 232, and/or some combination thereof. In other examples, the fuel and exhaust pump 200 may display that fuel is ready to be pumped after payment is received. The fuel and exhaust pump 200 may wait until the fuel nozzle 232 is inserted or until the customer or user cancels the transaction.

At block 908, the fuel and exhaust pump 200 may pump the selected fuel to the customer vehicle. The fuel and exhaust pump 200 may pump the fuel from a below-grade fuel tank 230. The fuel and exhaust pump 200 may display a running total of fuel pumped from the below-grade fuel tank 230 on user interface 224, which may further display a running monetary value or cost of the fuel pumped from the below-grade fuel tank 230.

At block 910, the fuel and exhaust pump 200 may prompt a customer or user to select whether to off-load vehicle exhaust. Such a prompt may be transmitted before, during, or after fueling of the vehicle. The message may be displayed on the user interface 224 and may include a message such as, "Off-load vehicle exhaust?". The customer or user may depress or push a button 206, or use a voice command, specifically for selecting such an option or select a prompt or button displayed on the user interface 224.

At block 912, if the customer or user selects the option to off-load exhaust, then the fuel and exhaust pump 200 may prompt the user to engage the exhaust nozzle 240 with the vehicle. Such a message may include, "Engage exhaust nozzle with vehicle to proceed". At block 914, the fuel and exhaust pump 200 may determine whether the exhaust nozzle 240 is engaged with the vehicle. Sensors may be included in or connected to the exhaust nozzle. The fuel and exhaust pump 200 may determine, based on signals from the sensor, whether the exhaust nozzle 240 is inserted into an exhaust port, whether the exhaust nozzle 240 is sealingly engaged with the exhaust port, and/or whether the exhaust nozzle 240 is locked or latched onto the exhaust port.

At block 916, once the exhaust nozzle 240 is verified to be engaged or locked with the vehicle, the fuel and exhaust pump 200 may begin pumping exhaust from the vehicle. At block 918, a compressor may compress the exhaust further. At block 920, the exhaust may flow into the exhaust holding tank 238. At block 922, after fuel has been pumped and/or after exhaust has been off-loaded, the fuel and exhaust pump 200 may offer a digital or print receipt and data to the customer or user.

Figure 13:
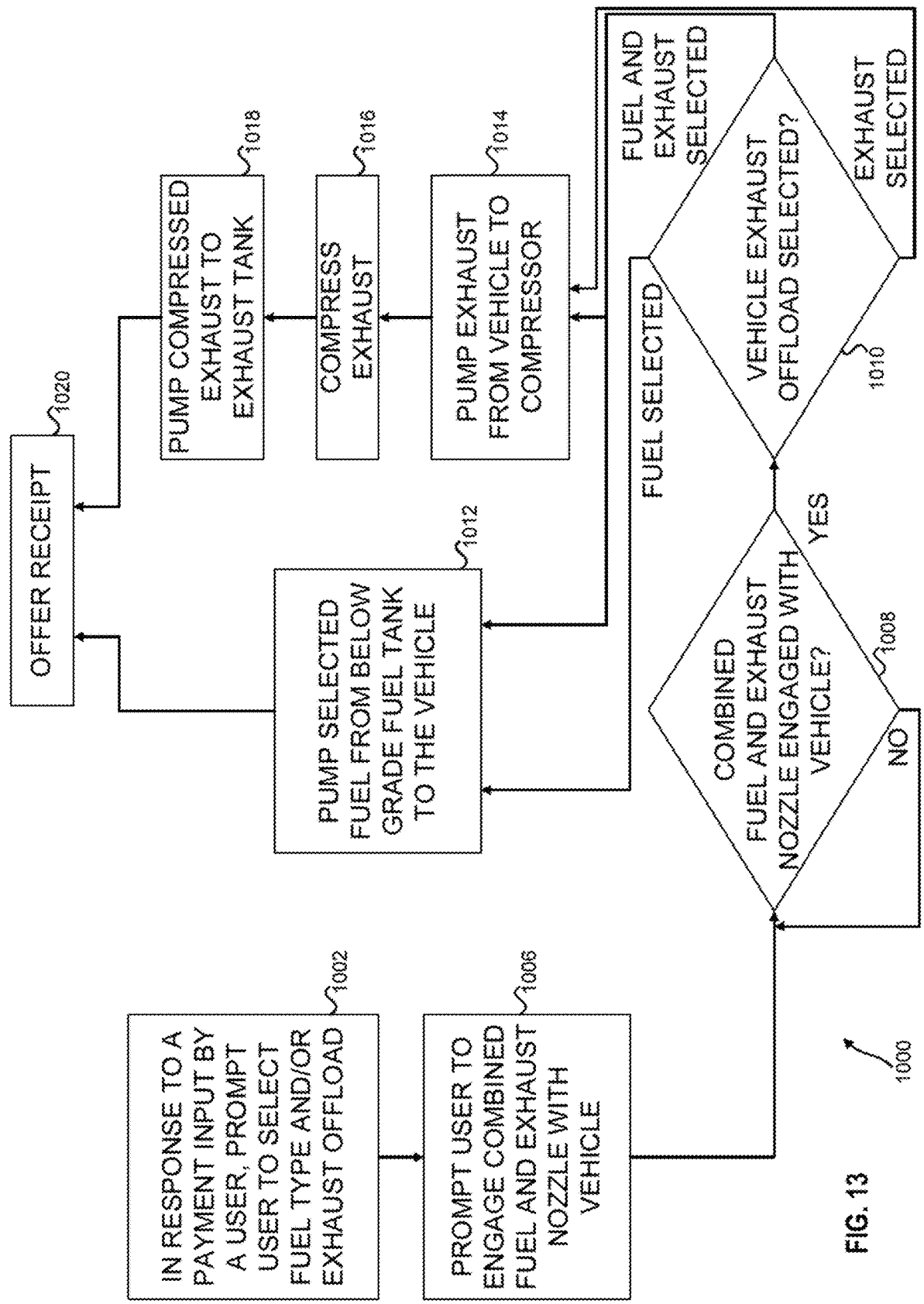
FIG. 13 is a flow diagram for off-loading exhaust and fueling a vehicle in parallel, or substantially at the same time, according to one or more embodiments of the disclosure.

FIG. 13 is a flow diagram, implemented in a computing device, for off-loading exhaust and fueling a vehicle sequentially, according to one or more embodiments of the disclosure. While method 1000 is detailed with reference to the fuel and exhaust pump 400 of FIG. 5A through FIG. 5C, other components of FIGS. 6 through 11 may be utilized in such a method. Unless otherwise specified, the actions of method 1000 may be completed within the fuel and exhaust pump 400. Specifically, method 1000 may be included in one or more programs, protocols, or instructions loaded into memory of a computing device of the fuel and exhaust pump 400 or memory of the fuel and exhaust pump 400. The order in which the operations are described is not intended to be construed as a limitation, and any number of the described blocks may be combined in any order and/or in parallel to implement the disclosed methods.

At block 1002, in response to a payment input by a customer or user, the fuel and exhaust pump 400 may prompt the customer or user to select a fuel type. One option may include not selecting any fuel. Once the customer or user selects a fuel type (or the no fuel option) the fuel and exhaust pump 400 may prompt a customer or user to select whether to off-load exhaust. Once a customer or user has selected whether to off-load exhaust, the fuel and exhaust pump 400 may, at block 1006, prompt the customer or user to engage the combined fuel and exhaust nozzle 414 with the vehicle. The fuel and exhaust pump 400, at block 1008 may determine whether the combined fuel and exhaust nozzle 414 has been engaged with the vehicle, e.g., sealingly engaged such that no off-loaded exhaust escapes to atmosphere and the fuel and exhaust flows do not mix. The fuel and exhaust pump 400, at block 1010, may determine whether exhaust off-load has been selected. If exhaust off-load has been selected, then either simultaneously, substantially simultaneously, or in sequence, the fuel and exhaust pump 400 may, at block 1012, pump the selected fuel to the vehicle and at block 1014, allow exhaust from the vehicle to flow to a compressor. The compressor, at block 1016, may compress the exhaust and, at block 1018, the compressed exhaust may flow into the exhaust holding tank 410. At block 1020, after the exhaust and fuel have been delivered from and to, respectively, the vehicle, the customer or user may be offered a receipt. If the customer or user only chooses a fuel, then, at block 1012, the fuel may be pumped to the vehicle. If the customer or user only chooses to off-load exhaust, then only exhaust may be off-loaded.

Figure 14:
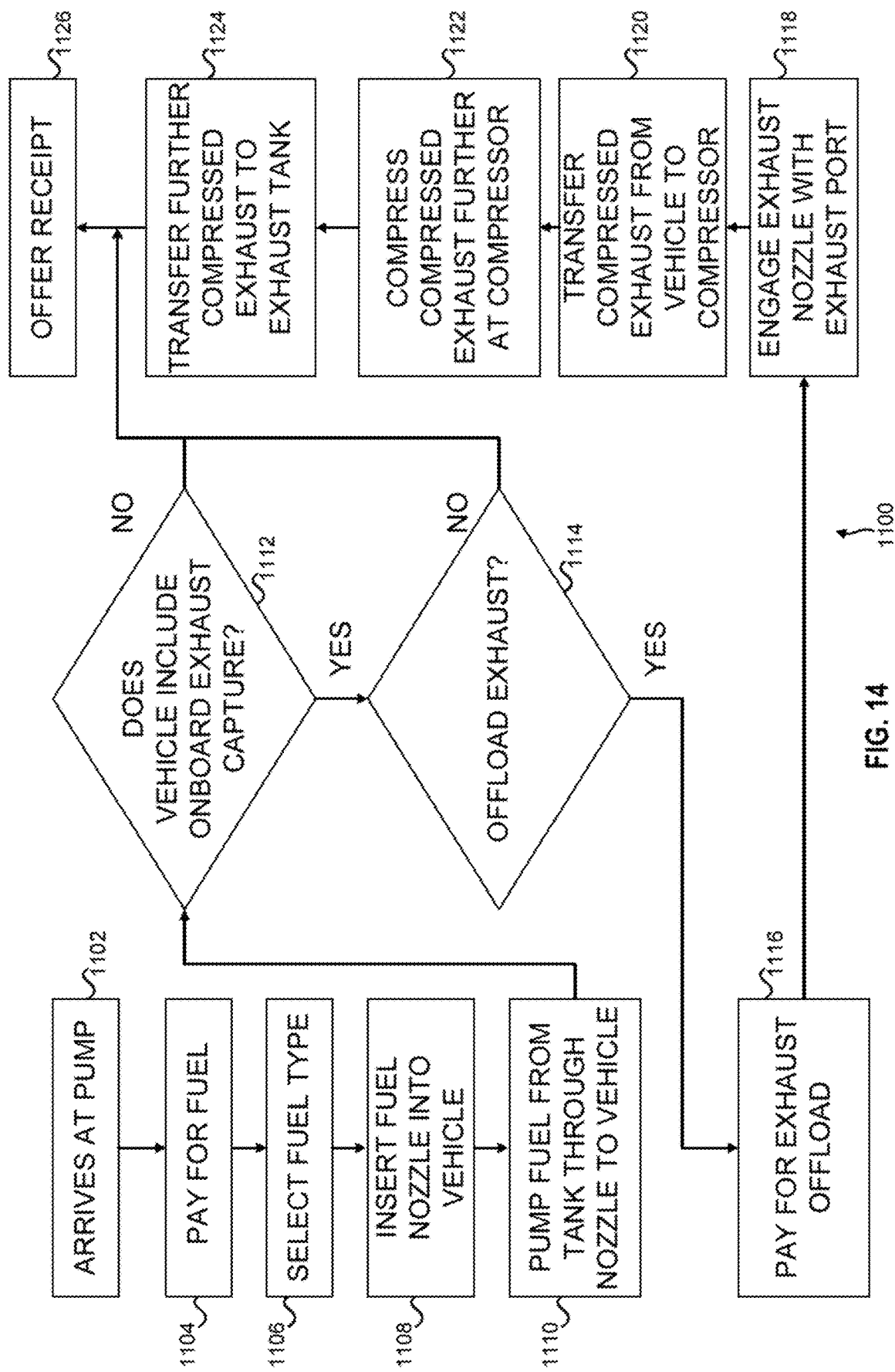
FIG. 14 is another flow diagram for off-loading exhaust and fueling a vehicle sequentially, according to one or more embodiments of the disclosure.

FIG. 14 is another flow diagram for off-loading exhaust and fueling a vehicle sequentially, according to one or more embodiments of the disclosure. The order in which the operations of method 1100 are described is not intended to be construed as a limitation, and any number of the described blocks may be combined in any order and/or in parallel to implement the disclosed methods.

At block 1102, a customer or user may arrive at a pump. At block 1104, the customer or user may pay for fuel or input payment prior to selection of a fuel. After submitting payment, at block 1106, the customer or user may select a fuel type. After a fuel type is selected, the customer or user, at block 1108, may insert a fuel nozzle into a vehicle. After the fuel nozzle is inserted into the vehicle, a fuel pump, at block 1110, may begin pumping fuel through the fuel nozzle into the vehicle.

While the fuel is being pumped, prior to pumping fuel, or after fuel has been pumped, at block 1112, it may be determined whether the vehicle includes an onboard vehicle exhaust capture device (e.g., by prompting the user for such confirmation). If the vehicle includes an onboard vehicle exhaust capture device, the customer or user may choose whether to off-load exhaust at block 1114. If the customer or user chooses to off-load exhaust, the customer or user may input payment for such an operation at block 1116. Such payment may occur when the customer pays for fuel or afterwards. After the customer or user has transacted payment, the customer or user may, at block 1118 engage the exhaust nozzle with the exhaust port associated with the vehicle. Once the exhaust nozzle is engaged with the exhaust port, at block 1120, the exhaust may be transferred from the vehicle's on-board vehicle exhaust capture device to a compressor. The compressor, at block 1122, may further compress exhaust from the vehicle. At block 1124, the compressed exhaust may be transferred to an exhaust holding tank. After transfer of exhaust and/or fuel, at block 1126, the customer or user may be offered a receipt.

Figure 15:
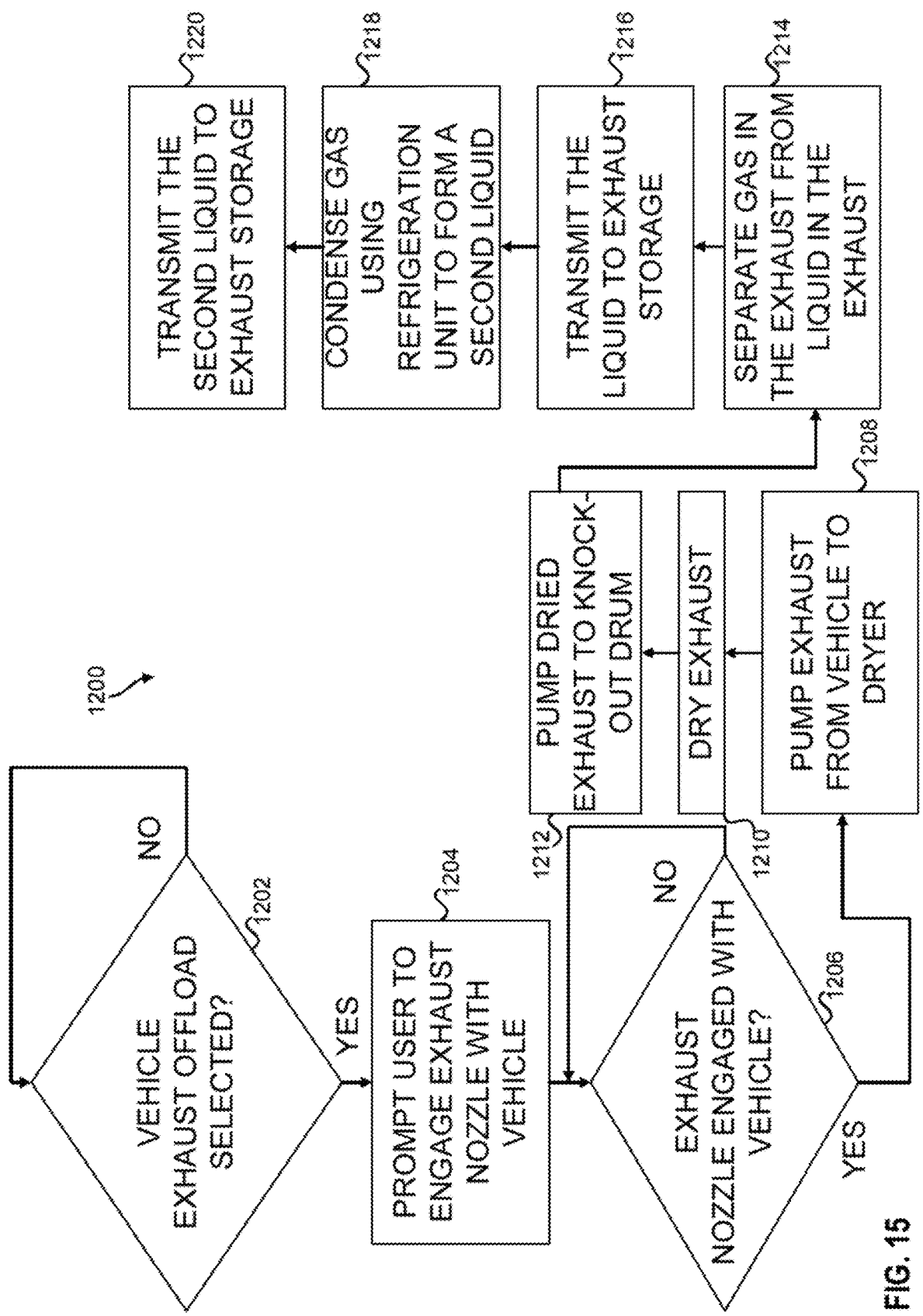
FIG. 15 is a flow diagram for off-loading and processing liquid exhaust, according to one or more embodiments of the disclosure.

FIG. 15 is a flow diagram for off-loading and processing liquid exhaust, according to one or more embodiments of the disclosure. The order in which the operations of method 1200 are described is not intended to be construed as a limitation, and any number of the described blocks may be combined in any order and/or in parallel to implement the disclosed methods.

At block 1202, a controller or computing device may determine whether a user has elected to off-load exhaust from a vehicle. The exhaust may be a liquid exhaust. The liquid exhaust may be comprised of liquid carbon dioxide. The liquid exhaust may include other chemicals as well, such as nitrogen and/or water, among other chemicals.

At block 1204, the controller or computing device may prompt a user to engage an exhaust nozzle with the vehicle. At block 1206, prior to commencing off-load of exhaust, the controller or computing device may wait until confirmation (e.g., via a signal from the exhaust nozzle, signal from the user, and/or other signals) that the exhaust nozzle is engaged with the vehicle.

At block 1208, if the exhaust nozzle is engaged with the vehicle, then the exhaust may be pumped, via a pump, from the vehicle to a dryer. At block 1210, the dryer may dry the exhaust. The liquid exhaust, as noted, may include an amount of water. As pressure drops occur at points between the exhaust nozzle and the exhaust storage tank, temperature of the exhaust may drop. Depending on the temperature drop, water may potentially freeze, causing blocks or clogs. As such, the dryer may remove any water included in the exhaust, thus preventing such blocks or clogs.

At block 1212, the dried exhaust may be pumped to a knock-out drum. As the exhaust passes through the system, vapors may form based on temperature and/or pressure changes. At block 1214, the vapor may be separated from the liquid exhaust in the knock-out drum and transported to an intermediate storage tank. The intermediate storage tank may include or may be connected to a refrigeration unit. At block 1218, the vapor may be condensed in the refrigeration unit. The condensation (e.g., a second liquid), at block 1220, may be pumped to exhaust storage. Further, at block 1216, the liquid from the knock-out drum may be pumped to the exhaust storage.

Figure 16A:
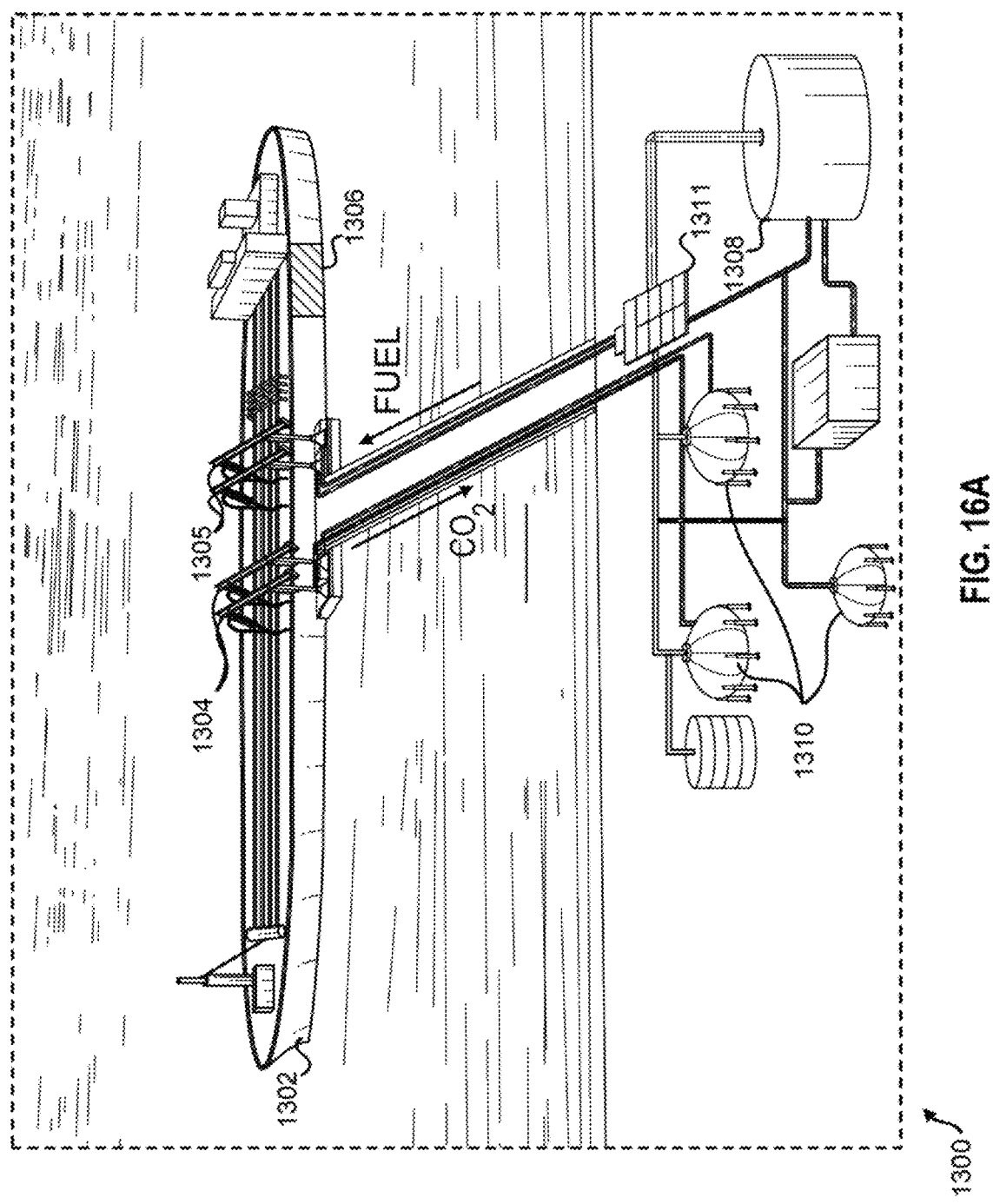
FIG. 16A and FIG. 16B are schematic diagrams that illustrate scalable greenhouse gas capture systems for off-loading captured greenhouse gas from a marine vessel that may include an exhaust or carbon capture device, according to one or more embodiments of the disclosure.
Figure 16B:
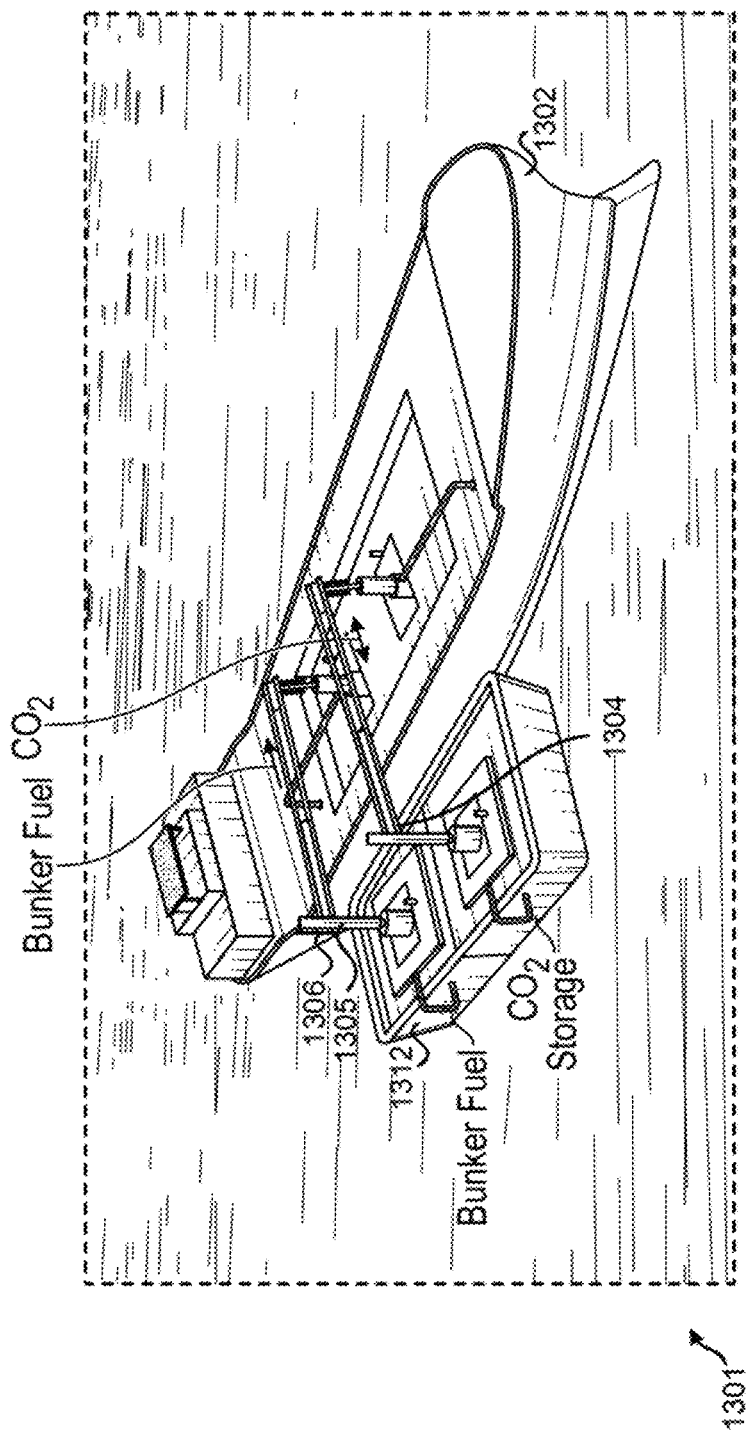

As noted, a scalable greenhouse capture system may be utilized for a variety of vehicles, for example, a marine vessel 1302. FIG. 16A and FIG. 16B are schematic diagrams that illustrate scalable greenhouse gas capture systems 1300 for off-loading captured exhaust, greenhouse gases, or carbon dioxide from a marine vessel 1302, according to one or more embodiments of the disclosure. The marine vessel 1302 may include an exhaust or carbon capture device. The exhaust or carbon capture device may capture carbon dioxide and/or other chemicals/greenhouse gases produced by the engine of the marine vessel 1302 and/or from the air. The captured exhaust or carbon dioxide may be stored, as a liquid or a gas, in a storage section 1306 or tank of the marine vessel 1302. The marine vessel 1302 may re-fuel at a seaport, at an on-shore dock, or an off-shore platform/dock as illustrated in FIG. 16A, or off-shore bunkering via a smaller marine vessel 1314 or tug boat with a fueling and/or exhaust/greenhouse gas vessel 1312. The seaport or dock may include several armatures 1304, 1305. Each of the armatures 1304, 1305 may include a distal end and proximal end. A swivel joint may connect the proximal end to of the armatures 1304, 1305 to a pipeline. The pipeline may connect to a pump. Another pipeline may connect the pump to a meter and/or sampler/analyzer. The meter and/or analyzer may connect directly to an exhaust or greenhouse gas holding tank 1310, to an additional compressor or pump, or to a manifold 1311. The manifold 1311 may include several connections or pipelines to different tanks, spheres, or other components. The distal end of the armatures 1304, 1305 may connect to a corresponding port on the marine vessel 1302. Upon connection of the distal end to the port of the marine vessel 1302, the exhaust or greenhouse gas may be pumped from a tank of the marine vessel 1302. A pump connected to the armature 1304 may pump the exhaust or greenhouse through the armature 1304. The exhaust may flow through the swivel joint to the meter and/or sampler/analyzer. The exhaust may further flow through to the additional compressor or pump, for further compression the exhaust or greenhouse gas. The exhaust or greenhouse gas may further flow to the holding tank. The armatures may include additional pumps to allow for pumping of the exhaust to the marine vessel 1302 for shipment. The marine vessel 1302 may be a blue water vessel, e.g., a deep sea vessel, or a brown water vessel, e.g., an inland or coastal waterway vessel, such as a tow or barge. In another embodiment, the seaport or dock may include fuel armatures 1305 connected to a fuel storage tank 1308 for providing fuel to the marine vessel 1302.

As illustrated in FIG. 16B, the marine vessel 1302 may re-fuel or off-load stored exhaust or greenhouse gases offshore. A smaller marine vessel or tug boat may haul or transport a floating fuel and exhaust or greenhouse gas storage vessel 1312. Such a vessel 1312 may be constructed similar to the fuel tank and/or exhaust or greenhouse gas storage tank of the marine vessel. The vessel may dock at the seaport or dock to off-load exhaust, for example, at the seaport as illustrated in FIG. 16A.

Figure 17:
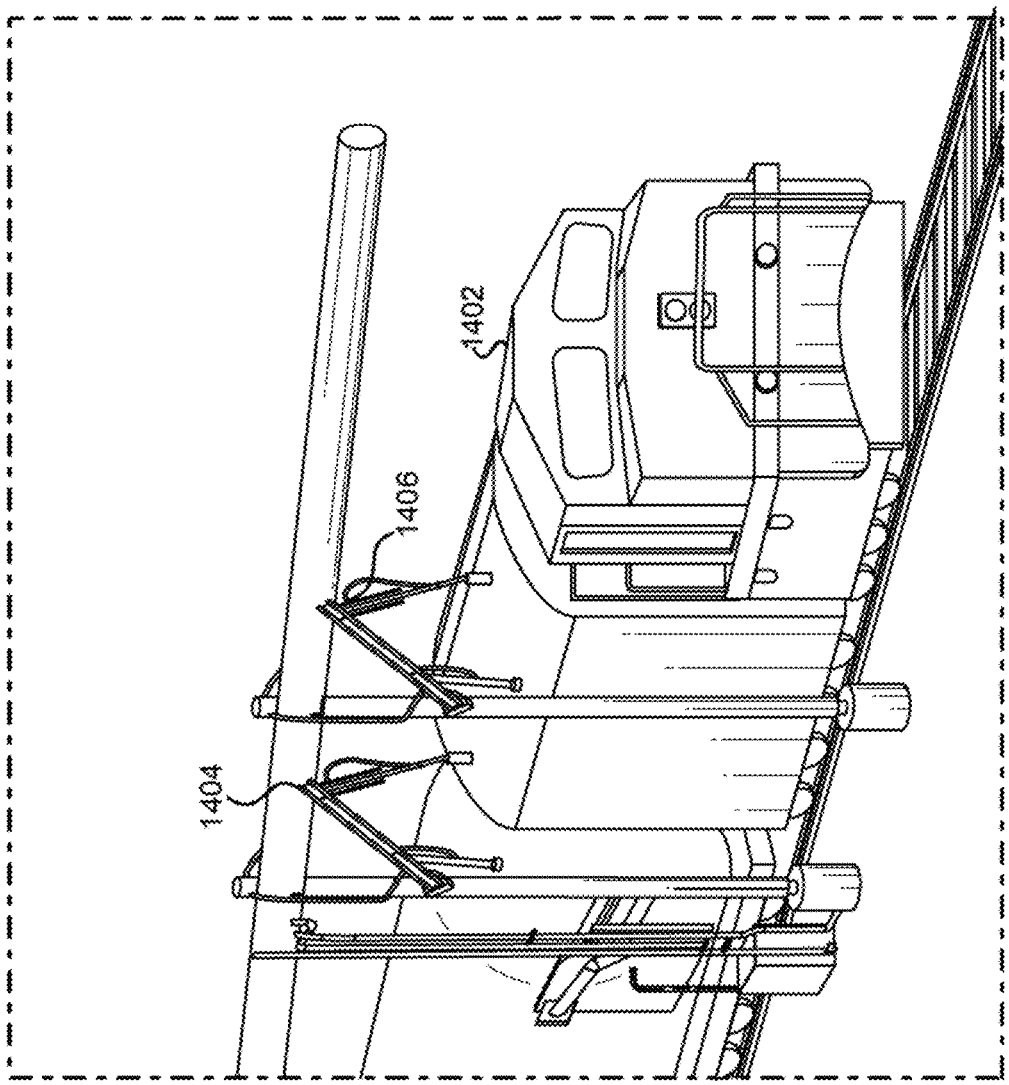
FIG. 17 is a schematic diagram that illustrates scalable greenhouse gas capture systems for off-loading captured greenhouse gas from a locomotive and/or rail car to a greenhouse gas holding tank and transporting the greenhouse gas from the greenhouse gas holding tank, via a transportation mechanism, for re-use, recycle, or permanent storage, according to one or more embodiments of the disclosure.

FIG. 17 is a schematic diagram that illustrates scalable greenhouse gas capture systems 1400 for off-loading captured greenhouse gas from a locomotive and/or rail cars 1402 to a greenhouse gas holding tank and transporting the greenhouse gas from the greenhouse gas holding tank to a delivery vehicle, pipeline, or other form of transportation for re-use, recycle, or permanent storage, according to one or more embodiments of the disclosure. The locomotive and/or rail cars 1402 may include an exhaust or carbon capture device to capture exhaust, carbon dioxide, carbon dioxide from the air, and/or some other gases/chemicals. The exhaust or carbon dioxide may be produced via an internal combustion engine of the locomotive and/or rail cars 1402. The locomotive and/or rail cars 1402 may re-fuel at a rail fueling station, as illustrated in FIG. 17. The rail fueling station may include several armatures 1404, 1406. The armatures 1404, 1406 may include a distal end and proximal end. A swivel joint may connect the proximal end to a pipeline. The pipeline may connect to a pump. Another pipeline may connect the pump to a meter and/or sampler/ analyzer. The meter and/or analyzer may connect directly to an exhaust or greenhouse gas holding tank or to an additional compressor or pump. The distal end may connect to a corresponding port on the locomotive and/or rail cars 1402. Upon connection of the distal end to the port of the locomotive 1402, the exhaust or greenhouse gas may flow from a tank of the locomotive and/or rail cars 1402. A pump connected to the armature 1404, 1406 may pump the exhaust or greenhouse through the armature 1404, 1406. The exhaust may flow through the swivel joint to the meter and/or sampler/analyzer. The exhaust may further flow through the additional compressor or pump, to further compress the exhaust or greenhouse gas. The exhaust or greenhouse gas may further flow to the holding tank.

In another embodiment, the locomotive 1402 may include a storage section or storage cart, connected to the locomotive 1402. The storage section or storage cart may store exhaust, greenhouse gases, or carbon dioxide captured by the exhaust or carbon capture device of the locomotive 1402. In another embodiment, the storage section or storage cart may store exhaust, greenhouse gases, or carbon dioxide for transport for further use. In such embodiments, the armatures 1404, 1406 may additionally be configured to pump exhaust, greenhouse gases, or carbon dioxide to the storage section or storage cart.

Figure 18:
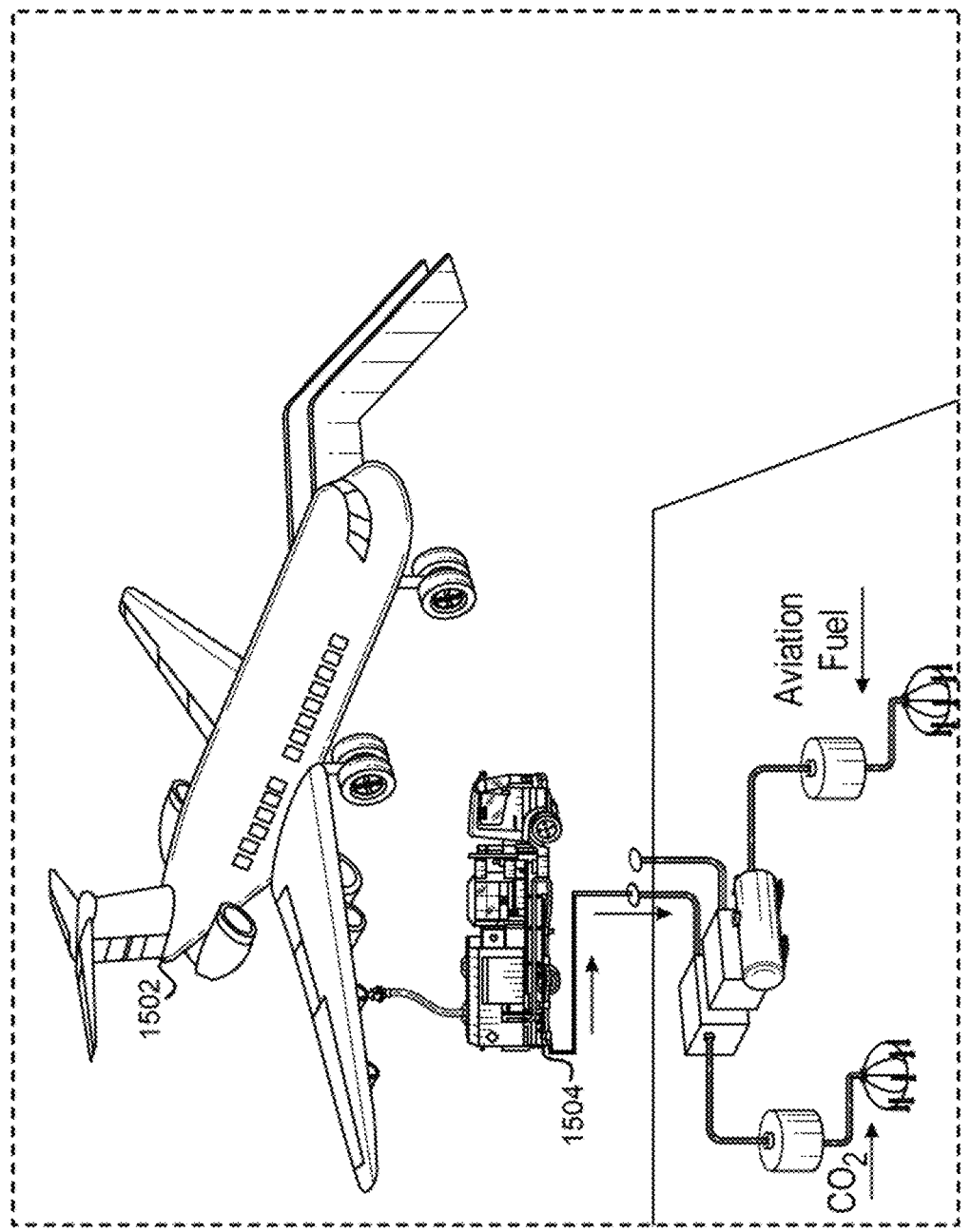
FIG. 18 is a schematic diagram that illustrates scalable greenhouse gas capture systems for off-loading captured greenhouse gas from an airplane to a greenhouse gas holding tank and transporting the greenhouse gas from the greenhouse gas holding tank, via a transportation mechanism, for re-use, recycle, or permanent storage, according to one or more embodiments of the disclosure.

FIG. 18 is a schematic diagram that illustrates scalable greenhouse gas capture systems 1500 for off-loading captured greenhouse gas from an airplane 1502 to a greenhouse gas holding tank and transporting the greenhouse gas from the greenhouse gas holding tank, e.g., such as by a delivery vehicle, or other logistics means, such as pipe or pipeline, rail, or marine vessel, for re-use, recycle, or permanent storage, according to one or more embodiments of the disclosure. In such embodiments, an airplane 1502 may include a greenhouse gas capture device. The greenhouse gas capture device may capture greenhouse gases from the air as the airplane 1502 travels between destinations. The airport may include above-grade or below-grade fuel tanks. The airport may include above-grade or below-grade greenhouse gas tanks. The airport may include ports allowing for a pump or dispenser to connect to the below-grade fuel tanks and below-grade and/or above-grade greenhouse gas tanks. Dispensing trucks 1504 may travel to an airplane 1502 to re-fuel the airplane 1502. The dispensing trucks 1504 may additionally be configured to pump or otherwise facilitate flow of greenhouse gases captured by the airplane 1502. A truck separate from the dispensing truck 1504 may be utilized to offload the captured greenhouse gases. As the dispensing truck 1504 or separate truck is connected to the airplane 1502, the dispensing truck 1504 or separate truck may pump or otherwise facilitate the flow of the greenhouse gases from the airplane 1502 to the below-grade or above-grade greenhouse gas tanks. Stated another way, the greenhouse gases captured by the airplane may be off-loaded from the holding vessel within airplane 1502.

Figure 19:
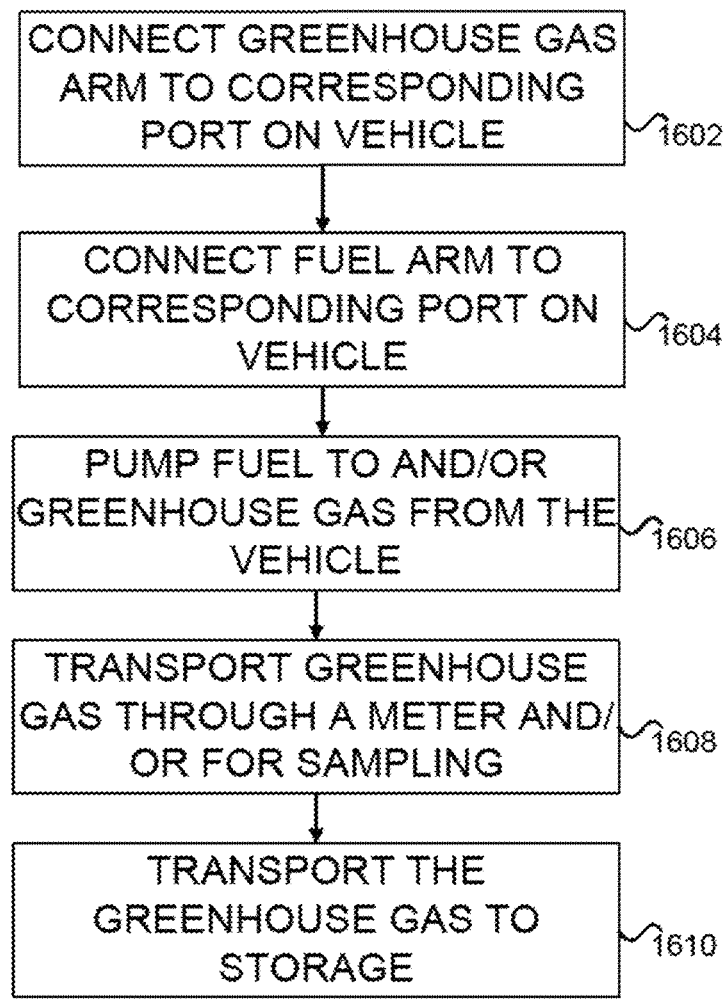
FIG. 19 is a flow diagram for off-loading exhaust and fueling a vehicle, according to one or more embodiments of the disclosure.

FIG. 19 is a flow diagram for off-loading exhaust and/or fueling a vehicle, according to one or more embodiments of the disclosure. The scalable greenhouse gas capture systems of FIG. 2A through FIG. 11 and FIG. 16A through 18 may be utilized in method 1600. Unless otherwise specified, the actions of method 1600 may be completed within a computing device or controller for any of the systems described herein. Specifically, method 1600 may be included in one or more programs, protocols, or instructions loaded into memory of the computing device or controller. The order in which the operations are described is not intended to be construed as a limitation, and any number of the described blocks may be combined in any order and/or in parallel to implement the disclosed methods.

At block 1602, a greenhouse gas arm or armature may be connected to a corresponding port on a vehicle. The greenhouse gas arm or armature may be configured to pump or otherwise facilitate the flow of greenhouse gas, in various forms, to and/or from a vehicle. Vehicles may include large trucks, marine vessels, locomotives, rail cars, airplanes, buses, and/or other vehicles. The greenhouse gas arm or armature may be configured to create a seal and/or lock into place when inserted into the corresponding port on the vehicle in order to preclude the escape of captured greenhouse gases to atmosphere.

The scalable greenhouse gas capture system may include a fuel arm or armature. In other embodiments, the scalable greenhouse gas capture system may not include an option to fuel a vehicle, but rather an option to remove or discharge captured exhaust or greenhouse gases. If present, at block 1604, the fuel arm or armature may connect to a corresponding port on the vehicle.

At block 1606, the scalable greenhouse gas capture system may pump fuel to and/or facilitate the flow of greenhouse gases from the vehicle through the corresponding arms or armatures. Fuel may be pumped prior to, during, or after the removal or discharging of the greenhouse gases.

At block 1608 the greenhouse gases may be transported through the armature to a meter and/or sampler or analyzer. The meter may determine the amount of greenhouse gases being off-loaded. The sampler or analyzer may analyze or determine the content of the greenhouse gases, e.g., the identification of the greenhouse gas, a relative percentage of the greenhouse gases contained therein, the identification/relative percentages of various chemicals therein, etc. The gases and/or chemicals contained therein may include carbon dioxide or primarily carbon dioxide. Other gases/chemicals may be included, but the other gases/chemicals may be based on the type of vehicle and the type of greenhouse gas capture device of the vehicle, e.g., a vehicle utilizing bunker fuel may produce trace amounts of different chemicals, e.g., sulfur-containing compounds, nitrogen-containing compounds, etc., as opposed to a vehicle burning jet fuel.

The greenhouse gas may be compressed via a compressor or multi-stage compressor. At block 1610, the greenhouse gas, whether compressed or not compressed and in a solid, liquid, or gaseous form, may be transported or pumped to a greenhouse gas holding tank.

This application is a continuation of U.S. application Ser. No. 18/093,756, filed Jan. 5, 2023, titled "SCALABLE GREENHOUSE GAS CAPTURE SYSTEMS AND METHODS," which is a divisional of U.S. application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties. This application is also a continuation of U.S. application Ser. No. 18/093,747, filed Jan. 5, 2023, titled "SCALABLE GREENHOUSE GAS CAPTURE SYSTEMS AND METHODS," which is a divisional of U.S. application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties.

In the drawings and specification, several embodiments of systems and methods to provide scalable greenhouse gas capture have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed is:

1. A scalable carbon capture system to allow for off-load of captured carbon dioxide ($CO_2$) from an on-board vehicle $CO_2$ capture device, the system comprising:
   one or more $CO_2$ armatures, each of the one or more $CO_2$ armatures including:
      a $CO_2$ nozzle engageable with a vehicle $CO_2$ port and, upon engagement with the vehicle $CO_2$ port, configurable to create a seal between the $CO_2$ nozzle and the vehicle $CO_2$ port, thereby to prevent $CO_2$ from leaking during off-load of captured $CO_2$ from an on-board vehicle $CO_2$ capture device through the vehicle $CO_2$ port and into the $CO_2$ nozzle, and
      a pipe having one end portion connected to the $CO_2$ nozzle and another end portion and configured to transport captured $CO_2$ therethrough from the $CO_2$ nozzle to the another end portion;
   a $CO_2$ holding tank in fluid communication with the another end portion and having a capacity to store the captured $CO_2$ from the pipe, the $CO_2$ tank including a delivery vehicle port, thereby to allow fluid communication with the $CO_2$ holding tank and allow the delivery vehicle to obtain $CO_2$ from the $CO_2$ holding tank; and
   a meter, positioned in a fluid pathway defined by the pipe and the $CO_2$ holding tank, to measure an amount of the $CO_2$ transported from the on-board vehicle $CO_2$ capture device to the $CO_2$ holding tank.

2. The system of claim 1, wherein the vehicle includes one of a locomotive, airplane, bus, truck, marine vessel, or heavy vehicle, and wherein the one or more $CO_2$ armatures is configured to withstand a low temperature.

3. The system of claim 2, further comprising a pump to facilitate transport of the captured $CO_2$ from the $CO_2$ nozzle.

4. The system of claim 3, further comprising a dryer positioned along the pipe and configured to remove water from the $CO_2$ prior to transport to the $CO_2$ holding tank.

5. The system of claim 1, further comprising a computing device in signal communication with the meter and configured to receive, via the meter, and store a value corresponding to the amount of $CO_2$ transported from the on-board vehicle $CO_2$ capture device.

6. The system of claim 5, wherein the computing device further is in signal communication with a sensor associated with the $CO_2$ holding tank and configured to receive, via the sensor, a signal indicative of an amount of $CO_2$ stored in the $CO_2$ holding tank.

7. The system of claim 6, wherein the computing device includes an input/output positioned at each end of the one or more $CO_2$ armatures and configured to connect to a corresponding input/output of the vehicle upon engagement of one of the one or more $CO_2$ armatures with the vehicle $CO_2$ port.

8. The system of claim 7, wherein the computing device further determines, via data transmitted from the corresponding input/output of the vehicle to the input/output, an amount of $CO_2$ included in the on-board vehicle $CO_2$ capture device prior to transport of the $CO_2$ from the on-board vehicle $CO_2$ capture device.

9. The system of claim 8, wherein the computing device further determines whether to prevent further transport of $CO_2$ to the $CO_2$ holding tank based on the measured amount of $CO_2$ stored in the $CO_2$ holding tank, the amount of $CO_2$ included in the on-board vehicle $CO_2$ capture device, and a total storage amount of the $CO_2$ holding tank.

10. A scalable carbon capture system to allow for off-load of captured $CO_2$ from an on-board marine vessel $CO_2$ capture device, the system comprising:
one or more $CO_2$ armatures positioned at a port positioned to receive a marine vessel, each of the one or more $CO_2$ armatures including:
a $CO_2$ nozzle engageable with a marine vessel $CO_2$ port and, upon engagement with the marine vessel $CO_2$ port, configurable to create a seal between the $CO_2$ nozzle and the marine vessel $CO_2$ port, thereby to prevent $CO_2$ from leaking during off-load of captured $CO_2$ from an on-board marine vessel $CO_2$ capture device through the marine vessel $CO_2$ port and into the $CO_2$ nozzle, and
a pipe having one end portion connected to the $CO_2$ nozzle and another end portion and configured to transport captured $CO_2$ therethrough from the $CO_2$ nozzle to the another end portion;
a $CO_2$ holding tank in fluid communication with the another end portion and having a capacity to store the captured $CO_2$ from the pipe, the $CO_2$ holding tank including a delivery port configured to allow delivery of $CO_2$ from the $CO_2$ holding tank; and
a meter, positioned in a fluid pathway defined at least in part by the pipe and the $CO_2$ holding tank, to measure an amount of the $CO_2$ transported from the on-board marine vessel $CO_2$ capture device to the $CO_2$ holding tank.

11. The system of claim 10, wherein the small marine vessel includes a fuel armature and fuel tank, and wherein the fuel armature is configured to provide fuel from the fuel tank to the marine vessel while the marine vessel remains at sea.

12. The system of claim 10, wherein the marine vessel comprises a blue water vessel or a brown water vessel.

13. The system of claim 12, wherein the blue water vessel comprises a deep sea vessel, and wherein the brown water vessel comprises an inland waterway vessel or a coastal waterway vessel.

14. The system of claim 10, further comprising a pipeline connected to the delivery port and configured to transport the $CO_2$ for further use, wherein one or more additional $CO_2$ armatures and an intermediate $CO_2$ holding tank are positioned on a smaller marine vessel, and wherein the smaller marine vessel is configured to travel a selected distance from the port and capture $CO_2$ from the marine vessel while the marine vessel remains at sea.

15. The system of claim 14, wherein the port comprises one or more of a seaport, an on-shore dock, an off-shore platform, an off-shore dock, or an off-shore bunker.

16. The system of claim 14, wherein the $CO_2$ comprises a liquid $CO_2$, and wherein the $CO_2$ holding tank and the intermediate $CO_2$ holding tank are configured to maintain a temperature at which the $CO_2$ remains a liquid.

17. The system of claim 16, wherein the $CO_2$ holding tank and the intermediate $CO_2$ holding tank include one or more of insulation or a refrigeration unit to maintain the temperature at which the $CO_2$ remains liquid.

18. A scalable carbon capture system to allow for off-load of captured $CO_2$ from an on-board locomotive $CO_2$ capture device, the system comprising:
one or more $CO_2$ armatures positioned at a rail station, each of the one or more $CO_2$ armatures including:
a $CO_2$ nozzle engageable with one or more of a locomotive $CO_2$ port or a rail car $CO_2$ port and, upon engagement with one of the one or more of the locomotive $CO_2$ port or the rail car $CO_2$ port, configurable to create a seal between the $CO_2$ nozzle and the one of the one or more of the locomotive $CO_2$ port or the rail car $CO_2$ port, thereby to prevent $CO_2$ from leaking during off-load of captured $CO_2$ from an on-board vehicle $CO_2$ capture device through the one of the one or more of the locomotive $CO_2$ port or the rail car $CO_2$ port and into the $CO_2$ nozzle, and
a pipe having one end portion connected to the $CO_2$ nozzle and another end portion and configured to transport captured $CO_2$ therethrough from the $CO_2$ nozzle to the another end portion;
a $CO_2$ holding tank in fluid communication with the another end portion, the $CO_2$ holding tank having a capacity to store the captured $CO_2$ from the pipe, the $CO_2$ holding tank including a delivery port, thereby to allow delivery from the $CO_2$ holding tank; and
a meter, positioned in a fluid pathway defined at least in part by the pipe and the $CO_2$ holding tank, to measure an amount of the $CO_2$ transported from the on-board locomotive $CO_2$ capture device to the $CO_2$ holding tank.

19. The system of claim 18, wherein the $CO_2$ holding tank is configured to withstand one or more of high pressure or low temperature, wherein, when the one or more $CO_2$ armatures are connected to a locomotive $CO_2$ port and a rail car $CO_2$ port, each connected $CO_2$ armatures substantially simultaneously transport $CO_2$ from a locomotive and rail car, and wherein, during a $CO_2$ offload operation, the locomotive receives fuel.

20. A scalable greenhouse gas capture system to allow off-loading $CO_2$ captured in an on-board vehicle $CO_2$ capture device, the system comprising:
one or more fuel armatures, each of the one or more fuel armatures including:
a fuel nozzle insertable into a vehicle fuel port,
a first pipe having one end portion connected to the fuel nozzle and another end portion connected to below grade fuel tanks, thereby to provide fluid communication therebetween, the first pipe configured to transport a fuel type to the vehicle via the fuel nozzle, and
a first meter, positioned between the fuel nozzle and the below grade fuel tanks, to measure an amount of fuel transported from one of the below grade fuel tanks to the vehicle;
one or more $CO_2$ armatures, each of the one or more $CO_2$ armatures including:
a $CO_2$ nozzle sengageable with a vehicle $CO_2$ port and, upon engagement with the vehicle $CO_2$ port, configurable to create a seal between the $CO_2$ nozzle and the vehicle $CO_2$ port to prevent $CO_2$ from leaking during off-load of captured $CO_2$ from the on-board vehicle $CO_2$ capture device through the vehicle $CO_2$ port and into the $CO_2$ nozzle, and a second pipe having one end portion connected to the $CO_2$ nozzle and another end portion and configured to transport captured $CO_2$ therethrough from the $CO_2$ nozzle to the another end portion;

a pump in fluid communication with the another end portion of the second pipe and configured to pump the captured $CO_2$ from the on-board vehicle $CO_2$ capture device;

a $CO_2$ holding tank in fluid communication with the pump and having a capacity to store the captured $CO_2$ from the pump; and a second meter, positioned in a fluid pathway defined by the second pipe and the pump that allows $CO_2$ to flow between the $CO_2$ nozzle and $CO_2$ holding tank, to measure an amount of the $CO_2$ transported from the on-board vehicle $CO_2$ capture device to the $CO_2$ holding tank.

21. The system of claim 20, wherein a fueling operation and a $CO_2$ offload operation for a vehicle occurs substantially simultaneously.

22. The system of claim 20, wherein a fueling operation and a $CO_2$ offload operation for a vehicle occurs sequentially.

23. The system of claim 20, wherein the one or more fuel armatures, the one or more $CO_2$ armatures, the pump, the $CO_2$ holding tank, and the second meter are positioned at a terminal, rail station, or port and the system further comprises a compressor positioned proximate to and upstream of the $CO_2$ holding tank and configured to compress the $CO_2$ prior to storage in the $CO_2$ holding tank.

24. The system of claim 20, further comprising a controller configured to prevent further $CO_2$ offloading operations, in response to a level in the $CO_2$ holding tank exceeding a selected threshold and based on an amount of $CO_2$ offloaded as indicated via signals from the second meter and a current amount of $CO_2$ in the $CO_2$ holding tank.

* * * * *